(12) United States Patent
Harra

(10) Patent No.: US 7,874,459 B2
(45) Date of Patent: *Jan. 25, 2011

(54) DISPENSING SYSTEM FOR BLENDED FROZEN FOOD COMPOSITIONS

(76) Inventor: John Harra, 155 W. 81st St., Apartment 6L, New York, NY (US) 10024

( * ) Notice: Subject to any disclaimer, the term of this patent is extended or adjusted under 35 U.S.C. 154(b) by 438 days.

This patent is subject to a terminal disclaimer.

(21) Appl. No.: 11/901,062

(22) Filed: Sep. 14, 2007

(65) Prior Publication Data

US 2008/0093383 A1 Apr. 24, 2008

Related U.S. Application Data

(63) Continuation of application No. 10/965,323, filed on Oct. 14, 2004, now Pat. No. 7,290,682, which is a continuation-in-part of application No. PCT/US2004/011484, filed on Apr. 13, 2004.

(60) Provisional application No. 60/462,700, filed on Apr. 15, 2003.

(51) Int. Cl.
*B67D 7/80* (2010.01)
(52) U.S. Cl. .................. 222/146.6; 222/135; 222/145.5; 62/389

(58) Field of Classification Search .............. 222/129.1, 222/129, 129.3, 148, 129.4, 144.5, 145.1, 222/145.2, 145.5, 145.6, 146.6, 135; 99/452–453, 99/456, 467; 62/346, 354, 71, 389
See application file for complete search history.

(56) References Cited

U.S. PATENT DOCUMENTS

| | | | | |
|---|---|---|---|---|
| 3,803,870 A | * | 4/1974 | Conz | 62/342 |
| 3,898,861 A | * | 8/1975 | McMillin | 62/177 |
| 3,934,759 A | * | 1/1976 | Giannella et al. | 222/129.1 |
| 3,961,494 A | * | 6/1976 | Schaefer et al. | 62/73 |
| 4,836,420 A | * | 6/1989 | Kromrey | 222/148 |
| 5,433,084 A | * | 7/1995 | Kaiser et al. | 62/306 |
| 5,473,909 A | * | 12/1995 | Kateman et al. | 62/306 |
| 5,727,713 A | * | 3/1998 | Kateman et al. | 222/145.6 |
| 5,758,571 A | * | 6/1998 | Kateman et al. | 99/455 |
| 5,799,832 A | * | 9/1998 | Mayo | 222/135 |
| 6,698,228 B2 | * | 3/2004 | Kateman et al. | 62/346 |
| 7,131,279 B2 | * | 11/2006 | Kateman et al. | 62/71 |
| 7,290,682 B2 | * | 11/2007 | Harra | 222/146.6 |

* cited by examiner

*Primary Examiner*—Frederick C. Nicolas
(74) *Attorney, Agent, or Firm*—Eugene S. Indyk

(57) ABSTRACT

An apparatus for dispensing soft serve frozen food product, such as soft serve ice cream and the like, provides the ability to select the fat content or other characteristic of the ice cream dispensed from the machine.

13 Claims, 56 Drawing Sheets

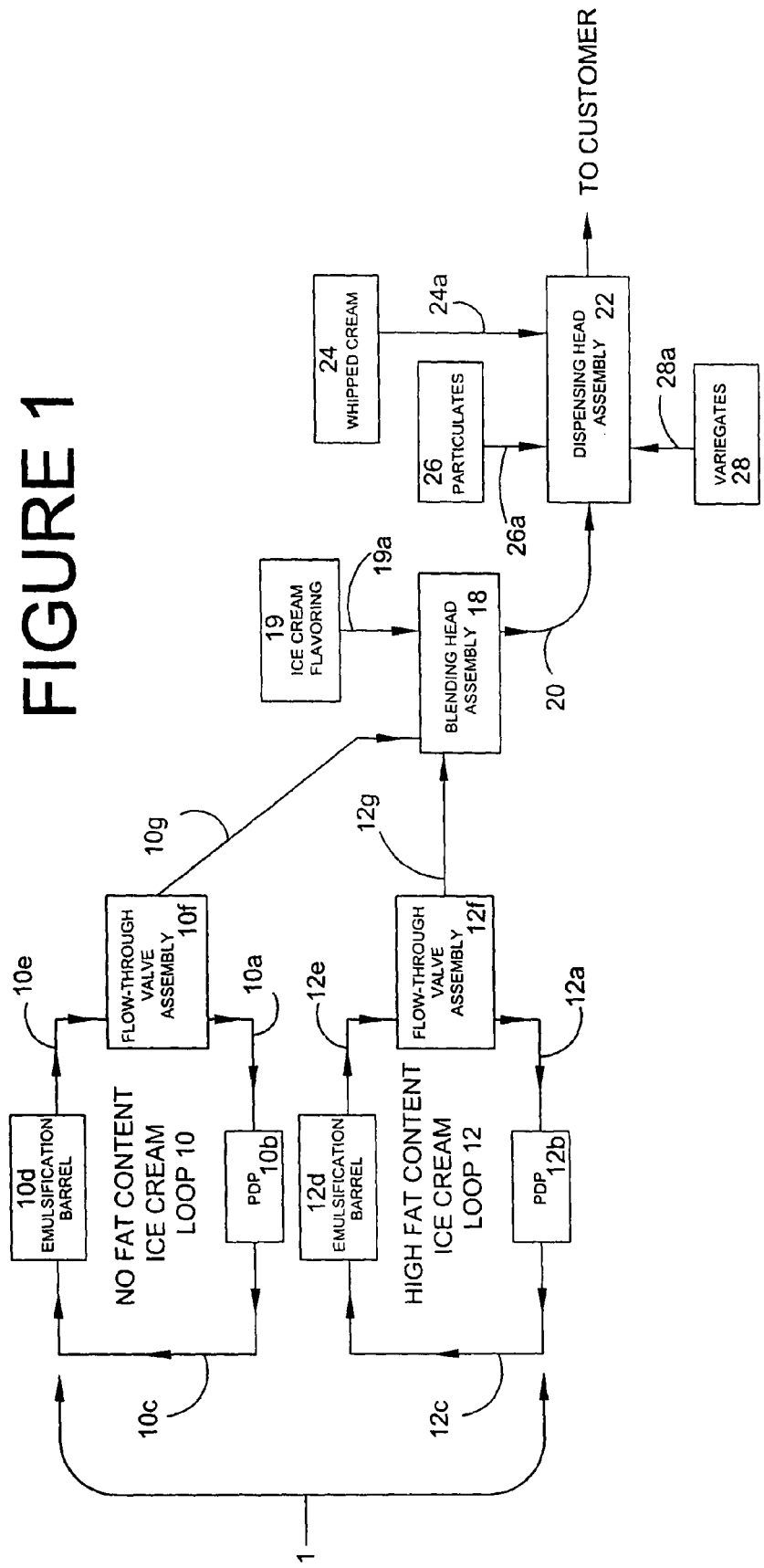

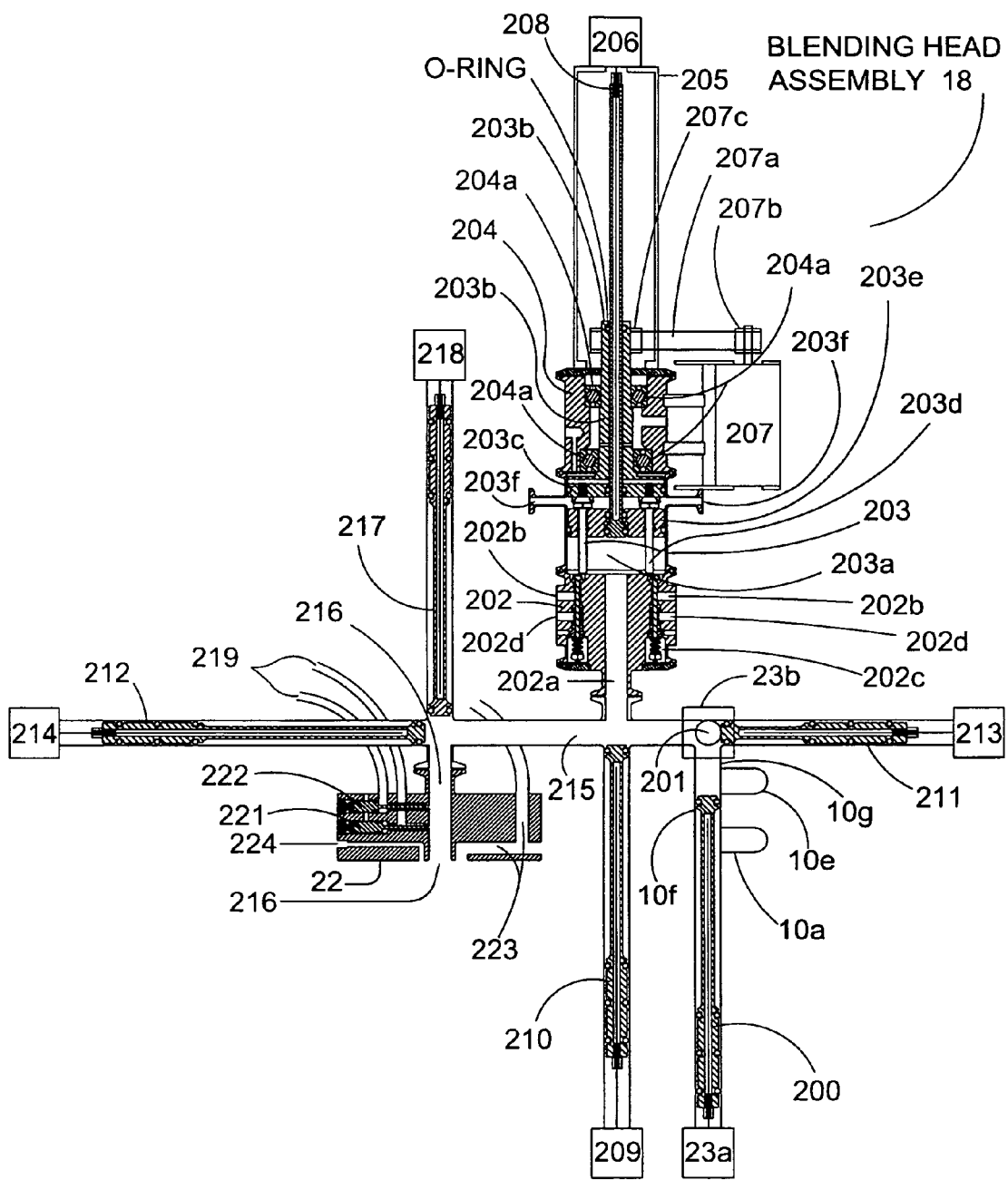

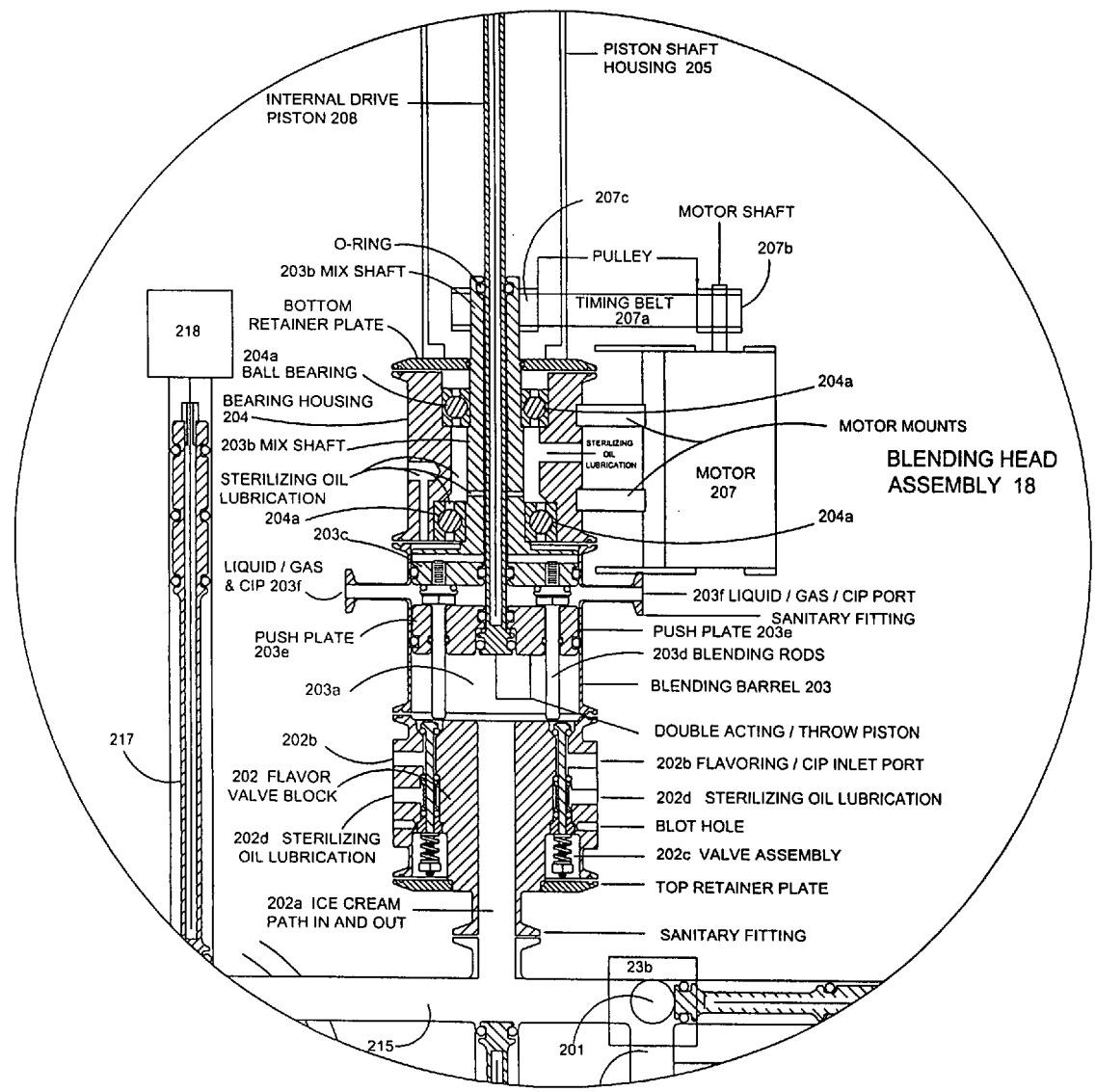

FIGURE 1BB
BLENDING BARREL
TOP VIEW
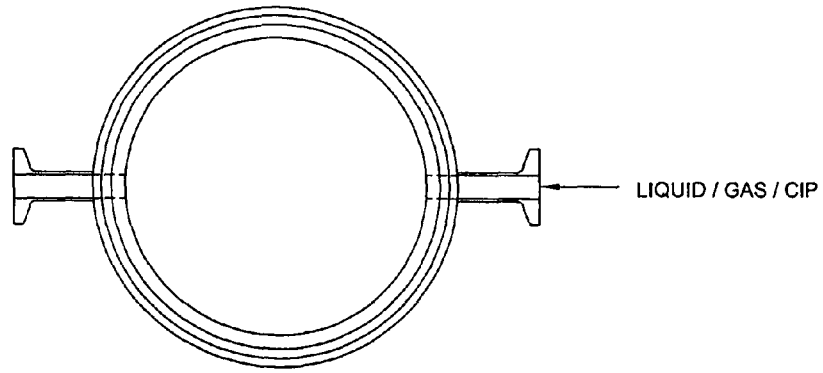
SIDE VIEW
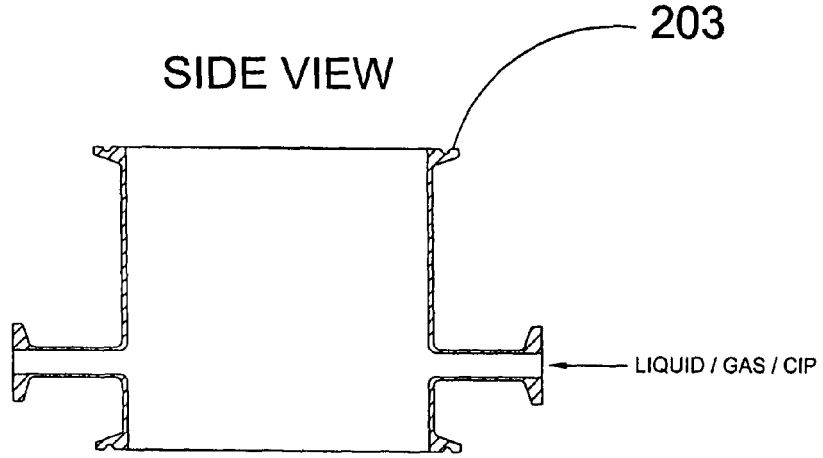
BOTTOM VIEW
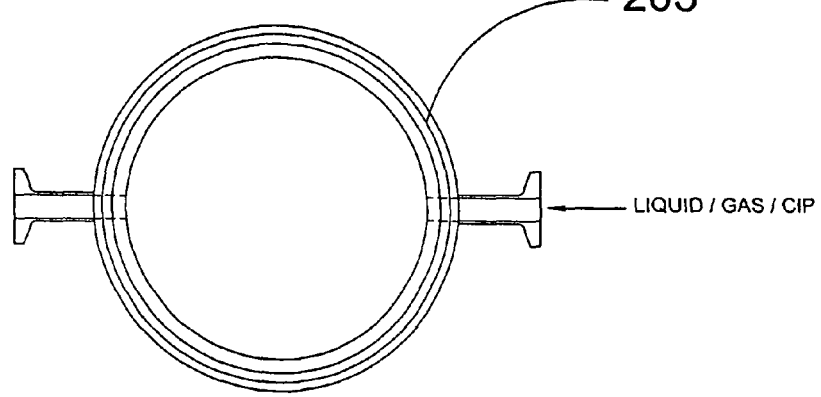

TOP RETAINER PLATE

INSIDE VIEW

O-RING

SIDE VIEW

OUTSIDE VIEW

FIGURE 1BD
BOTTOM RETAINER PLATE
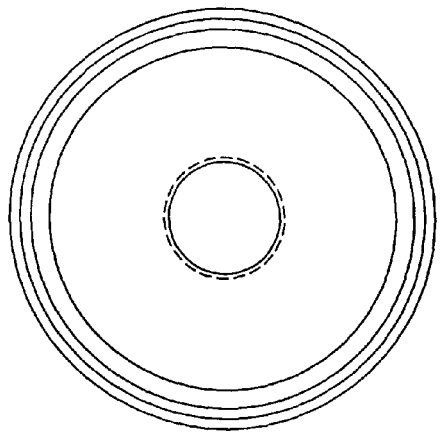
INSIDE VIEW
O-RING
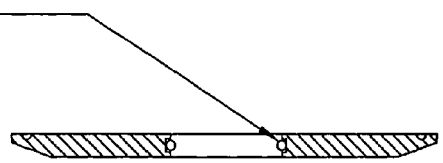
SIDE VIEW
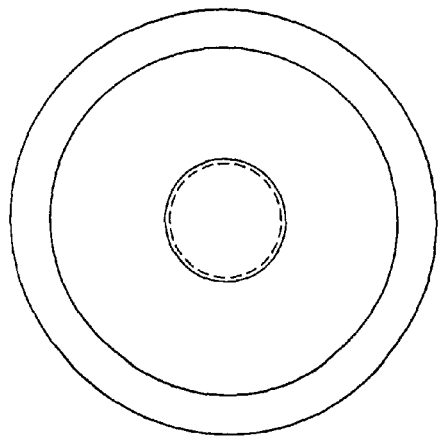
OUTSIDE VIEW

BLENDING HEAD PUSH PLATE

FIGURE 1BF
BLENDING HEAD
BLENDING RODS
TOP VIEW
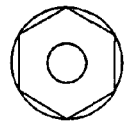
SIDE VIEW
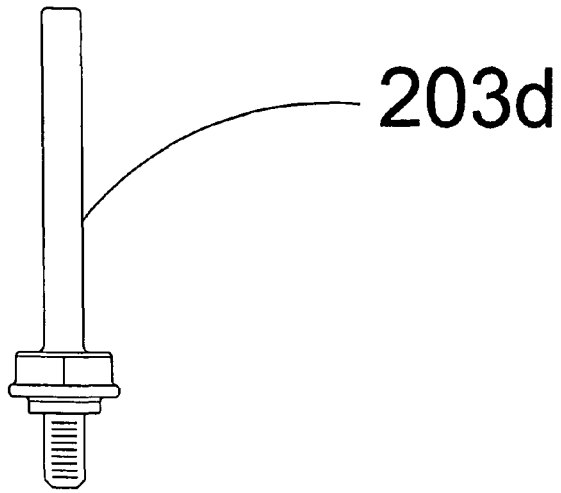
203d
BOTTOM VIEW
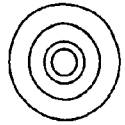

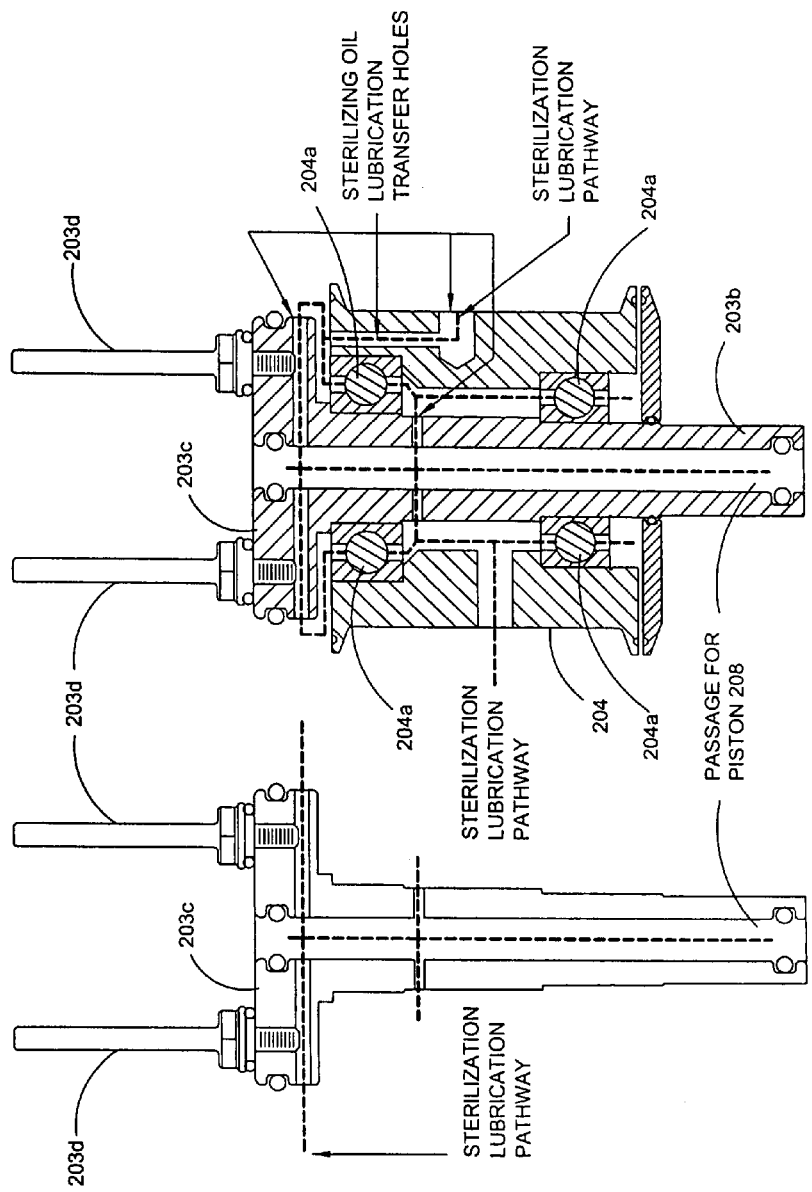

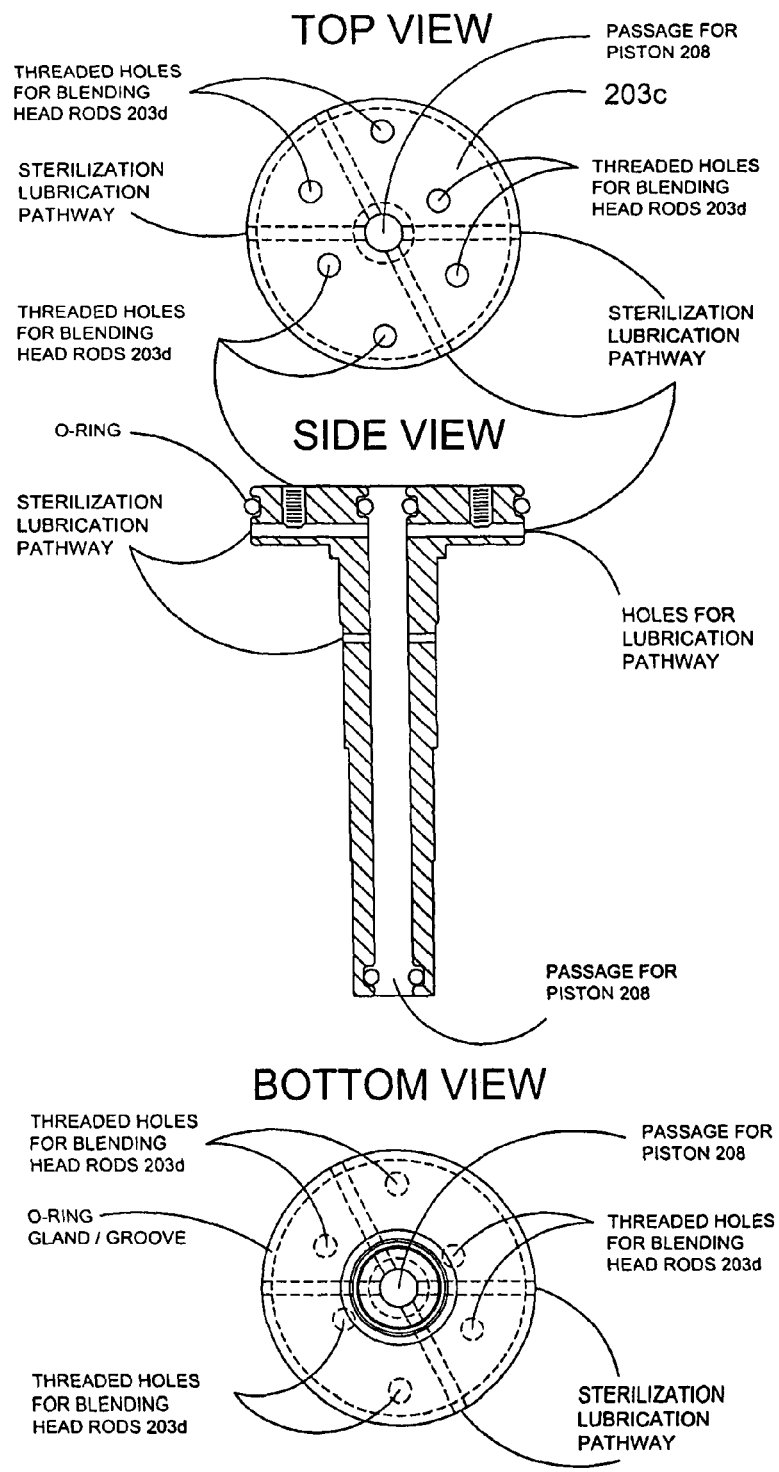

FIGURE 1 BI
BLENDING HEAD BEARING HOUSING
TOP VIEW
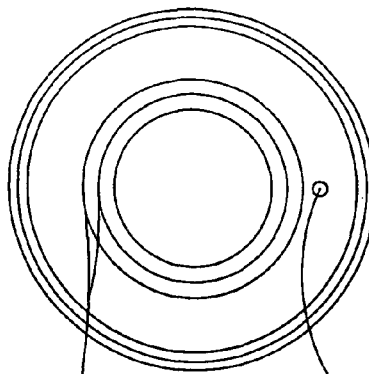
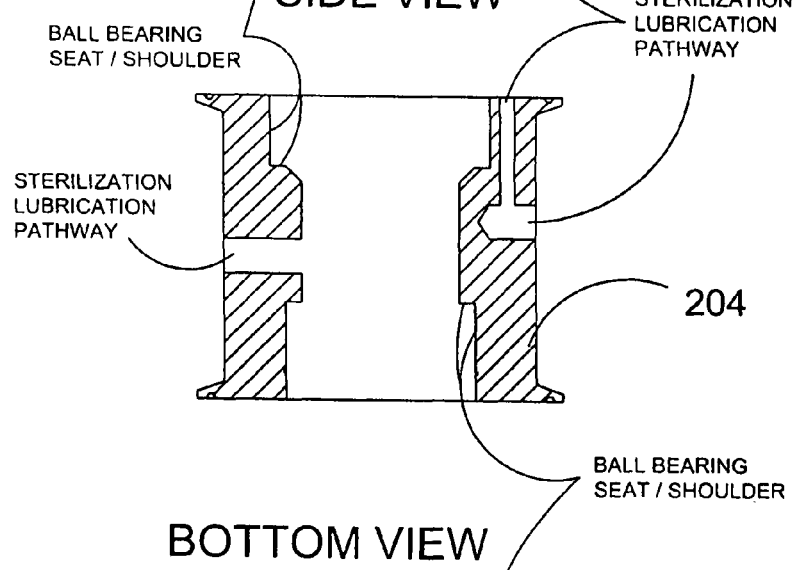
SIDE VIEW
BALL BEARING SEAT / SHOULDER
STERILIZATION LUBRICATION PATHWAY
STERILIZATION LUBRICATION PATHWAY
204
BALL BEARING SEAT / SHOULDER
BOTTOM VIEW
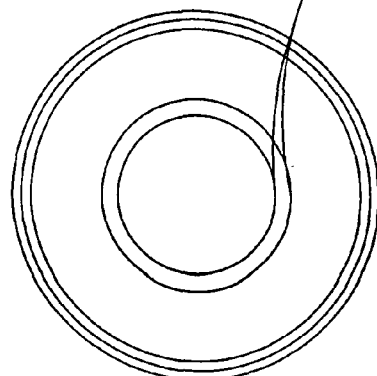

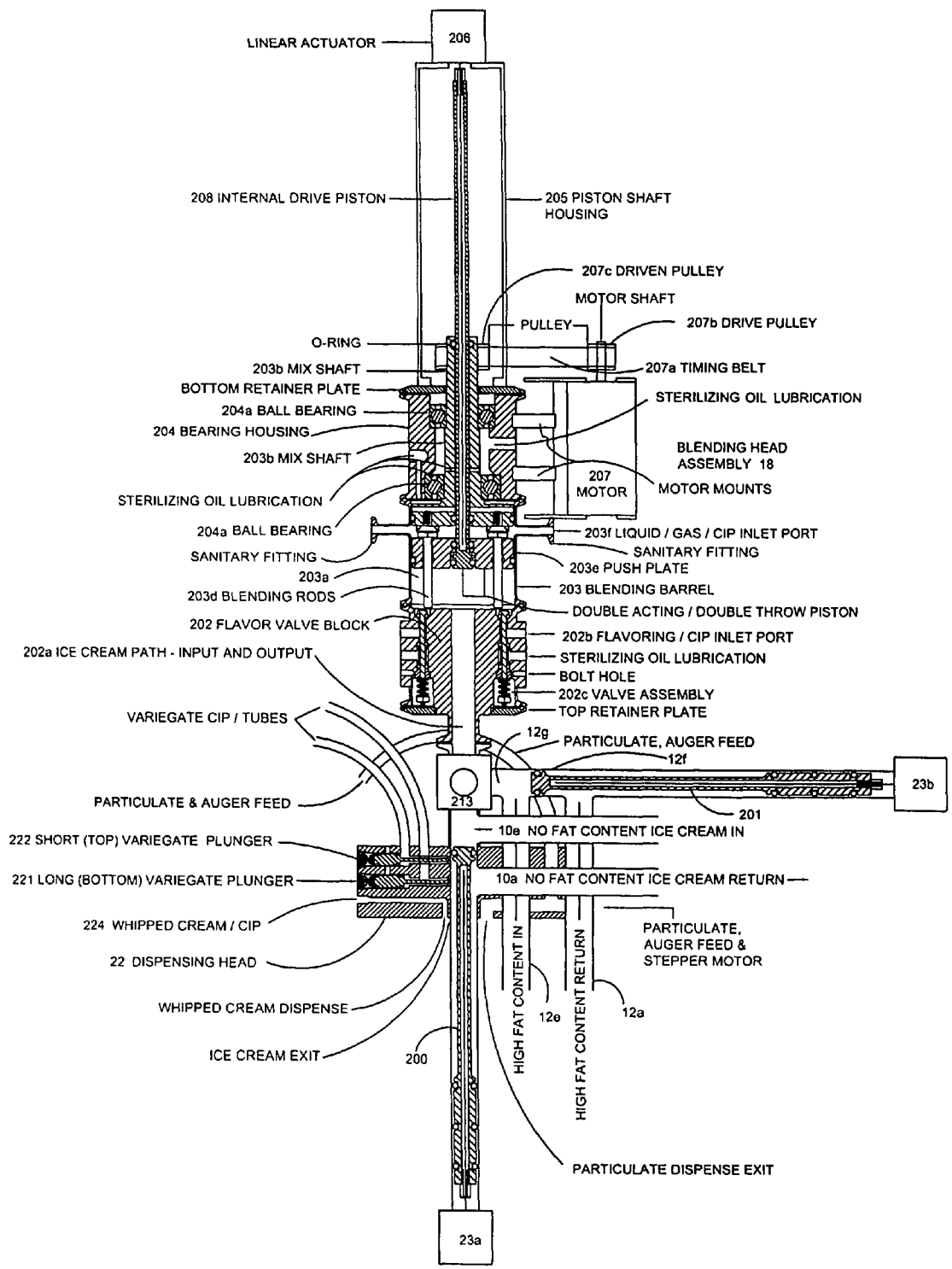
FIGURE 1C SIDE VIEW

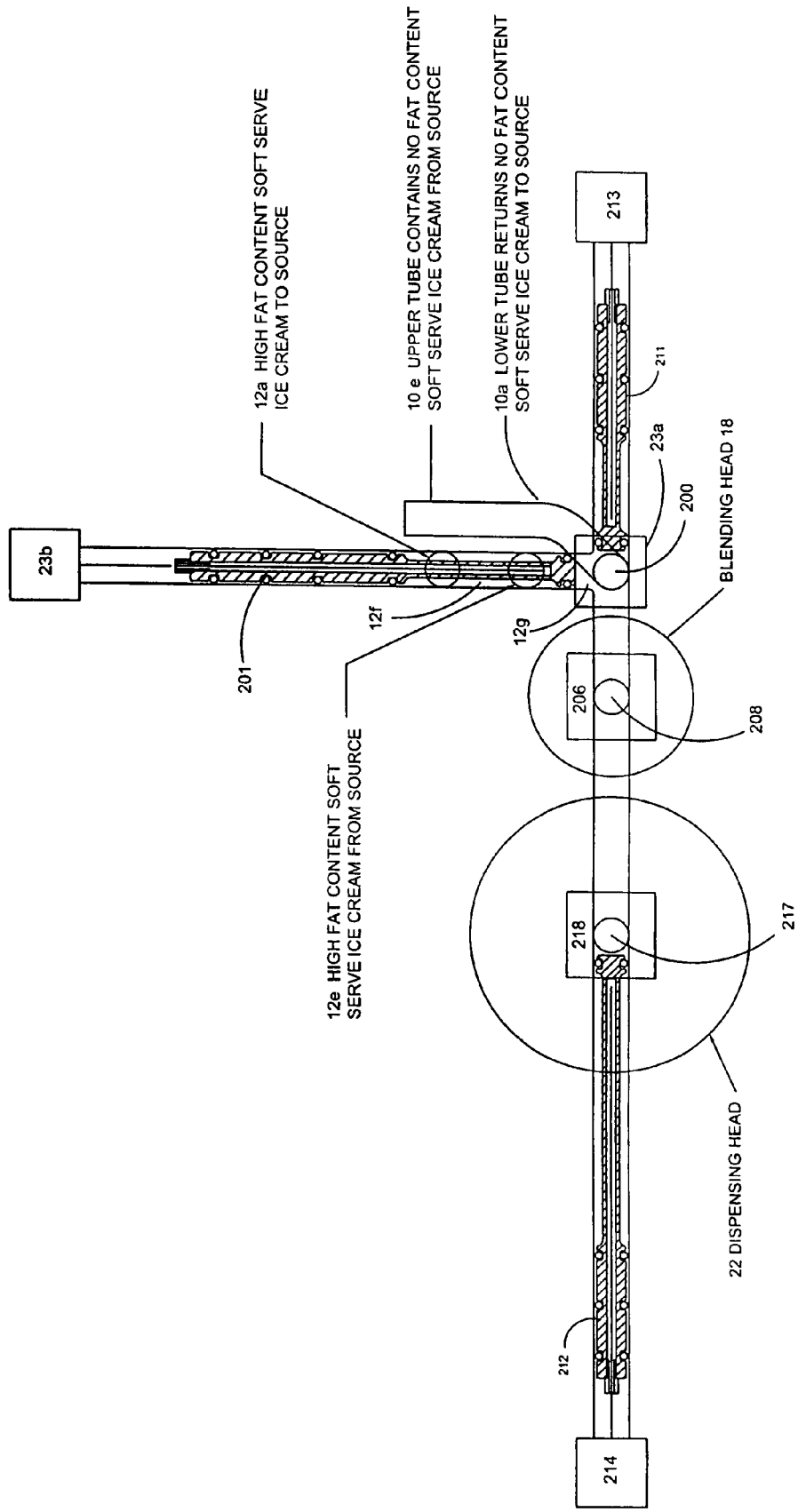

TOP VIEW   202 FLAVOR VALVE BLOCK

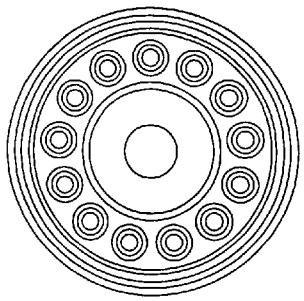

FIGURE 1F

SIDE VIEW

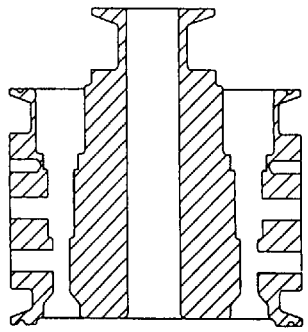

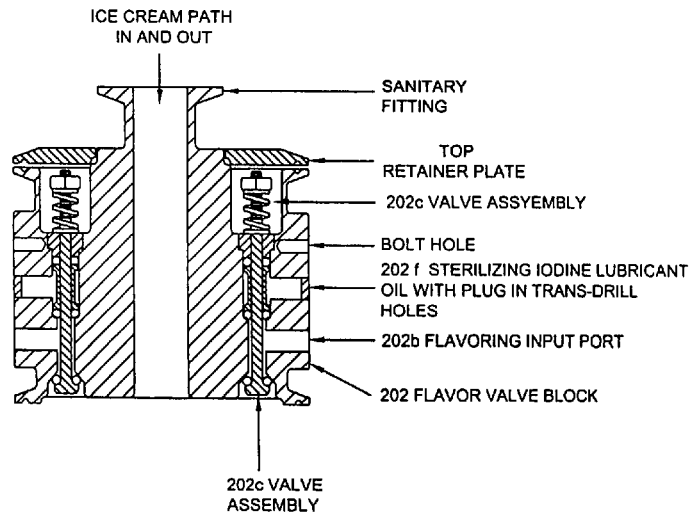

- ICE CREAM PATH IN AND OUT
- SANITARY FITTING
- TOP RETAINER PLATE
- 202c VALVE ASSYEMBLY
- BOLT HOLE
- 202 f STERILIZING IODINE LUBRICANT OIL WITH PLUG IN TRANS-DRILL HOLES
- 202b FLAVORING INPUT PORT
- 202 FLAVOR VALVE BLOCK
- 202c VALVE ASSEMBLY

BOTTOM VIEW

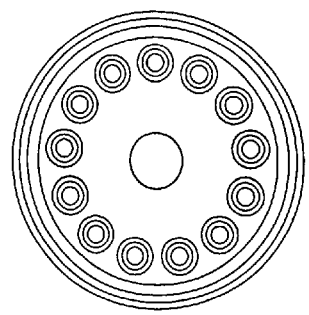

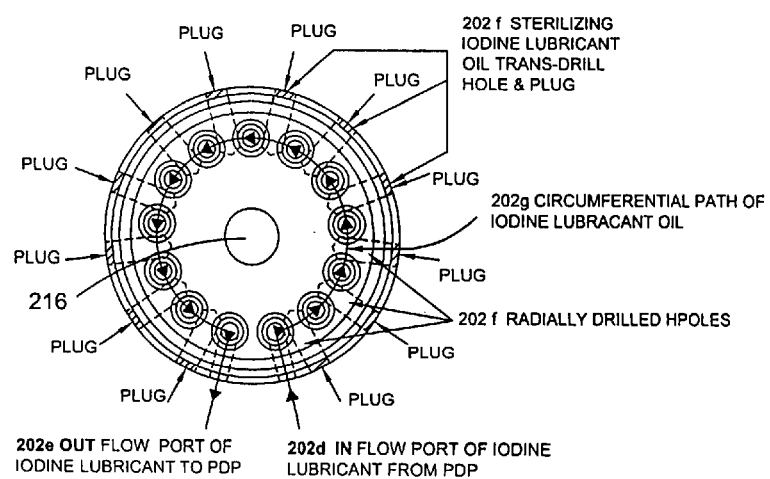

- PLUG
- 202 f STERILIZING IODINE LUBRICANT OIL TRANS-DRILL HOLE & PLUG
- 202g CIRCUMFERENTIAL PATH OF IODINE LUBRACANT OIL
- 202 f RADIALLY DRILLED HPOLES
- 216
- 202e OUT FLOW PORT OF IODINE LUBRICANT TO PDP
- 202d IN FLOW PORT OF IODINE LUBRICANT FROM PDP

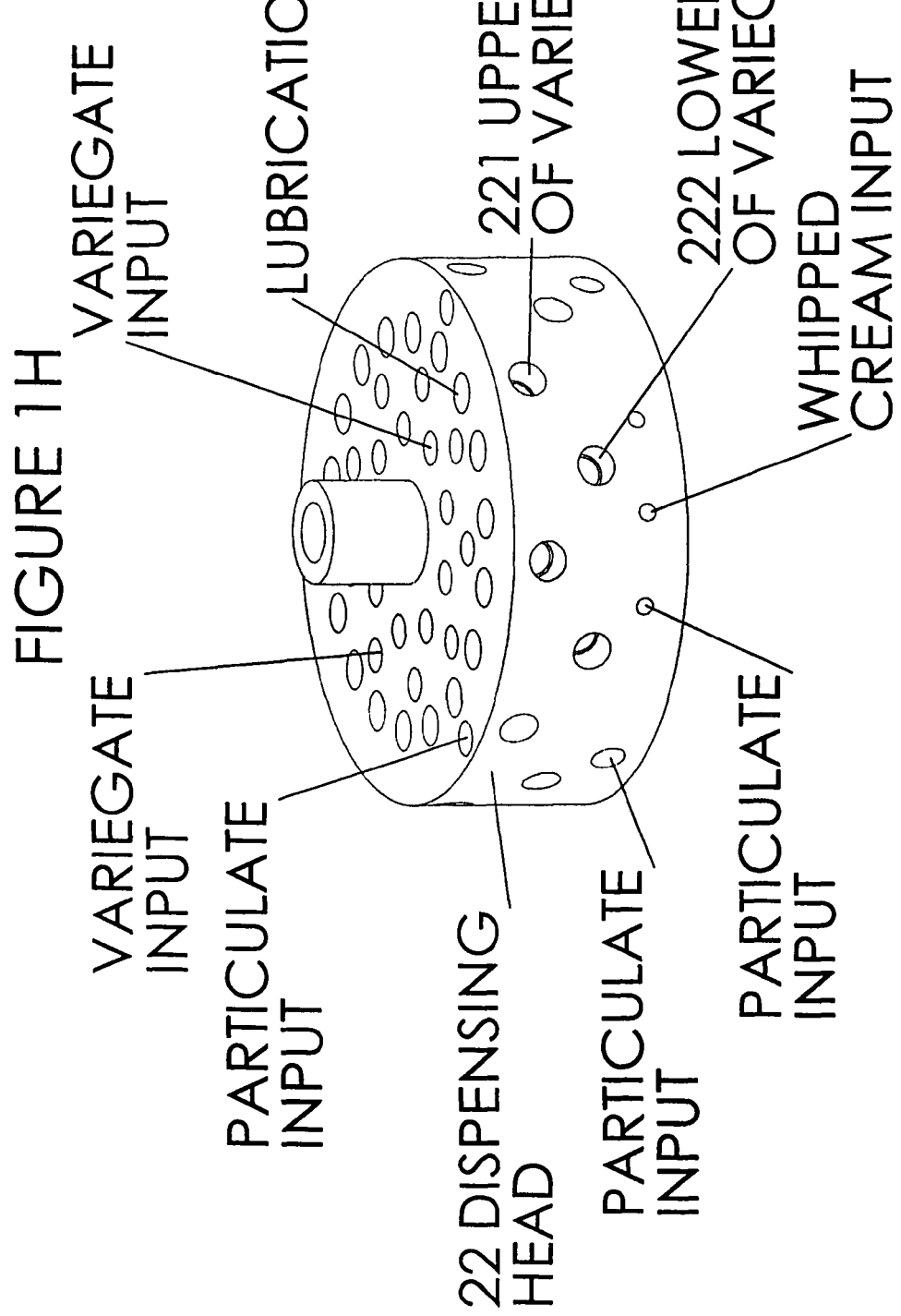

FIGURE 1HE
VARIEGATE PISTONS FOR THE MULTI-DISPENSING HEAD
FROM LAYER 221 LONG (BOTTOM) VARIEGATE PLUNGER
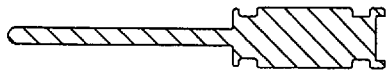
FROM LAYER 222 SHORT (TOP) VARIEGATE PLUNGER

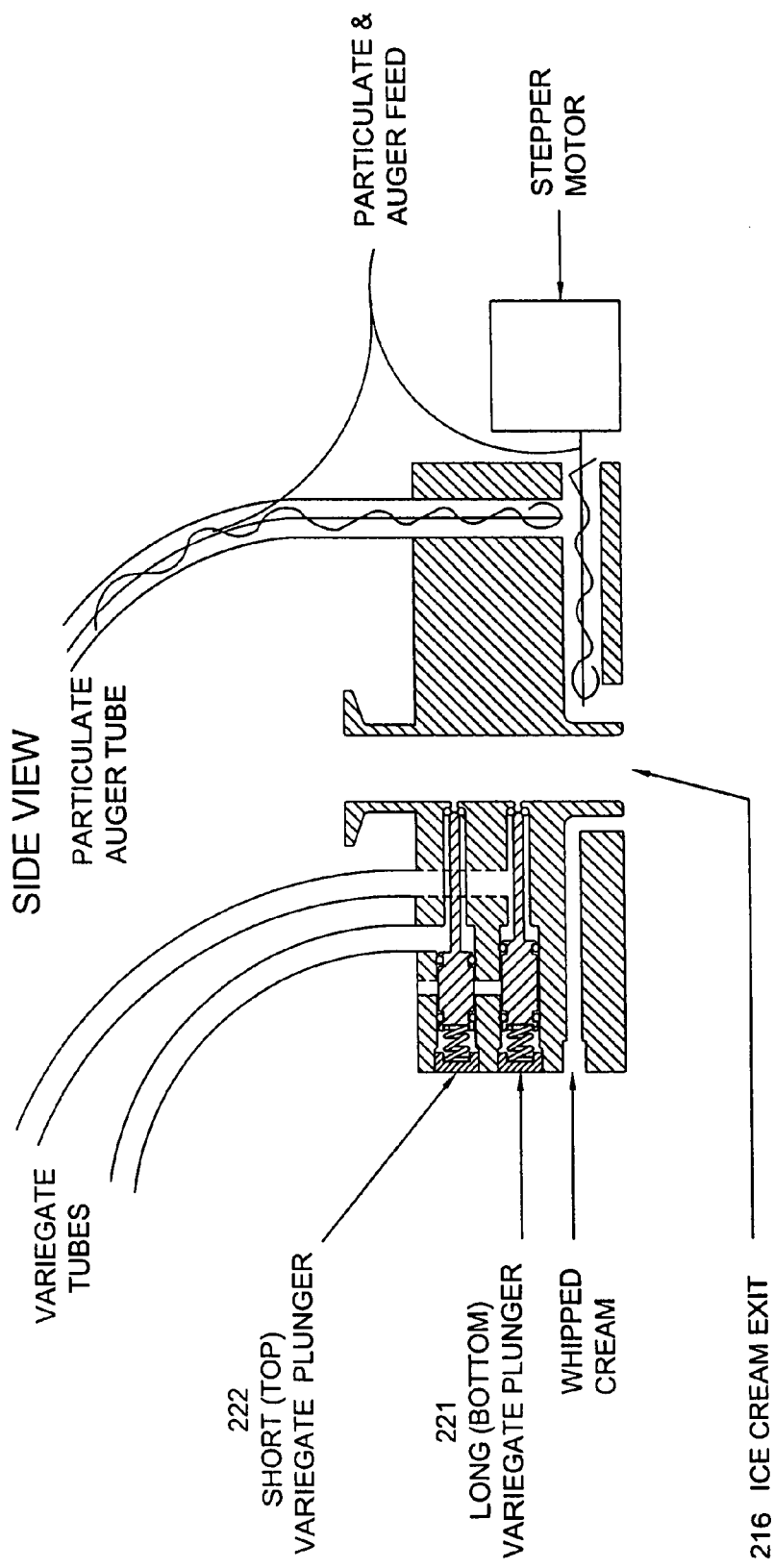

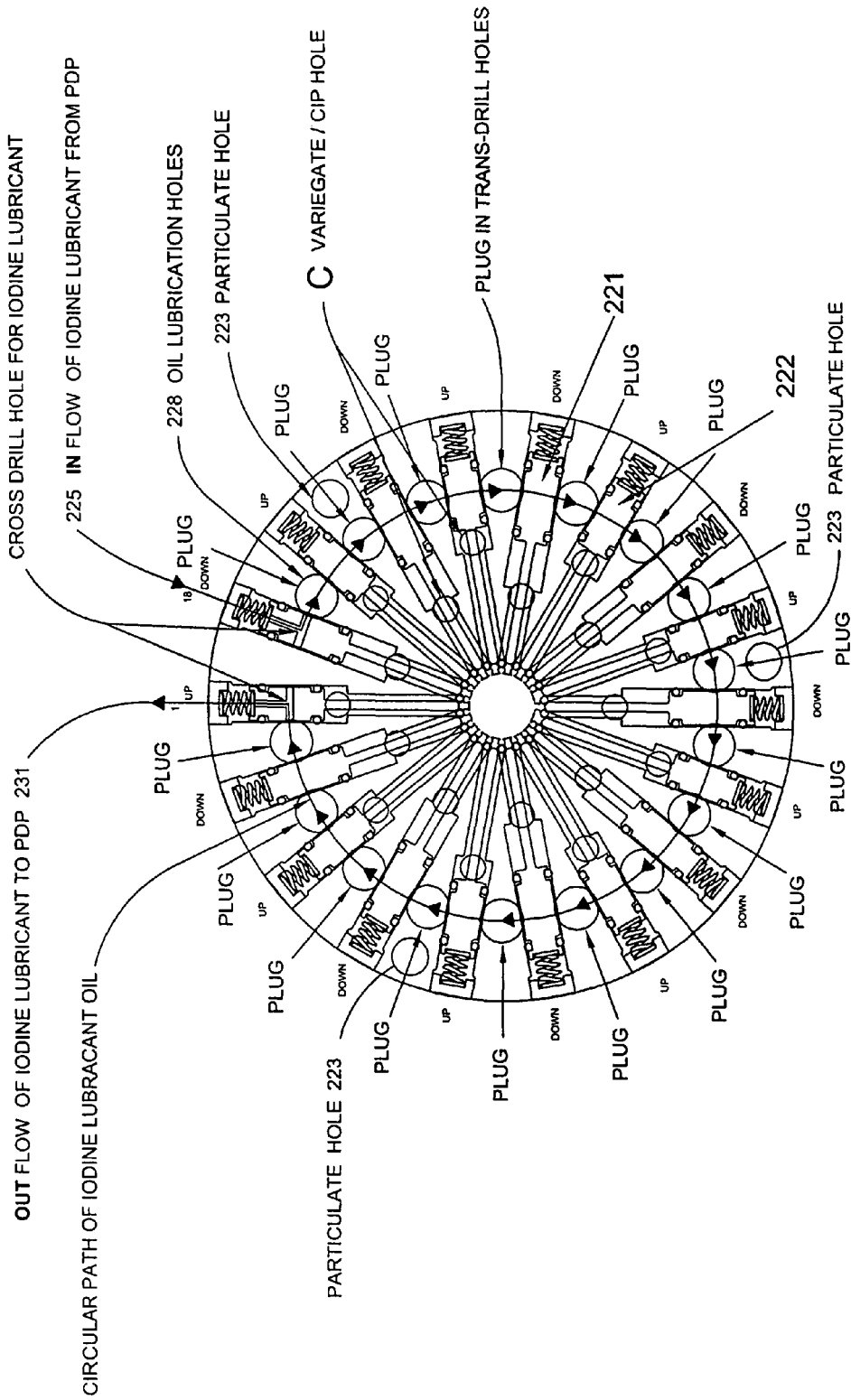
FIGURE 1J  TOP VIEW VARIEGATE-CIP PISTON POSITIONS PARTICULATE HOLES, & OIL LUBRICATION HOLES FOR THE MULTI-DISPENSING HEAD #22

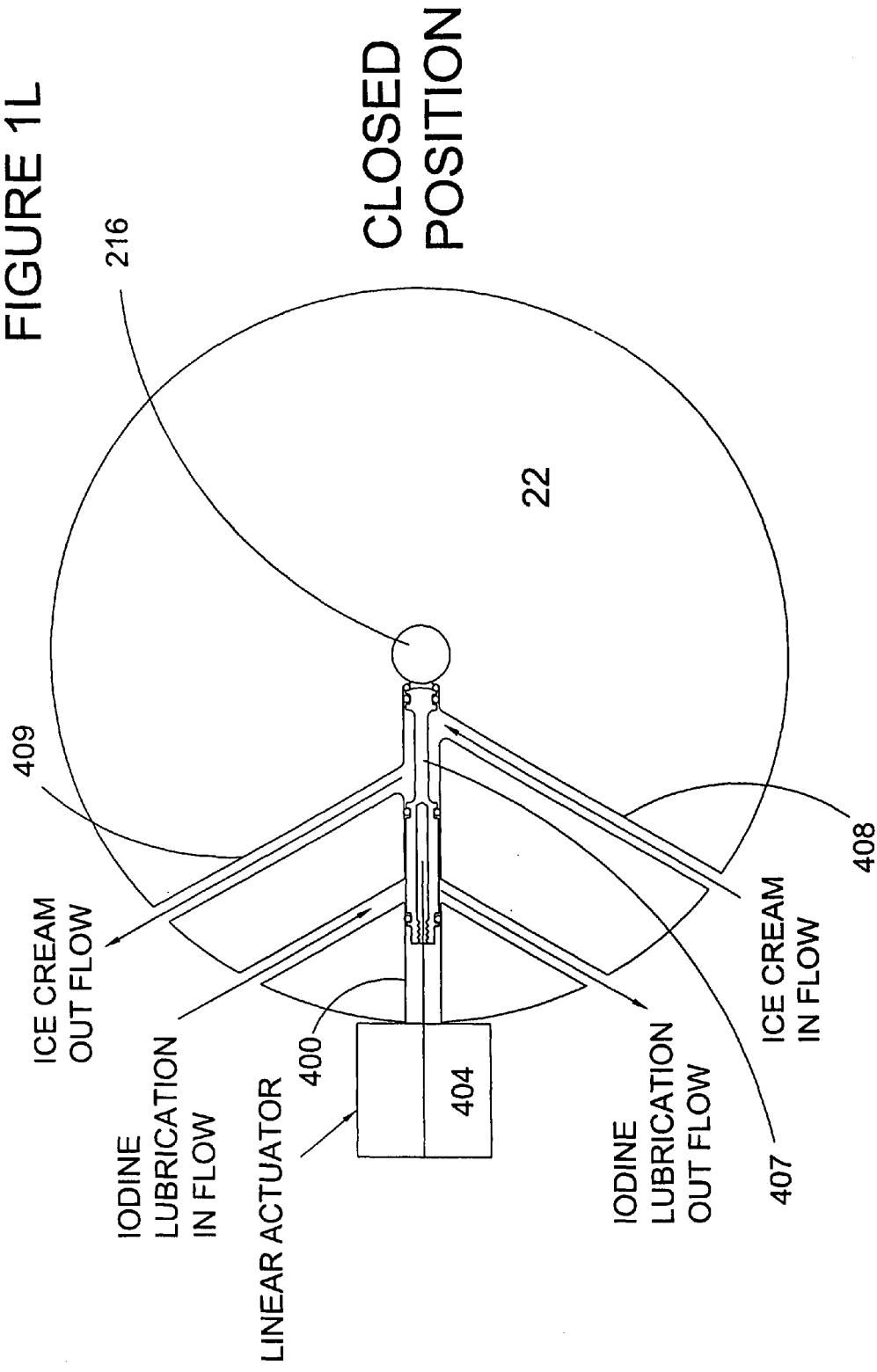

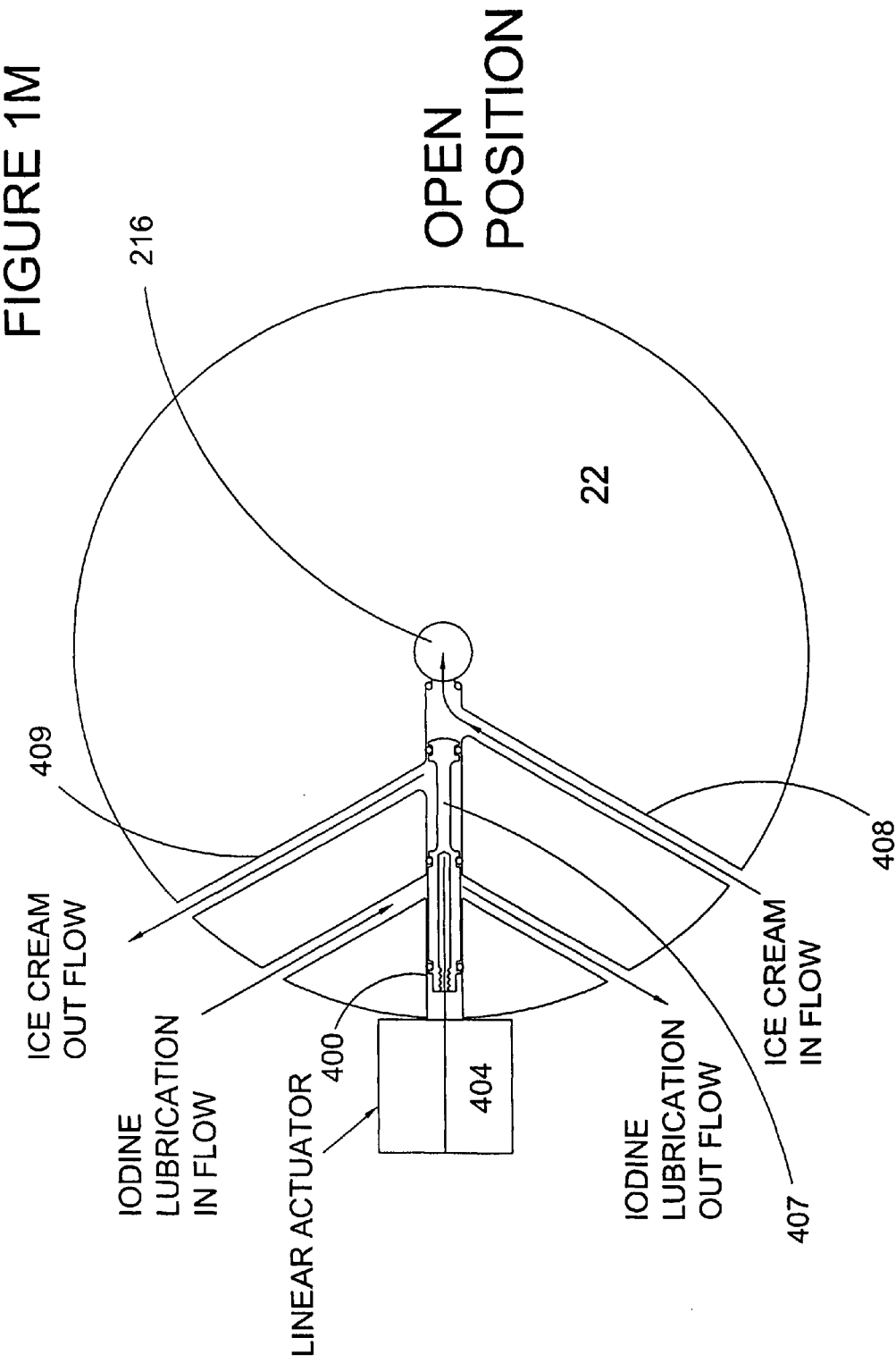

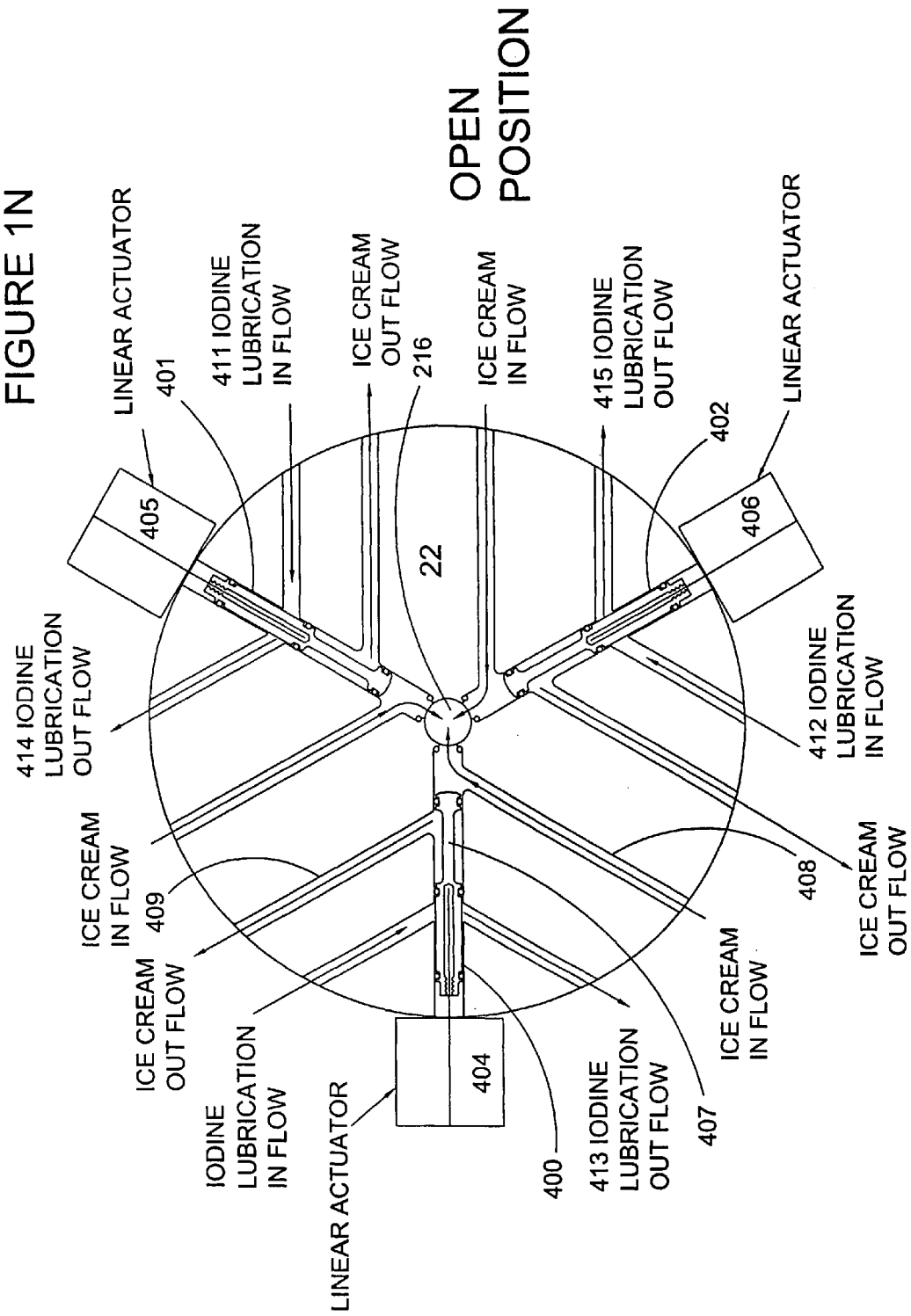

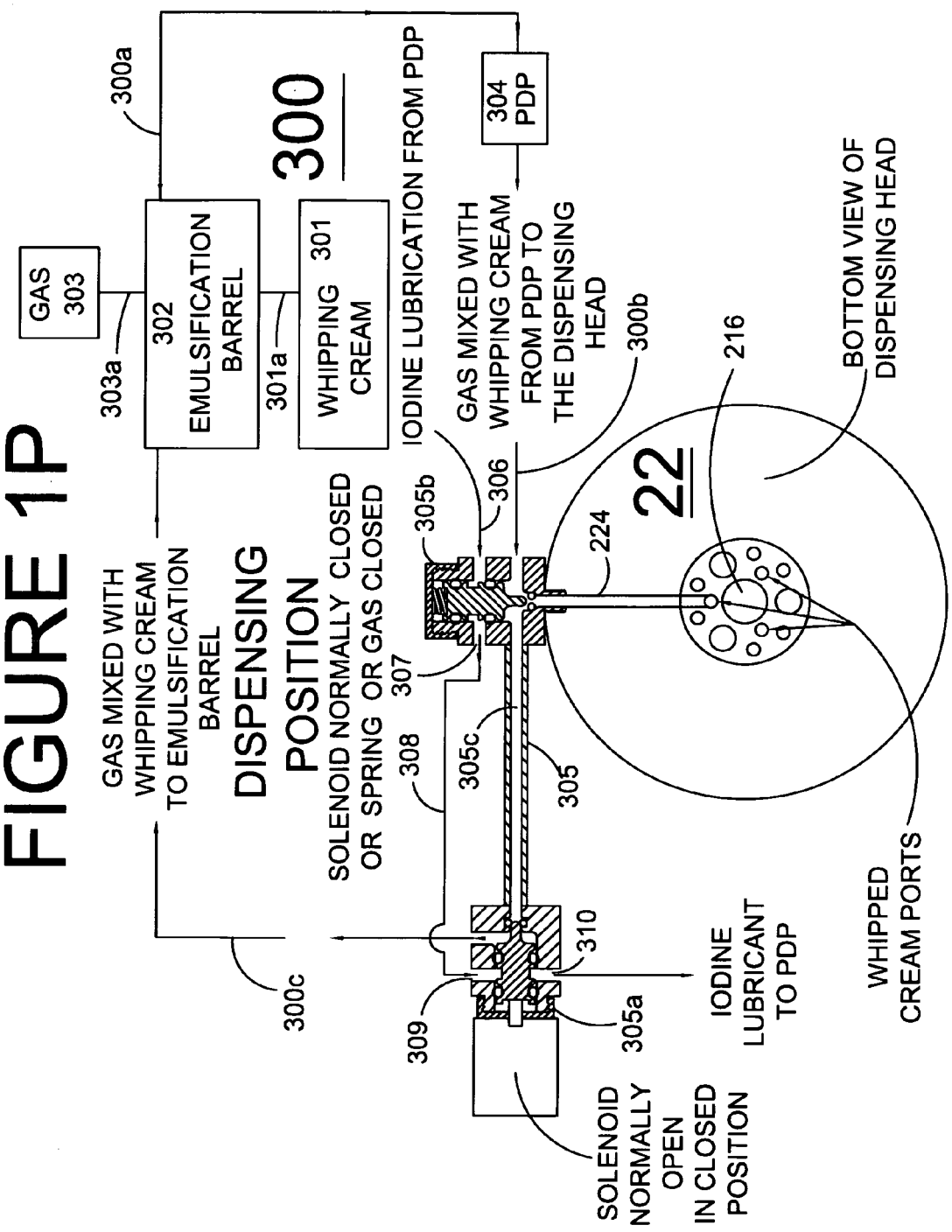

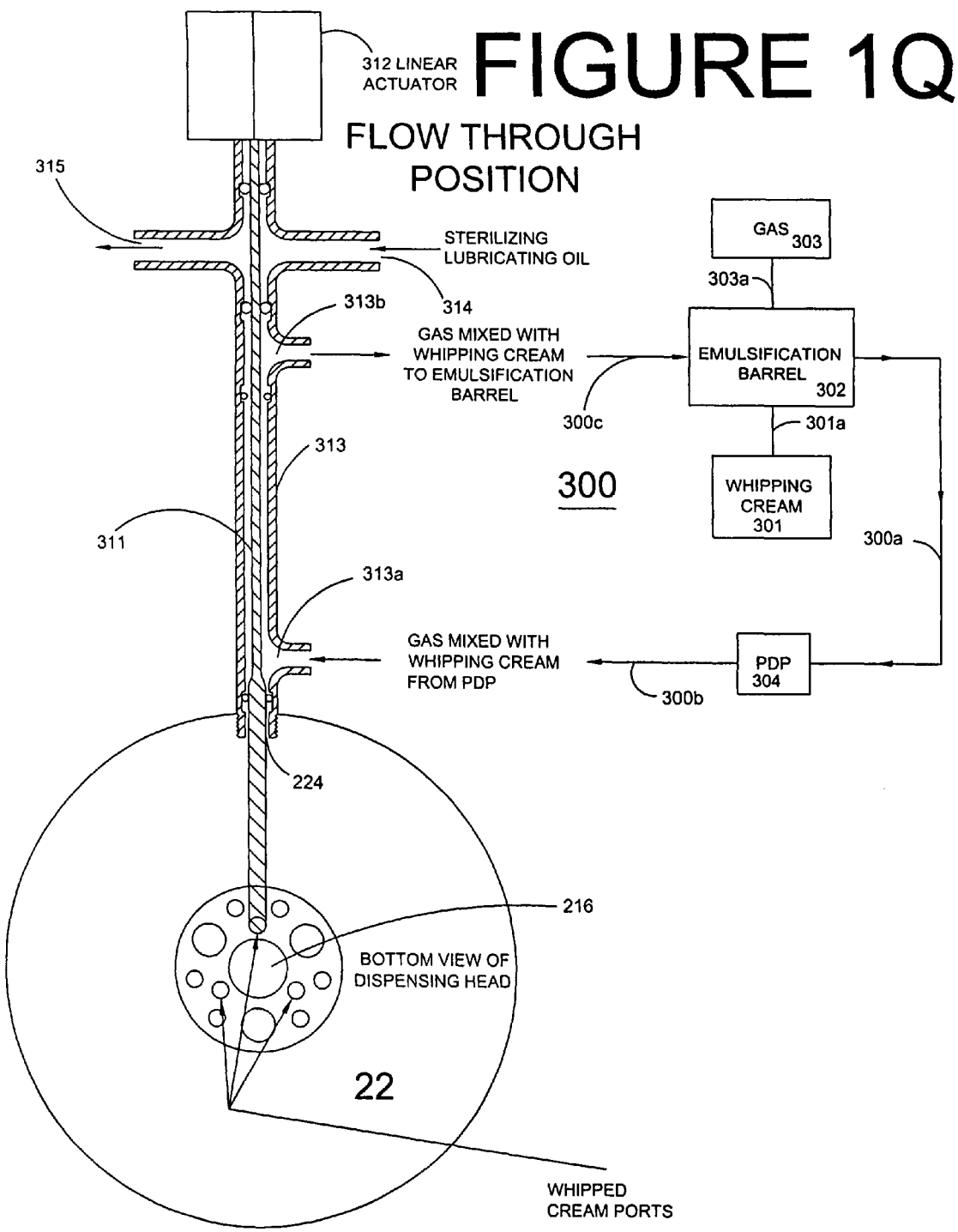

FIGURE 2B  TRANSFER PIPE SYSTEM
TOP VIEW
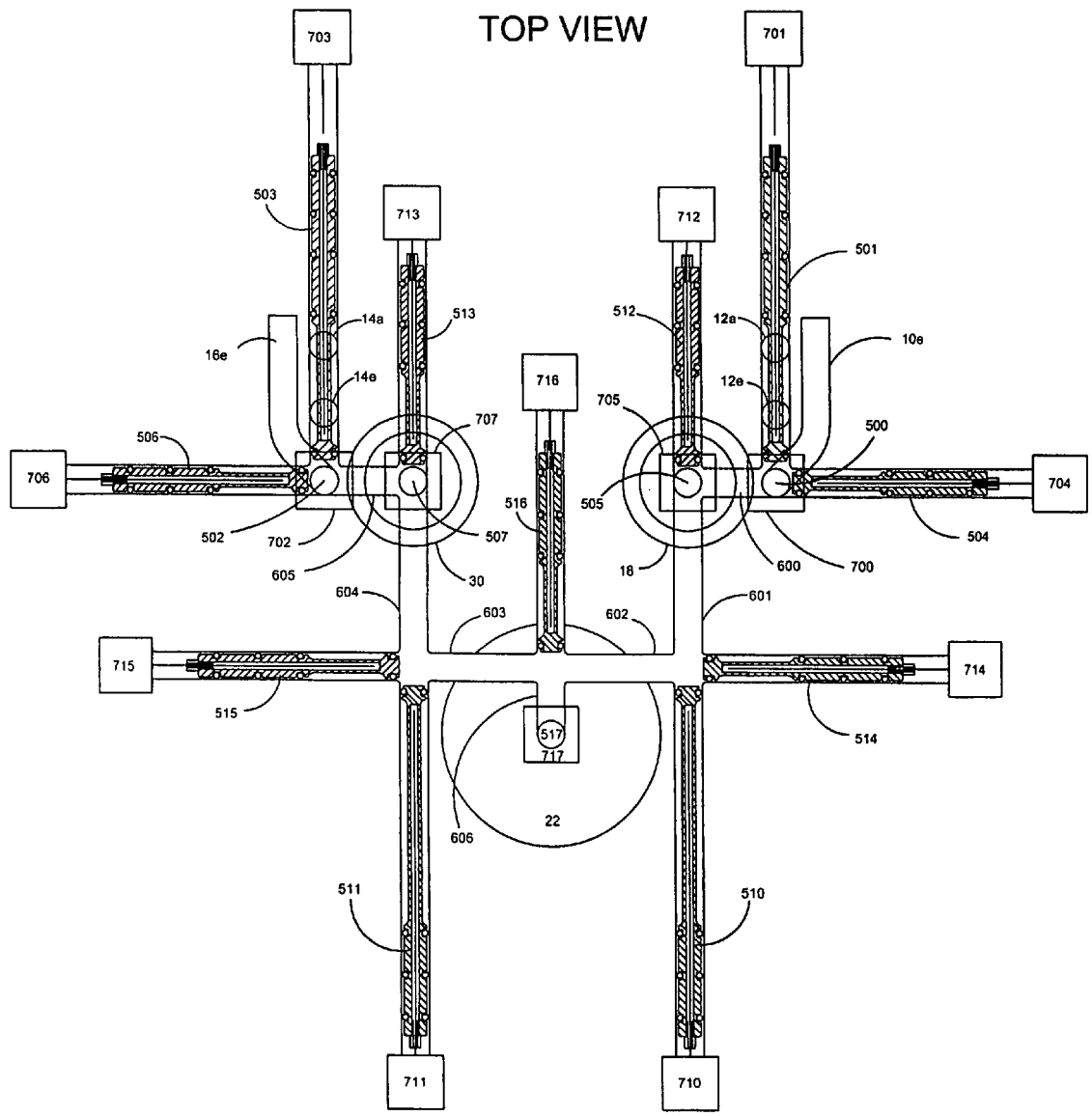

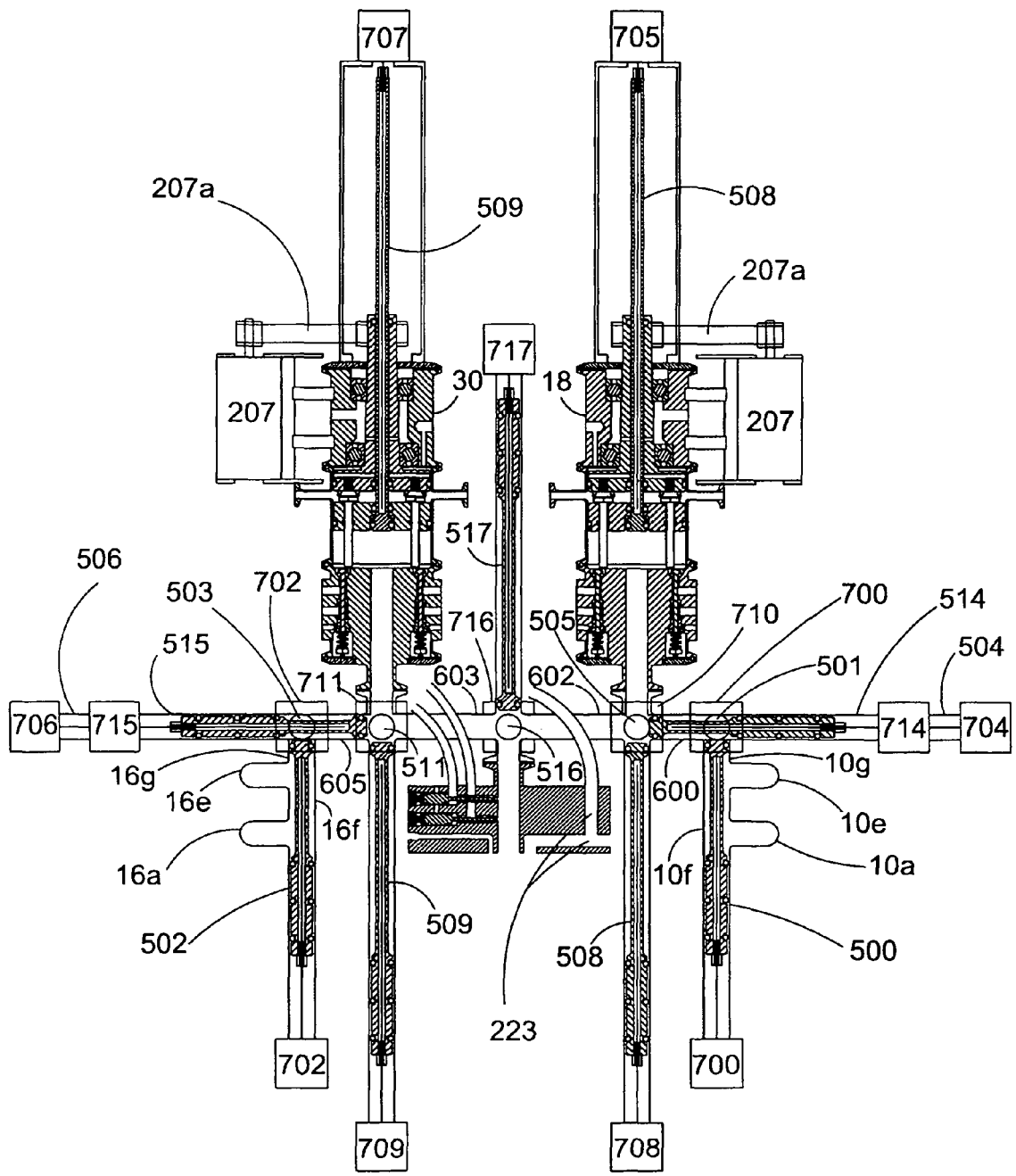
FIGURE 2C FRONT VIEW

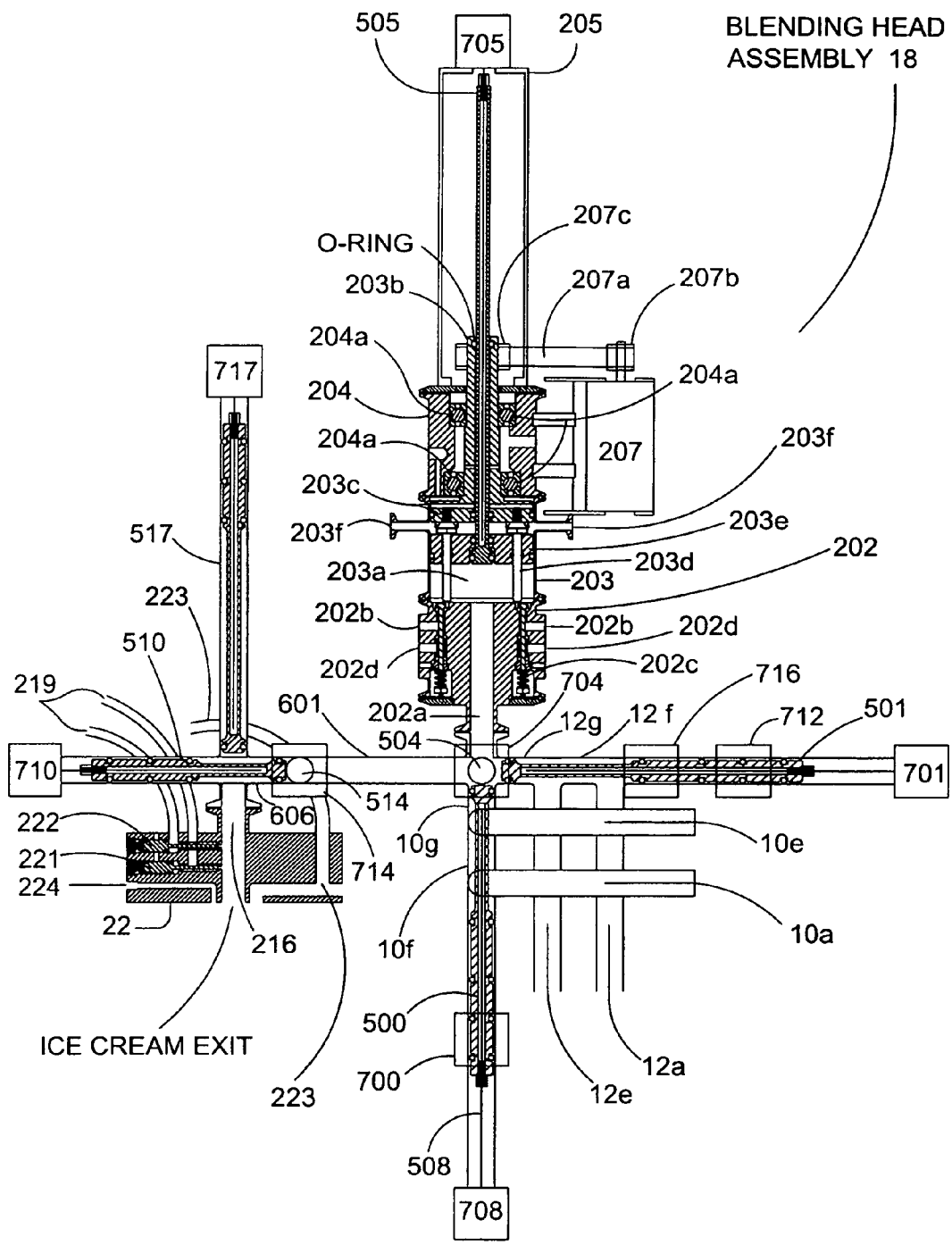
FIGURE 2D RIGHT SIDE VIEW

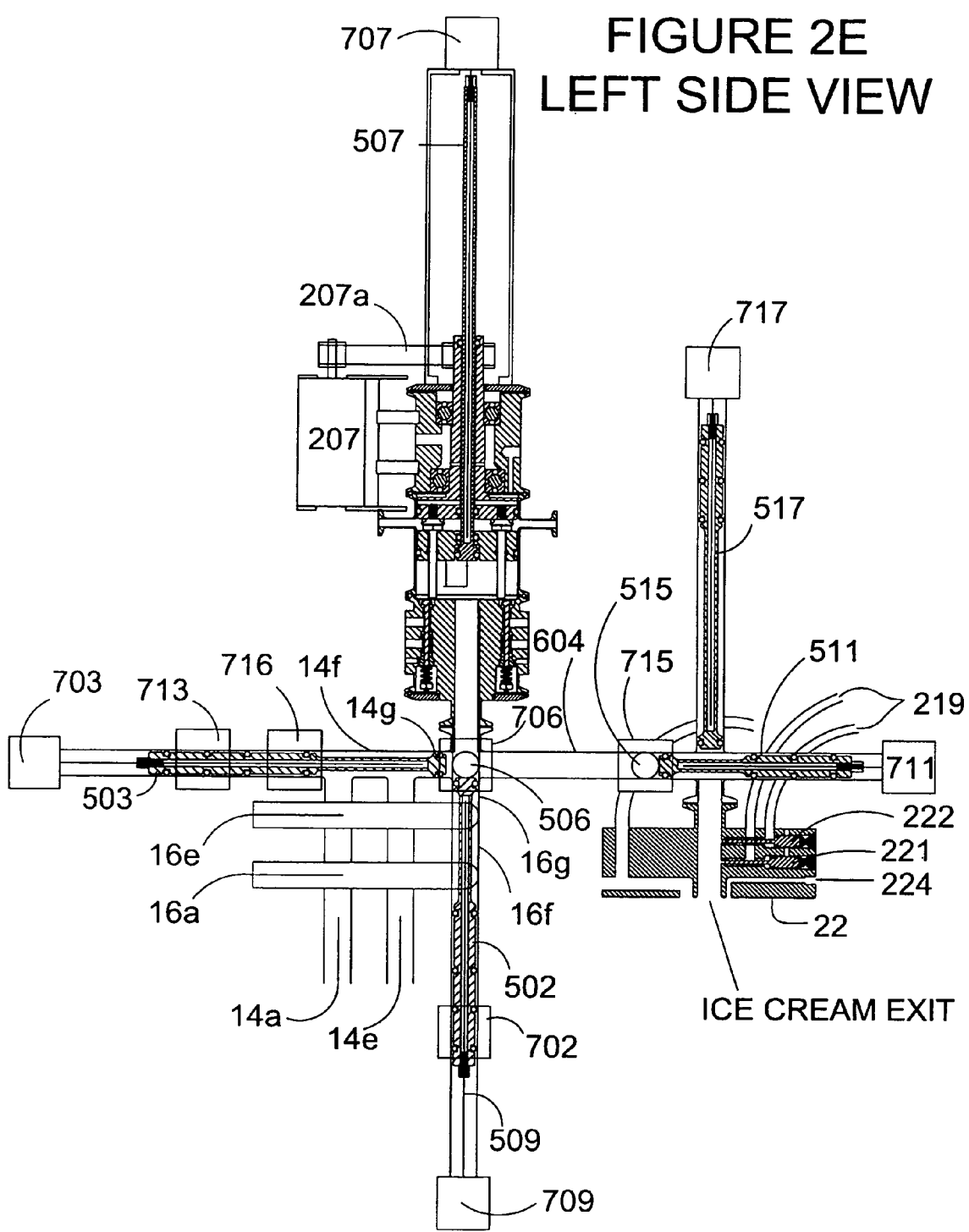

FOUR BLENDING HEADS

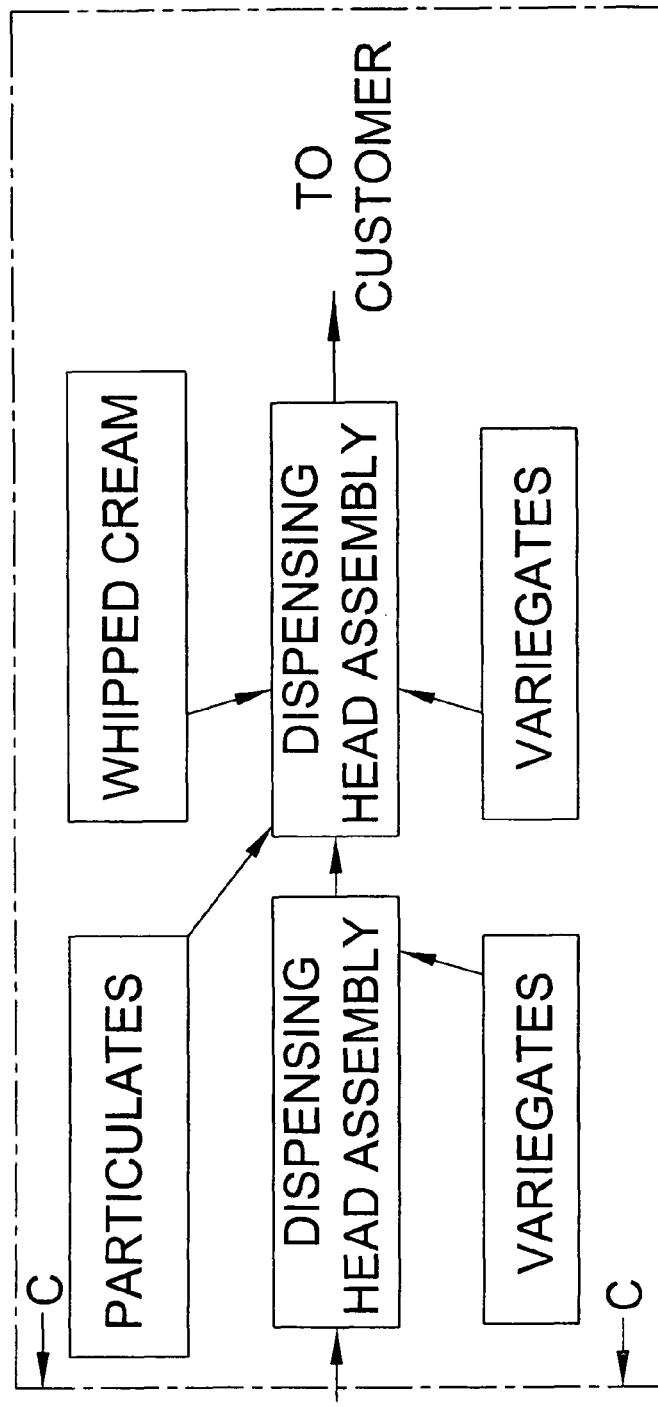

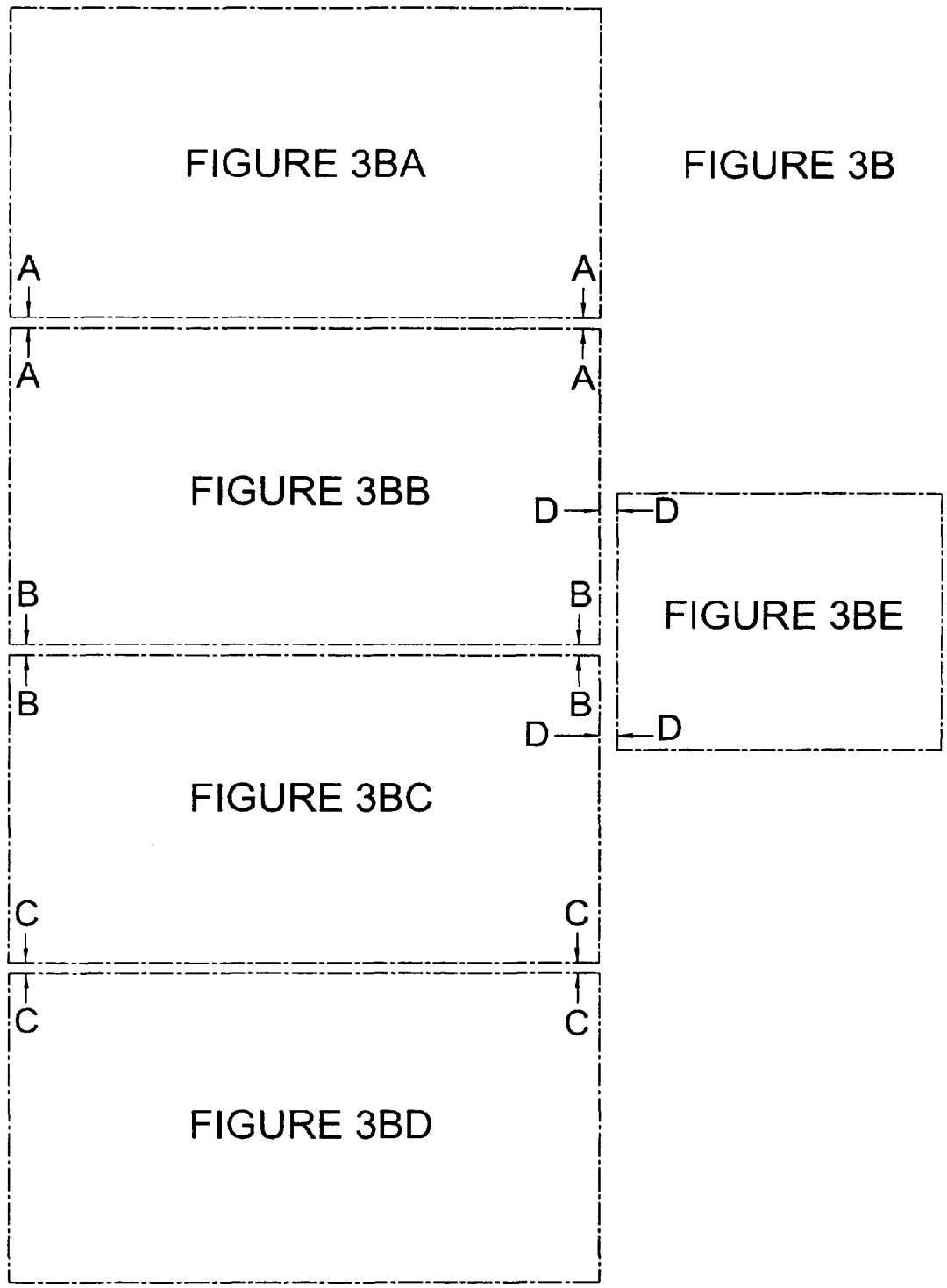

FOOD PROCESSING, FLAVORING AND BLENDING SYSTEM

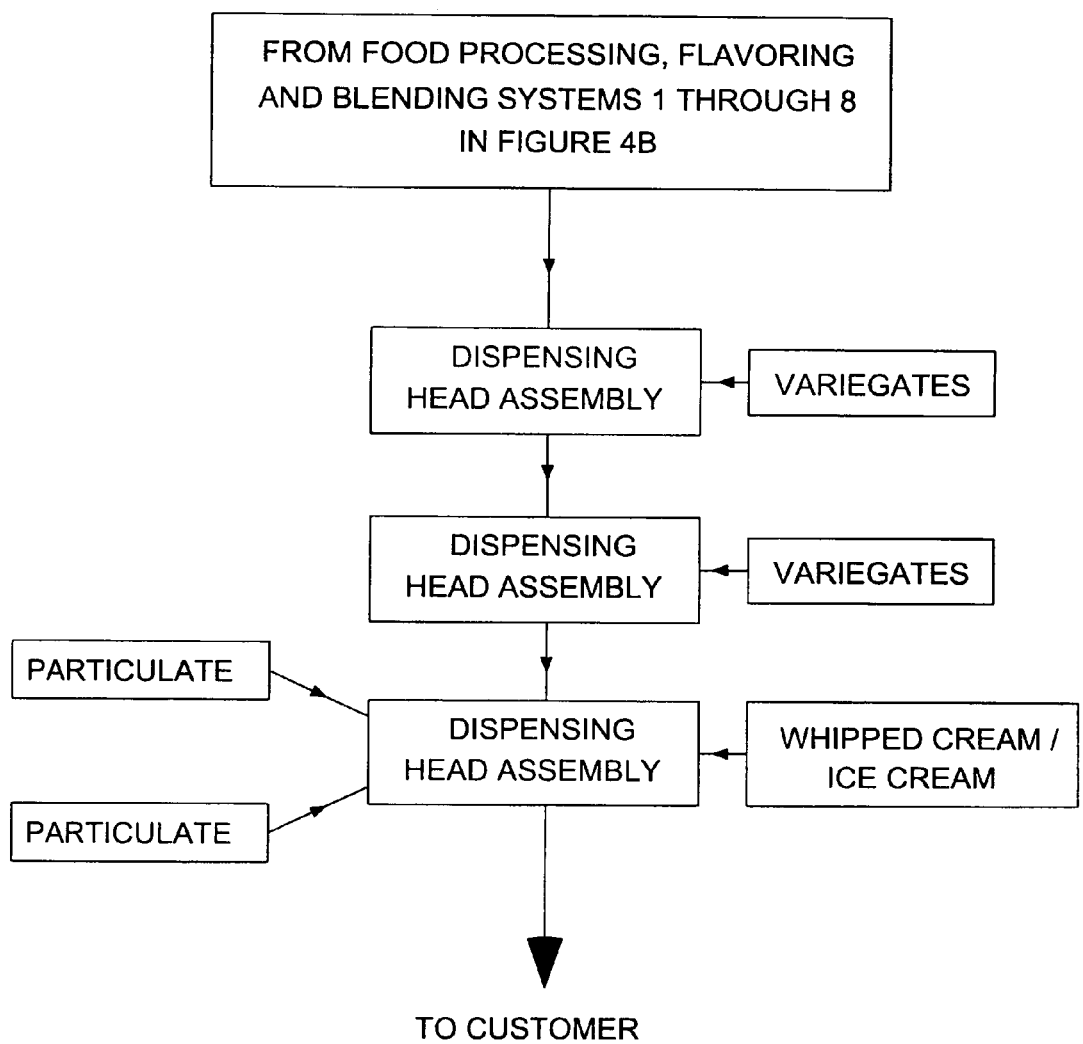

DISPENSING SYSTEM FOR BLENDED FROZEN FOOD COMPOSITIONS

CROSS REFERENCE TO RELATED APPLICATIONS

This application is a continuation of U.S. application Ser. No. 10/965,323 of John Harra, filed Oct. 14, 2004 now U.S. Pat. No. 7,290,682, entitled "IMPROVED DISPENSING SYSTEM FOR BLENDED FROZEN FOOD COMPOSITIONS," which is a continuation-in-part of International Application No. PCT/US2004/011484 of John Harra filed Apr. 13, 2004, entitled "APPARATUS FOR PROCESSING, STORING, AND DISPENSING SOFT SERVE FROZEN FOOD PRODUCT."

Both of the above applications relate to Provisional Application No. 462,700 of John Harra filed Apr. 15, 2003 entitled "Apparatus for making, storing and dispensing soft ice cream and alike [sic]."

Applicant hereby incorporates by reference into this application the entirety of the three applications identified above.

TECHNICAL FIELD

This disclosure relates to soft serve frozen food compositions such as ice cream and frozen yogurt. More particularly, this disclosure relates to the dispensation of blended frozen food compositions.

BACKGROUND

Current soft serve ice cream machines are only able to serve two flavors of soft serve ice cream, such as vanilla and chocolate, and a combination of those two flavors, the so-called "twist." Moreover, there is no convenient way to provide additional flavors of ice cream supplied by the machine or to change or control the fat content, overrun, or other characteristics of the ice cream dispensed from the machine. There also is no way to add any additional ingredients, such as nuts, candies, toppings, sauces, whipped cream, variegates, sodas, and other flavorings or mix-ins, to the basic ice cream provided by the machine, except by manually adding such ingredients to the ice cream after it has been dispensed from the machine.

SUMMARY

A single soft serve dispensing apparatus selectively provides a blended ice cream product having a desired fat content and/or overrun, a multitude of flavors, and large ranges of selected additives typically provided by a multiplicity of separate dispensing apparatus and a great deal of manual labor after dispensation of the product from the relatively limited capability machines available today.

BRIEF DESCRIPTION OF THE DRAWINGS

FIG. 1 is a schematic block diagram of an illustrative embodiment of a soft serve dispensing apparatus having one blending head assembly.

FIG. 1A-1D show details of an example of a specific implementation of a soft serve dispensing apparatus having one blending head assembly.

FIGS. 1BA-1BI are detailed diagrams of some of the parts shown in FIGS. 1B and 1C.

FIG. 1FA is a detail drawing of the flavor valve block of FIGS. 1B-1D.

FIGS. 1G-1J show the details of an example of a dispensing head assembly used in the apparatus of FIGS. 1A-1D.

FIGS. 1HA-1HD are sectional views of the dispensing head assembly of FIGS. 1B-1D.

FIG. 1HE is a detail drawing of the variegate plungers used in the dispensing head assembly.

FIGS. 1K-1N show another example of a dispensing head assembly that can be used in the apparatus of FIGS. 1A-1D.

FIGS. 1O-1R shows the details of two examples of a whipped cream supply system useful in the apparatus of FIGS. 1A-1D.

FIGS. 2B-2F show details of an example of a specific implementation of a soft serve dispensing apparatus having two blending head assemblies.

FIGS. 3AA-3AD show the detailed components of one example of a soft serve dispensing apparatus that may be assembled in accordance with FIG. 3A to form a dispensing apparatus having four blending head assemblies.

FIGS. 3BA-3BE show the detailed components of the another example of a soft serve dispensing apparatus that may be assembled in accordance with FIG. 3B to form a dispensing apparatus having four blending head assemblies.

FIGS. 4BA-4BB show the detailed components of the another example of a soft serve dispensing apparatus that may be assembled in accordance with FIG. 4B to form a dispensing apparatus having eight blending head assemblies.

DETAILED DESCRIPTION

Figure 1A:
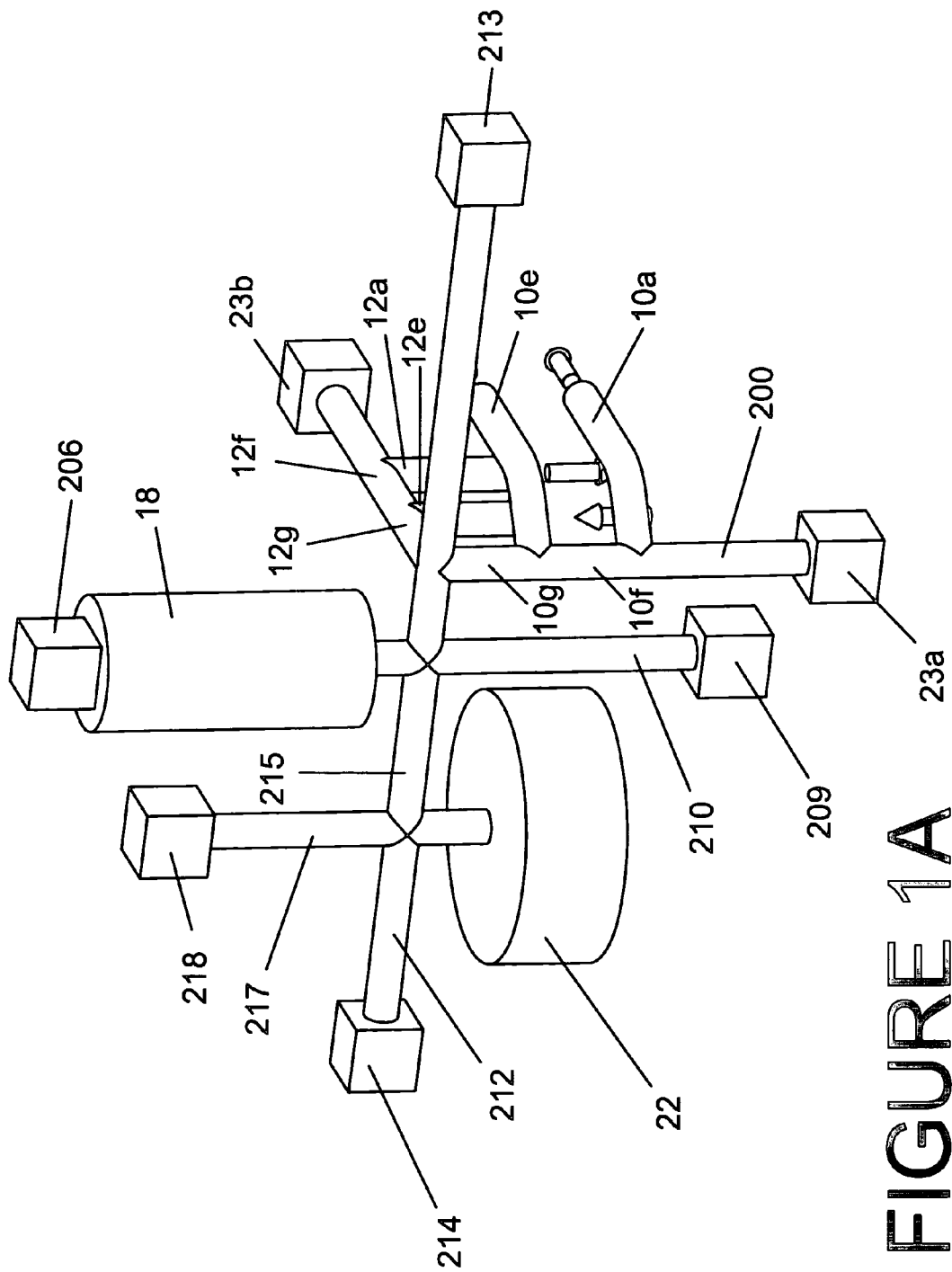

FIG. 1 shows an example of a multi-component soft serve dispensing system in which various ingredients can be combined to form a wide variety of soft serve frozen food products. The dispensing system comprises a number of soft serve processing and storage loops, each of which may be like the one disclosed in the co-pending PCT Application identified above.

The system of FIG. 1 comprises a loop 10 that provides no fat content soft serve food product, for example, vanilla flavored soft serve ice cream. The loop 10 comprises a pipe 10a, a positive displacement pump 10b, a pipe 10c, an emulsification barrel 10d, a pipe 10e, and a flow-through valve assembly 10f connected in series to form a closed loop. Not shown in FIG. 1, but disclosed in the aforementioned PCT Application, is a mix supply that can deliver unfrozen no fat soft serve mix into the loop 10 where the mix is frozen, emulsified in the emulsification barrel 10d, and continuously pumped in a closed loop by the pump 10b. The flow-through valve assembly 10f has two states, a flow-through position and a dispensing position. In the flow-through position of the valve assembly 10f, the loop 10 is closed and frozen food product continuously circulates in the loop 10. In the dispensing position of the valve assembly 10f, the soft serve food product in the loop 10 is pumped into a pipe 10g and delivered to a blending head assembly 18.

The apparatus of FIG. 1 also contains another processing and storage loop 12 that provides high fat content frozen food product of the same flavor as that provided by loop 10, for example, high fat content vanilla ice cream. Like loop 10, the loop 12 similarly comprises a pipe 12a, a positive displacement pump 12b, a pipe 12c, an emulsification barrel 12d, a pipe 12e, and a flow-through valve assembly 12f connected in series to form a closed loop. The loop 12 is supplied with high fat unfrozen soft serve mix from a supply like the one that supplies no fat mix to loop 10. After it has been introduced into loop 12, the mix is frozen, emulsified in the emulsification barrel 12d, and continuously pumped in a closed loop by the pump 12b. Like the flow-through valve assembly 10f, the flow-through valve assembly 12f has two states, a flow-through position and a dispensing position. In the flow-through position of the valve assembly 12f, the loop 12 is closed and frozen food product continuously circulates in the loop 12. In the dispensing position of the valve assembly 12f, the soft serve food product in the loop 12 is pumped into a pipe 12g and delivered to a blending head assembly 18, where the high fat content food product from loop 12 is blended with the no fat content food product from loop 10 to produce a blended frozen food product having a fat content between the fat contents of the food products from loops 10 and 12. For example, vanilla soft serve ice cream having a desired fat content between zero and the percentage fat content of the food in the loop 12 may be produced depending on the relative amounts of food product from loops 10 and 12 that are introduced into the blending head 18. The amounts of no fat and high fat food can be introduced into the blending head 18 by simultaneously opening the flow-through valve assemblies 10f and 12f to their dispensing positions and controlling the relative speeds of the pumps 10b and 12b. Alternatively, one of the valve assemblies may be opened until a predetermined amount of food has been introduced into the blending head assembly 18; then that valve assembly is closed and the other valve assembly is opened until a predetermined amount of the other food product is added to that already in the blending head assembly 18.

While the food from the loops 10 and 12 is being mixed in the blending head assembly 18, one or more of a plurality of flavorings may be introduced into the mixture in the assembly 18 from a flavoring supply 19 via a pipe 19a connected to an input port in the assembly 18. In one example of the invention, an unflavored or vanilla flavored base material can be supplied from one or both of the loops 10 and 12 and a desired flavoring can be introduced into the base material from the flavoring supply. Although a single flavoring supply 19 and supply pipe 19a is shown in FIG. 1, a plurality of separate supplies selectively delivering one of a plurality of different flavors to separate input ports on the blending head assembly 18 may be provided so that a number of different flavors of soft serve food product may be dispensed from the machine depending on which flavoring has been introduced into the base material from one or more of the loops 10 and 12.

The ingredients in the blending head assembly 18 may be mixed to any desired degree of homogeneity. For example, the ingredients may intimately mixed to form a completely homogeneous product. Alternatively, the ingredients may be mixed less intimately to give marbleizing effects to the finished product.

After the food in the blending head assembly 18 has been mixed in the blending head assembly 18 to a desired degree of homogeneity, the contents of the blending head assembly 18 are directed through a pipe 20 to a dispensing head assembly 22 where it is dispensed from the machine. As the soft serve food product is dispensed from the dispensing head assembly 18, various other ingredients may be added to the soft serve food product. To accomplish this, the apparatus of FIG. 1 includes a number of ingredient supplies connected to input ports in the dispensing head assembly. FIG. 1 shows a whipped cream supply 24 connected to an input port via a supply line 24a, a particulate supply 26 connected to an input port of the dispensing head assembly 22 via a supply line 26a, and a variegate supply 28 connected to an input port of the dispensing head assembly 22 via a supply line 28a. Examples of particulates that may be introduced into the soft serve food dispensed from the assembly 22 include, for example, nuts, fruits, and candies. Examples of variegate materials that may be introduced into the soft serve food dispensed from the assembly 22 include, for example, various fruit condiments and butterscotch and chocolate flavored toppings that may be swirled, streaked, or twisted into the dispensed product. Although only one whipped cream, particulate, and variegate source is shown in FIG. 1, multiple such sources may be connected to respective input ports on the dispensing head assembly 22 to provide the ability to provide more than one type of each ingredient to the dispensed product. For example, there may be separate sources for nuts, candies, and fruits, separate sources for different flavored sauces, and separate sources of different flavor or fat level whipped creams. As described below, additional streams of soft serve food product may also be introduced into the soft serve food product in the dispensing head assembly 22 coming from the loops 10 and 12.

FIG. 1A is an isometric view of a specific implementation of the apparatus of FIG. 1. FIG. 1A shows an illustrative spatial arrangement of the elements shown in FIG. 1. In FIG. 1A, parts corresponding to items shown in FIG. 1 have the same reference numerals as in FIG. 1. FIG. 1A shows the connection of the loops 10 and 12 to the blending head assembly 18 and the connection of the blending head assembly 18 to the dispensing head assembly 22.

As described below, the soft serve dispensing apparatus comprises a series of pistons that are moved within cylindrical passages by linear actuators such as stepper motors. Any form of actuator or motor that produces linear motion may be used to drive the pistons in their respective passages. A particularly advantageous example of such motive apparatus is a stepper motor having a threaded output shaft that is screwed to a threaded nut at the proximal end of the piston. The circumferences of the pistons are sealed to the interior surfaces of the passages through which they travel by means of appropriately situated o-rings. An o-ring gland width that is larger than the cross-sectional diameter of its associated o-ring allows the o-ring to slide along its respective piston while keeping the seal tight when its associated piston is driven by its linear actuator. This allows for a more thorough clean-in-place (CIP) treatment. As alluded to above, the pistons may have internal threading cooperating with threaded output drive shafts of the linear actuators. This arrangement reduces the length of the drive shaft on a stepper motor or linear actuator, which reduces the overall size of the machine. The pistons also have narrow cross section waist areas in the center areas of the pistons, which allow fluids to pass by with less restriction facilitating ice cream flow and the CIP procedures.

Each of the valve assemblies 10f and 12f comprises a pipe containing a piston which is movable between a flow-through position and a dispense position. The piston in the valve assembly 10f is driven by a linear actuator 23a which may be a stepper motor. The piston in valve assembly 12f is driven by a linear actuator 23b which also may be a stepper motor. The stepper motors have threaded output shafts that extend into threaded openings in the ends of the pistons. Rotation of the output shaft of each of the stepper motors is converted into linear motion of its respective rotationally stationary piston through the action of the threads on the output shaft on the motor and the threads on the piston. O-rings on the pistons seal the circumferences of the pistons to the interiors of their respective pipes through which they travel. These seals prevent the pistons from rotating when they are driven by their respective linear actuators. The rotational motion of the output shafts of the linear motors thus is converted into linear movement of the pistons because of the threads on the output shafts engaging the threads on the pistons.

In the flow-through position of valve assembly 10f in FIG. 1A, the pipes 10a and 10e are directly connected together and pipe 10g is blocked so that the loop 10 is closed and soft serve food product circulates in the loop 10; in the dispense position of valve assembly 10f, the piston blocks the pipe 10a and opens pipe 10g. The pump 10b pumps soft serve food product from the loop 10 into pipe 10g and into the blending head assembly 18 when the valve assembly 10f is in the dispense position. The operation of all the other flow-through valve assemblies in the embodiments described here operate in a manner substantially similar to that of the flow-through valve assembly 10f.

A transfer-pipe system enables the creation of ice creams and other soft serve products having selectable fat content. The transfer-pipe system enables the movement of multi-fat content ice cream to a chamber to be uniformly flavored or marbleized with flavoring and then the movement of the flavored ice cream to a dispensing head for final serving. The transfer-pipe system also enables clean-in-place (CIP) processes to be applied to all components that contact food. The transfer-pipe system can be arranged in multiple units to increase amounts of flavors and the rate of servings per hour. The connections between the loops 10 and 12 and the blending head assembly 18 and the connections between the blending head assembly 18 and the dispensing head 22 are effectuated by a transfer-pipe system that can be selectively configured to provide flow paths between the flow-through valves 10f and 12f in the loops 10 and 12 to the blending head assembly 18 and from the blending head assembly 18 to the dispensing head 22. The piping system includes a number of pistons driven by linear actuators that are movable within the pipes making up the piping system to assist in propelling the soft serve food product between the flow-through valves 10f and 12f and the blending head assembly 18 and also from the blending head assembly 18 up to and through the dispensing head assembly 22. This arrangement of pistons also is used to selectively block certain passages in the piping system so that all of the frozen food product introduced into the system is delivered to the blending head assembly 18 and then to the dispensing head assembly 22 and out of the machine. There is also a piston and push plate arrangement in the blending head assembly 18 that ejects the blended soft serve product from the blending head assembly 18 toward the dispensing head once the processing performed by the blending head assembly 18 is completed. As described in more detail below, this piston and push plate assembly is also used to obtain a uniform and intimate mixture of the contents of the blending head assembly 18.

Figure 1B:
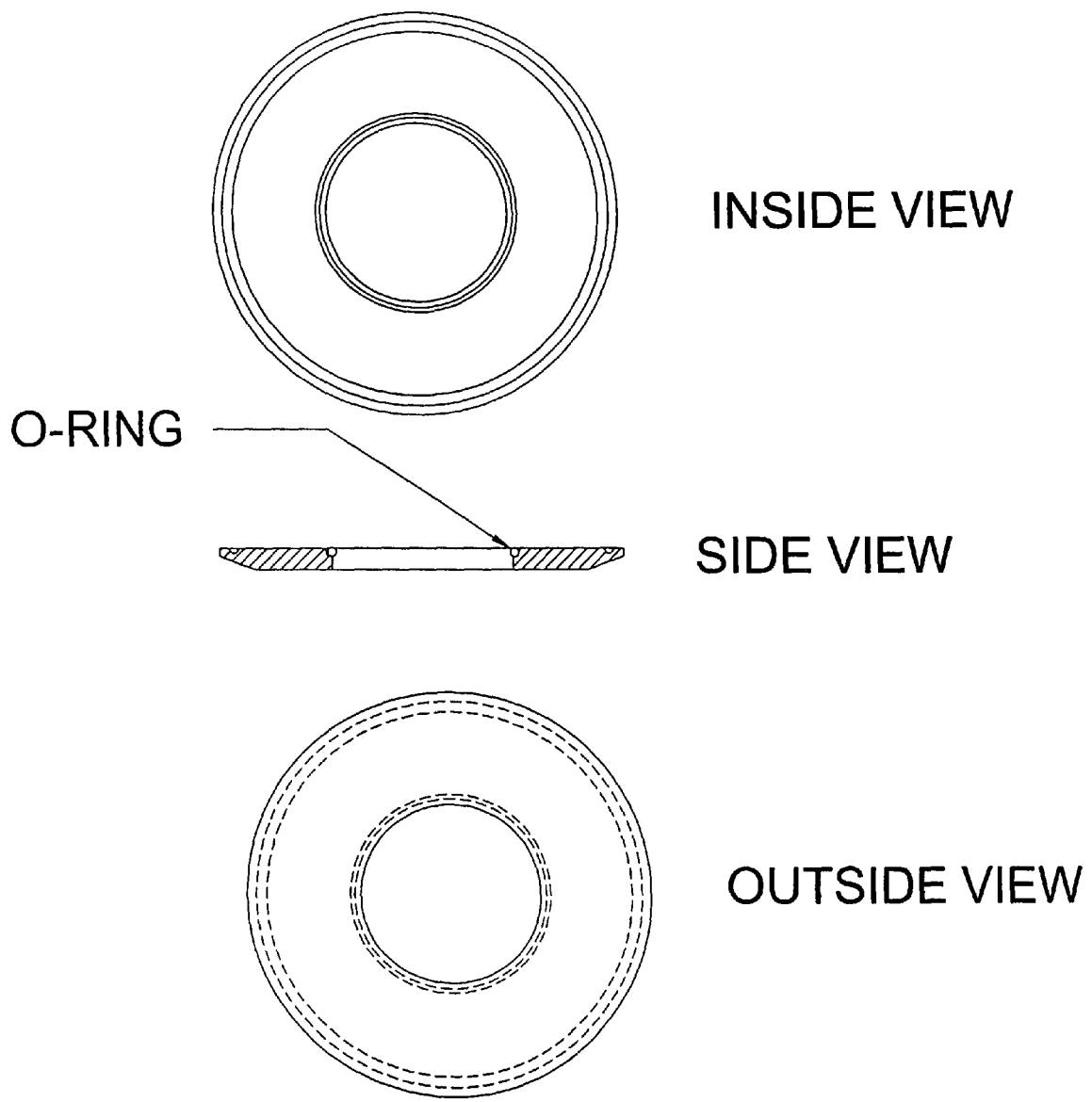
Figure 1B:
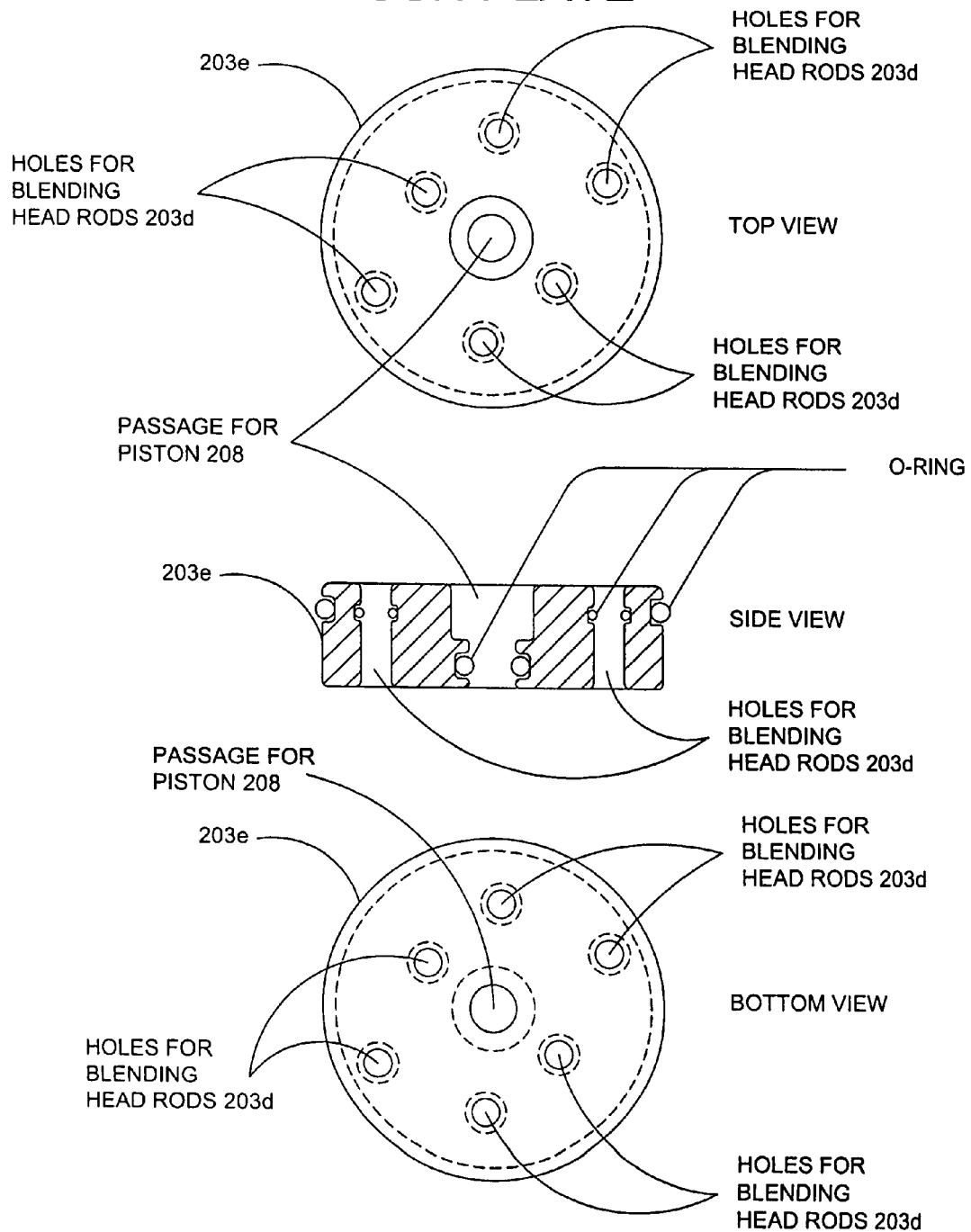

FIGS. 1B, 1C, and 1D are respectively more detailed front, side, and top views of the apparatus of FIG. 1A. FIG. 1BA is an enlargement of the blending head assembly of FIG. 1B which will facilitate an understanding of the operation of the apparatus of FIGS. 1B-1D. These Figures illustrate the operations of the pistons in the apparatus of FIG. 1A. They also show details of the blending head assembly 18 and the dispensing head assembly 22.

FIGS. 1B, 1C, and 1D show the previously described valve assembly 10f, no fat supply pipe 10e, no fat return pipe 10a, and valve assembly output pipe 10g. FIGS. 1C and 1D show the previously described valve assembly 12f, high fat supply pipe 12e, high fat return pipe 12a, and valve assembly output pipe 12g.

The valve assembly 10f comprises a hollow tube containing a piston 200 driven axially through the tube by a linear motor 23a. The output shaft of the linear motor 23a is threaded into a threaded opening in a proximal end of the piston 200. The piston 200 has a large diameter proximal end connected to large diameter distal end by a smaller diameter waist portion. Flexible o-rings seal the proximal and distal ends of the piston 200 to the interior of the hollow tube; the o-rings also prevent the piston from rotating in the hollow tub when the piston 200 is driven through the tube by the linear actuator 23a. The valve assembly 12f contains a similar piston 201 that also slides in a hollow tube and is moved through the tube by a linear screw drive like that of the piston 200.

The valve assembly 10f is shown in FIGS. 1B and 1C in the dispense position. Specifically, the distal end of the piston 200 blocks the supply pipe 10e from communicating with the return pipe 10a. The soft serve food product circulating in the loop 10 is thus diverted into the valve assembly output pipe 10g. Similarly, the valve assembly 12f is shown in FIG. 1C in the dispense position. (In FIG. 1D the valve assembly 12f is shown in the flow-through position.) In the dispense position, the distal end of piston 201 blocks the supply pipe 12e from communicating with the return pipe 12a and food product is diverted into the valve assembly output pipe 12g.

The actuator 23a may drive the piston 200 upwardly in FIGS. 1B and 1C to a flow-through position. In this position, the distal end of the piston 200 blocks the output pipe 10g from the supply pipe 10e and the narrow waist portion of the piston 200 allows food product to flow from the supply pipe 10e to the return pipe 10a. This closes loop 10; the food product continues to circulate in loop 10 and is blocked from the rest of the elements of FIGS. 1A-1D when the valve assembly 10f is in the flow-through position. Similarly, the actuator 23b may drive the piston 201 to the left in FIG. 1C (downwardly in FIG. 1D) to a flow-through position shown in FIG. 1D. In this position, the distal end of the piston 201 blocks the output pipe 12g from the supply pipe 12e and the narrow waist portion of the piston 201 allows food product to flow from the supply pipe 12e to the return pipe 12a. This closes loop 12; the food product continues to circulate in loop 12 and is blocked from the rest of the elements of FIGS. 1A-1D when the valve assembly 12f is in the flow-through position.

FIGS. 1B and 1C illustrate the details of a typical blending head assembly useful in implementation of a dispensation apparatus. The blending head assembly enables different fat content ice creams to be blended to achieve an intermediate fat content level. It also enables the creation of numerous separate flavors of soft serve foods. The blending head assembly also enables the creation of Extra Light versions of any butterfat content soft serve product by adding more over-run gas at the blending head assembly prior to dispensing. The blending head assembly also enables flavoring agents and soft serve food product to be either completely mixed with a homogeneous appearance, or partly mixed with a marbleized appearance. Multiple blending head assemblies may be used to increase amount of flavors and the rate of servings per hour. Finished ice cream is transported from the blending head assembly toward a dispensing head assembly where it exits the machine. The blending head assembly is configured for CIP processes.

The blending head assembly 18 in FIGS. 1B-1D comprises a flavor valve block 202, a blending barrel 203 mounted on top of the flavor valve block 202, a bearing housing 204 mounted on top of the blending barrel 203, a piston shaft housing 205 mounted on top of the bearing housing 204, and a linear actuator 206 mounted on top of the housing 205. FIG. 1BB are detailed views of the blending barrel 203 in FIGS. 1B and 1C. FIGS. 1B and 1C show that the blending head assembly is capped at one end by a top retainer plate and at the other end by a bottom retainer plate. FIGS. 1BC and 1BD are detailed views of the top and bottom retainer plates shown in FIGS. 1B and 1C.

The flavor valve block 202 is a cylindrical element having an axially disposed input/output passage 202*a* connected to the trans-pipe system that transports the frozen food product from the loops 10 and 12 to the blending head assembly 18. Frozen food product flows through the passage 202*a* into a cylindrical mixing chamber 203*a* in the blending barrel 203. When the food product has been blended to a desired level of homogeneity in the mixing chamber 203*a*, it is then pushed out of the blending head assembly 18 through passage 202*a* in the flavor valve block 202.

The flavor valve block 202 has a plurality of radially directed flavoring input ports 202*b* formed in the side wall of the flavor valve block 202. The flavoring input ports 202*b* are connected to the mixing chamber 203*a* through an end face of the flavor valve block 202. There is a spring biased valve assembly 202*c* between each input port 202*b* and the mixing chamber 203*a*. The springs normally bias the valves assemblies 202*c* to close off the mixing chamber 203*a* from the flavoring input ports 202*b*. When flavoring under sufficient pressure is introduced into an input port 202*b*, the bias of the valve spring is overcome thereby opening the valve assembly 202*c*, connecting the input port 202*b* to the mixing chamber 203*a*, and admitting the flavoring into the mixing chamber 203*a*. In this way a selected one or more flavorings may be added to the frozen soft serve food product pumped from one or both of the loops 10 and 12 into the blending head assembly 18. In addition to flavorings, a controlled amount of overrun gas may introduced through one of the valves in the flavor valve block 202 into the soft serve food product in the mixing chamber 203*a* as it is being blended by the blending head assembly 18. Food coloring may also be introduced into soft serve food product via the flavor valve block 202. Any color can be achieved in the finished product if selective amounts of red, green, and blue food coloring are introduced into the finished product from red, green, and blue coloring supplies each connected to a respective input port 202*b*. Similar results can be achieved with magenta, cyan, yellow, and black coloring. A soda beverage may also be blended with soft serve food product in the blending head assembly to make an ice cream soda and other products such as frappes, malted, (with the addition of malt flavoring), floats, frizzes, smoothies, shakes, egg creams, and freezes. The ice cream soda is then dispensed into a container. An additional portion of ice cream may then be dispensed on top creating an ice cream float.

Figure 1E:
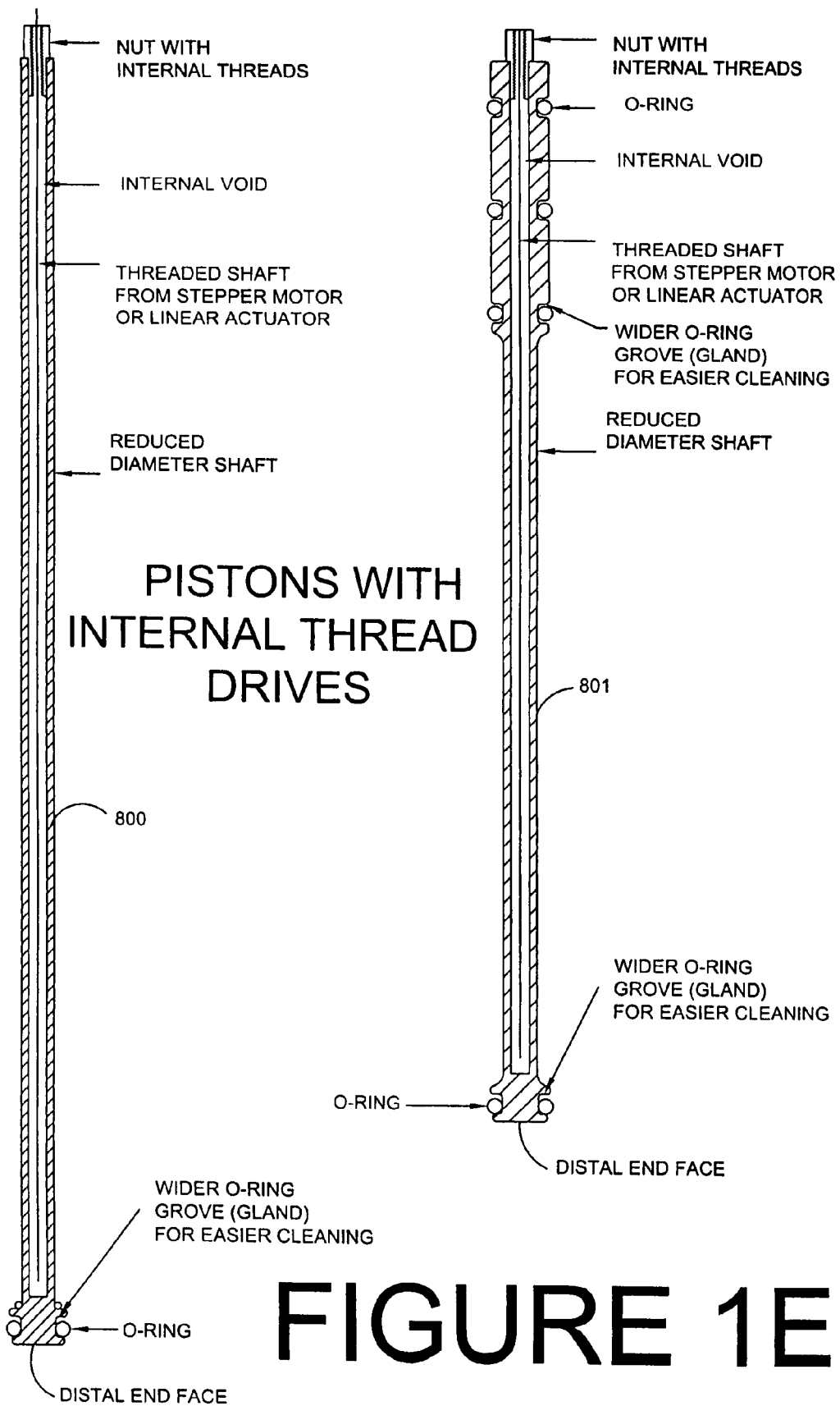
FIG. 1E shows the details of examples of the pistons used in the apparatus of FIGS. 1A-1D.
Figure 1F:
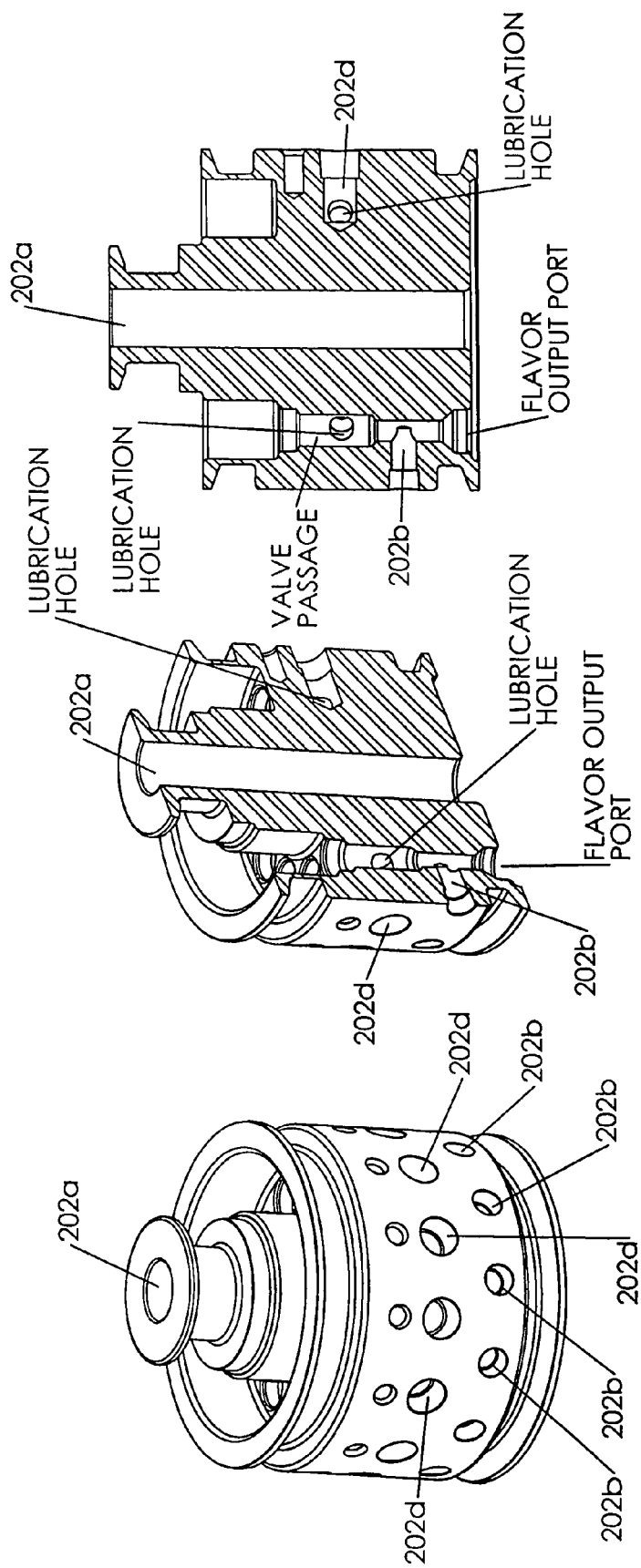
FIG. 1F shows the details of an example of a flavor valve block used in the apparatus of FIGS. 1A-1D.

As shown more clearly in FIG. 1F, the valve assemblies 202*c* in the flavor valve block 202 are lubricated by supplying sterilizing food grade lubricant, such as mineral oil containing iodine, to a lubricant input port 202*d*. As shown in FIG. 1F, the lubricant enters the input port 202*d*, travels around the circumference of the flavor valve block 202, bathes the central portions of all the valve stems around the flavor valve block 202, and exits from the flavor valve block 202 at a lubricant exit port 202*e*. Radially directed holes 202*f* are drilled through the flavor valve block 202 to points between the passages in which the valve stems are located to provide a circumferential path 202*g* between the lubricant input port 202*d* and the lubricant output port 202*e* so that lubricant can flow to all of the valve stems in the flavor valve block 202. The holes 202*f* are all plugged to prevent lubricant from flowing out of the holes 202*f*.

FIG. 1FA shows perspective and sectional views of the flavor valve block 202. It shows the details of a plurality of flavor input ports 202*b* each of which can be connected to respective sources of different flavorings, supplies of overrun gas, food colorings, or other ingredients for introduction into soft serve food product being mixed in the mixing chamber 203*a*. FIG. 1FA also shows one of the flavor out ports that communicate with the mix chamber 203*a*. FIG. 1FA also shows lubrication passages 202*d* and one of the lubrication holes that connect the lubrication passages to the valve passages in the flavor valve block 202. As can be seen here, a large number of different kinds of soft serve food product can be created in a single machine using a flavor valve block like the one in FIG. 1FA. The only limitation is the space that is available for the provision of flavor input ports around the outside of the flavor valve block 202.

The contents of the mixing chamber 203*a* are mixed by a rotatable mix shaft 203*b* that extends from the piston shaft housing 205 through a set of ball bearings 204*a* in the bearing housing 204 and into the mixing chamber 203*a*. The mix shaft 203*b* is driven by a motor 207 mounted to the bearing housing 204. A timing belt 207*a* connects a pulley 207*b* on the output shaft of the motor 207 to another pulley 207*c* on one end of the mix shaft 203*b*. Alternatively, a gearing arrangement, a chain drive, or a direct drive arrangement can be used to connect a drive motor to the mix shaft 203*b*. A larger diameter circular end plate 203*c* is attached to other end of the mix shaft 203*b* in the mixing chamber 203*a*. A plurality of axially extending blending rods 203*d* displaced at various radii with respect to the axis of rotation of the mix shaft 203*b* are attached to the end plate 203*c*. The blending rods 203*d* revolve around the axis of rotation of shaft 203*b* and mix the contents of the mixing chamber 203*a* when the shaft 203*b* is rotated by the motor 207. The blending rods 203*d* are situated at different radii to achieve uniform mixing in the chamber 203*a*.

The blending head assembly 18 contains a push plate and piston which together create a double acting piston system that aids in mixing the varying fat content ice creams and flavorings into a homogeneous single fat content ice cream that can have numerous flavors. The double acting piston system also is instrumental in forcing the ice cream out of the blending barrel toward the dispensing head assembly. In this regard, the mixing chamber 203*a* contains a disc shaped push plate 203*e* that slides axially in the chamber 203*a* along the blending rods 203*d*. The push plate 203*e* normally is pushed to the top of the mixing chamber 203*a* when the chamber 203*a* is filled with soft serve food product. The push plate 203*e* may be pushed downwardly in the mixing chamber 203*a* by the application of pressurized fluid to an inlet port 203*f*. This action is used to push blended soft serve food product from the mixing chamber 203*a* into the passage 202*a* and out of the blending head assembly 18.

FIG. 1BE show details of the push plate 203*e* in the mix chamber 203*a* in the blending head assembly. The push plate 203e slides axially in the mix chamber 203a along the blending rods 203d, shown in detail in FIG. 1BF, which extend through holes shown in FIG. 1BE. The push plate 203e also contains a passage through the center to accommodate the piston 208. The blending rod 203d are screwed to the end plate 203c of the mix shaft 203b, as shown in FIG. 1BG. The mix shaft is rotatable and passes through a set of bearings 204a in a bearing housing 204, as also shown in detail in FIGS. 1BG and 1BI. A shown in FIGS. 1BG and 1BH, the mix shaft 203b contains a passage for piston 208. The passage contains o-rings that seal the piston 208 to the inside of the passage and allow the mix shaft 203b to rotate with respect to the rotationally stationary piston 208. FIG. 1BH shows that the blending rods 203c are spaced at different distances from the axis of rotation of the mix shaft 203b to provide uniform mixing of soft serve food product in the mix chamber 203a.

The linear actuator 206 is screwed to threads in the interior of a drive piston 208 that coaxially extends through the piston shaft housing 205, the mix shaft 203b, the end plate 203c, and the push plate 203e. The structure of the blending head mix shaft 203b enables the lubrication of the piston 208 which is guided through the hollow center of the shaft 203b. The piston 208 is used to push the last of the soft serve food product from the mixing chamber 203, through the passage 202a, and out of the blending head assembly 18.

As shown in FIGS. 1B and 1C, the dispensing apparatus also contains a linear actuator 209 that drives a piston 210 that is used to push soft serve food product through the passage 202a into the mixing chamber 203a. The piston 210 also closes the mixing chamber 203a from the passage 202a when the mixing chamber 203a contains and is blending soft serve food product.

When food product is being mixed in the chamber 203a, there is a tendency for the food product to remain relatively stationary close to the axis of rotation of the mix shaft 203b and therefore not effectively mixed. This problem can be alleviated by oscillating the piston 210 up and down in the passage 202a in unison with the piston 208 and/or push plate 203e while the blending fingers are rotated in the mixing chamber 203a. This tends to move the material out of the center of the mixing chamber 203a to the outside of the chamber 203a and thus provides more uniform mixing.

The apparatus of FIGS. 1B-1D also contains additional pistons 211 and 212, both of which are internally threaded and screw driven by linear actuators 213 and 214, respectively. Piston 211 is used to push soft serve food product through pipe 215 toward either the blending head assembly 18 or the dispensing head assembly 22 depending on the position of pistons 208 and 212. Piston 211 is also used to block food product from backing up toward the flow-through valves assemblies 10f and 12f and the loops 10 and 12 once the food product enters the system of FIGS. 1B-1D. Piston 212 is used to block unblended food product from being driven to the dispensing head assembly.

When the piston 208 is in the position shown in FIGS. 1B and 1D and the piston 212 is moved to the right until the distal end face of the piston 212 is flush with the inside surface of the passage 202a, driving the piston 211 to the left will push any soft serve food product pumped into the pipe 215 from the loops 10 and 12 through the pipe 215 and into the passage 202a. Once the distal face of the piston 211 is flush with the interior surface of passage 202a, the piston 210 may be screw driven upwardly by linear actuator 209 to push any food product in the passage 202a into the mixing chamber 203a. When the piston 208 is screw driven by the linear actuator 206 downwardly into the passage 202a so that the distal end face of the piston 208 is flush with the interior surface of the pipe 215 and the piston 212 is in the position shown in FIGS. 1B and 1D, driving the piston 211 by the linear actuator 213 to the left in FIGS. 1B and 1D will push any soft serve food product in the pipe 215 toward the dispensing head assembly 22 and out of the machine through exit passage 216. Once the distal end face of the piston 211 is flush with the interior surface of the exit passage 216, a piston 217 screw driven by a linear actuator 218 is lowered to completely push the last of the soft serve food product out of the passage 216.

FIG. 1E shows details of typical pistons 800 and 801 used in all the embodiments described here. Piston 800 is used as part of the double acting piston system in the blending head assemblies. See, for example, piston 208 in FIG. 1B. Piston 801 is used elsewhere in the described embodiments. Piston 800 comprises reduced diameter shaft; piston 801' has a larger diameter shaft at the proximal end of the piston 801 connected to a reduced diameter shaft like the reduced diameter shaft of piston 800. Both pistons 800 and 801 have an internally threaded nut at their proximal ends for receipt of externally threaded output shafts of respective linear actuators, such as linear actuators 206 and 209 in FIG. 1B. The piston shafts have interior voids for receipt of the respective output shafts of the linear actuators. The distal ends of both pistons 800 and 801 have o-rings secured to the pistons 800 and 801 near the proximal end faces of the pistons 800 and 801. O-ring glands each comprising two axially displaced circumferential ribs around the distal ends of the pistons 800 and 801 secure the o-rings to the pistons. The ribs are spaced apart a distance greater than the diameter of the o-rings such that the o-rings slide back and forth between the ribs when the pistons are moved back and forth in the passages through which they slide. Wide o-ring glands like the ones noted at the distal ends of pistons 800 and 801 should be used wherever o-rings of pistons come in contact with food. A wider o-ring gland enables thorough cleaning and sanitizing of the areas under and around the o-ring and the gland surface during CIP procedures. This greater cleaning effect can be achieved by causing the piston's linear actuator to oscillate the piston back and forth during CIP procedures thus exposing all food contact surfaces of the o-ring and the gland to the CIP agents thereby completely cleaning and sanitizing the o-ring and the o-ring gland surface by the end of the CIP process.

The dispensing head assembly 22 contains a port for dispensing frozen food product from the machine. In addition, it contains a particulate distribution system containing one or more augers, stepper motors, and various drilled passageways in the dispensing head assembly 22. The particulate distribution system blends particulates inside the ice cream as well as on the surface of the ice cream as it is dispensed from the machine and portioned out. The dispensing head assembly 22 also contains a whipped cream portioning system which applies whipped cream either as the ice cream is dispensed from the machine or after it has been dispensed. The dispensing head assembly 22 also contains a variegate injection system which introduces one or more selected flavoring agents (for example, chocolate, caramel, strawberry etc.) as the ice cream is being dispensed from the dispensing head assembly 22. Multiple dispensing heads can be mounted in series to increase the number of flavors and the amount of servings portioned out per hour in more complex implementations of the machine. See FIGS. 3A, 3B, 4A, and 4B for example of such implementations.

Figure 1G:
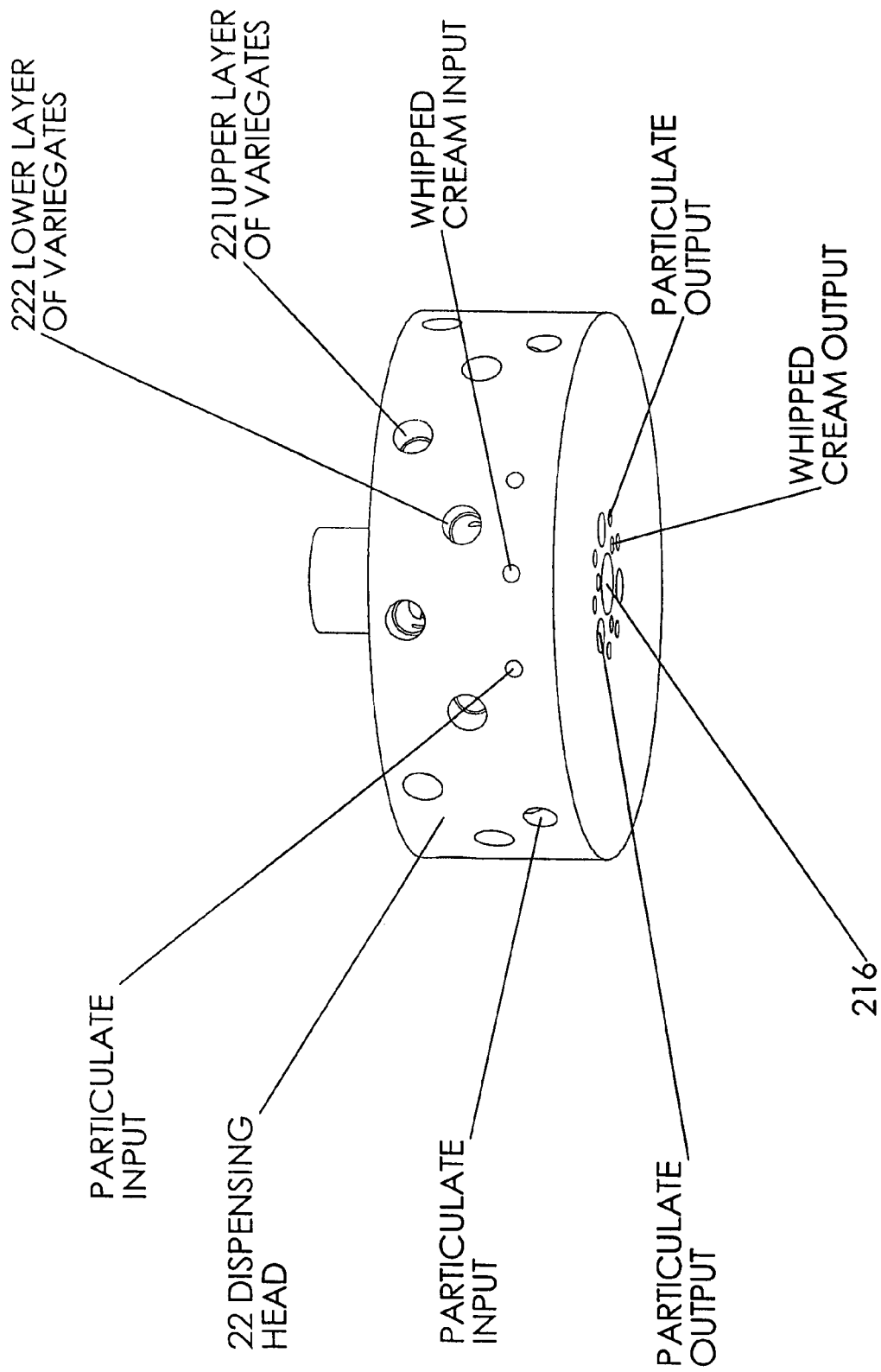
Figure 1H:
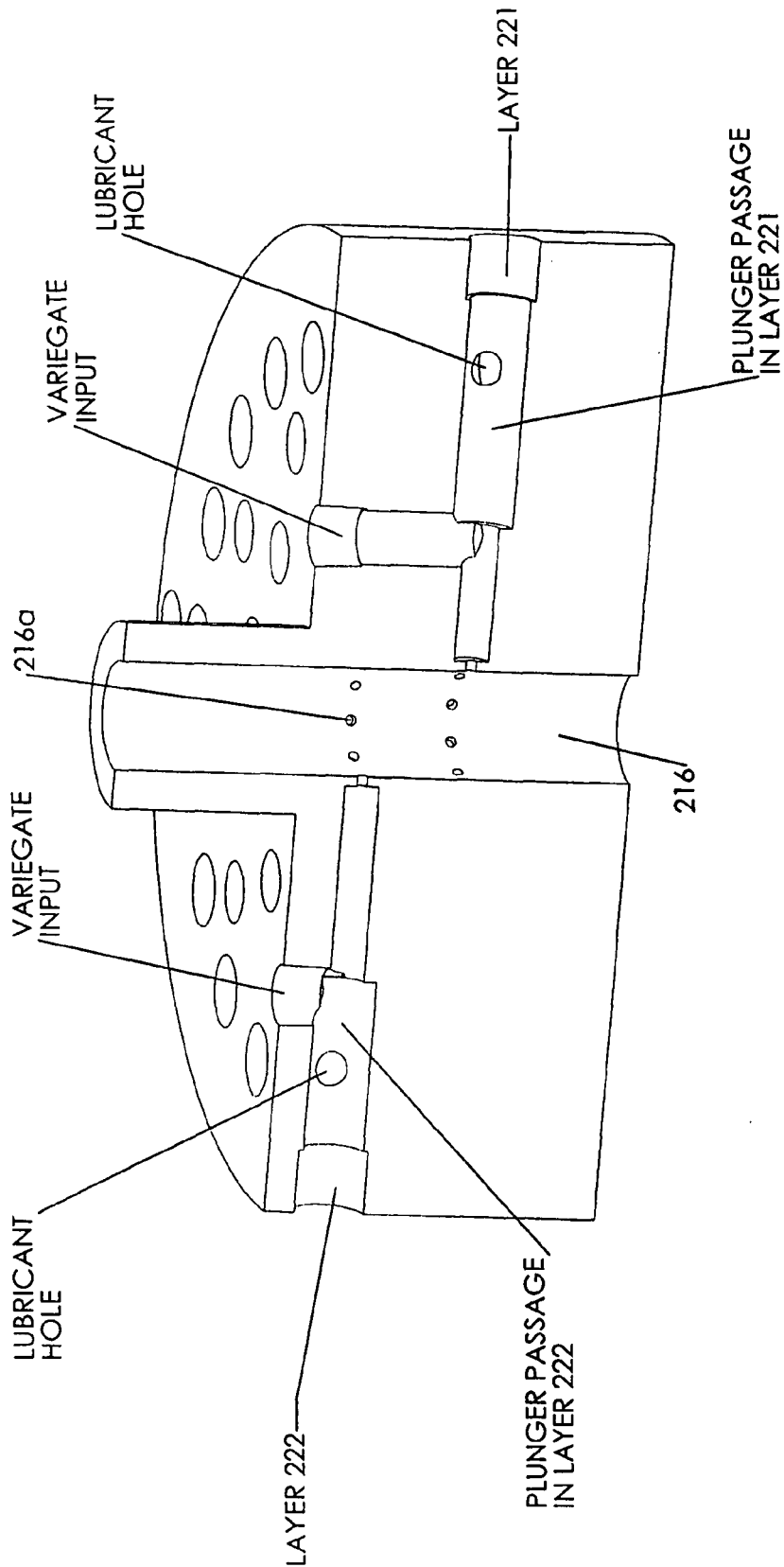
Figure 1H:
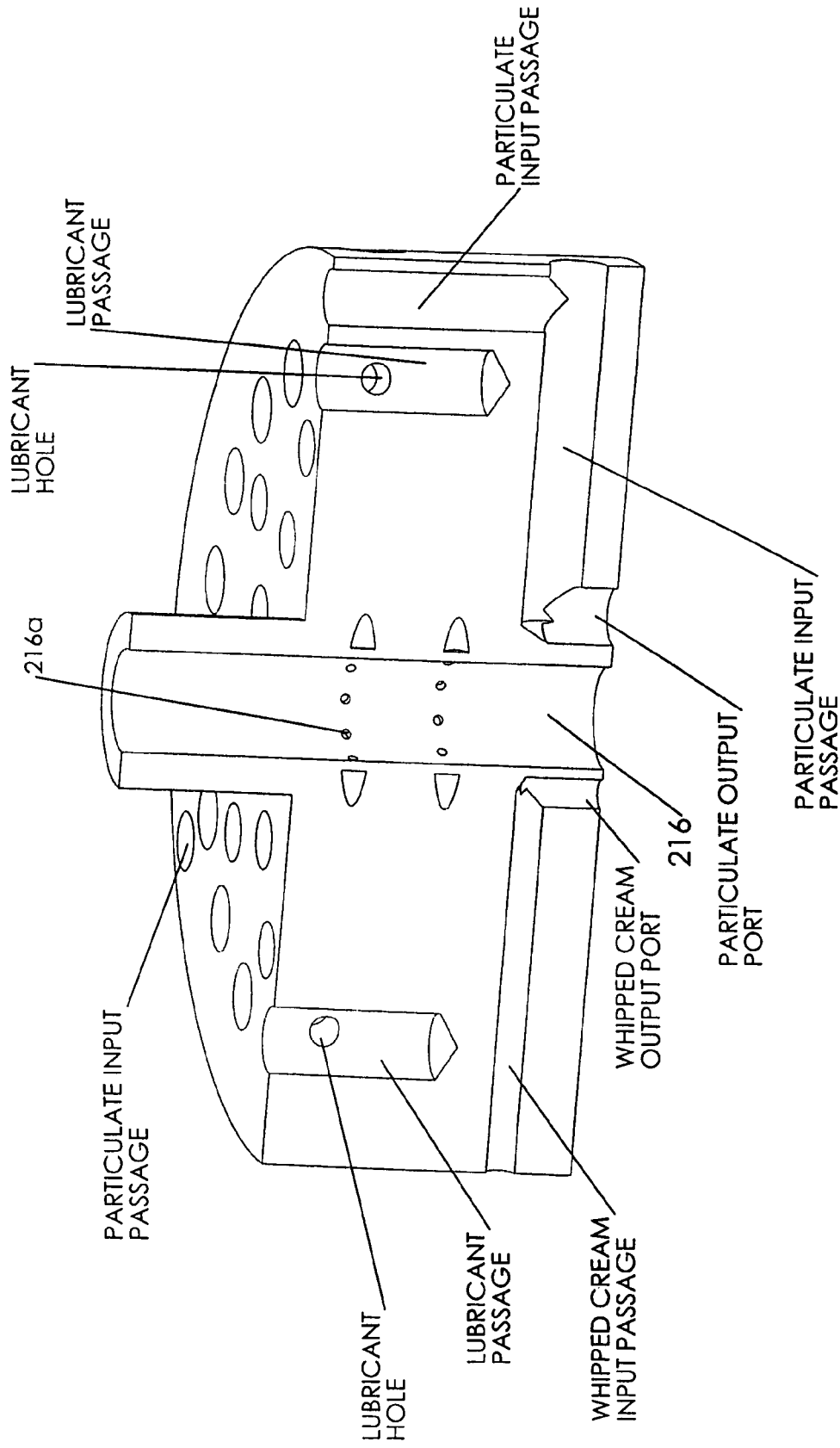
Figure 1H:
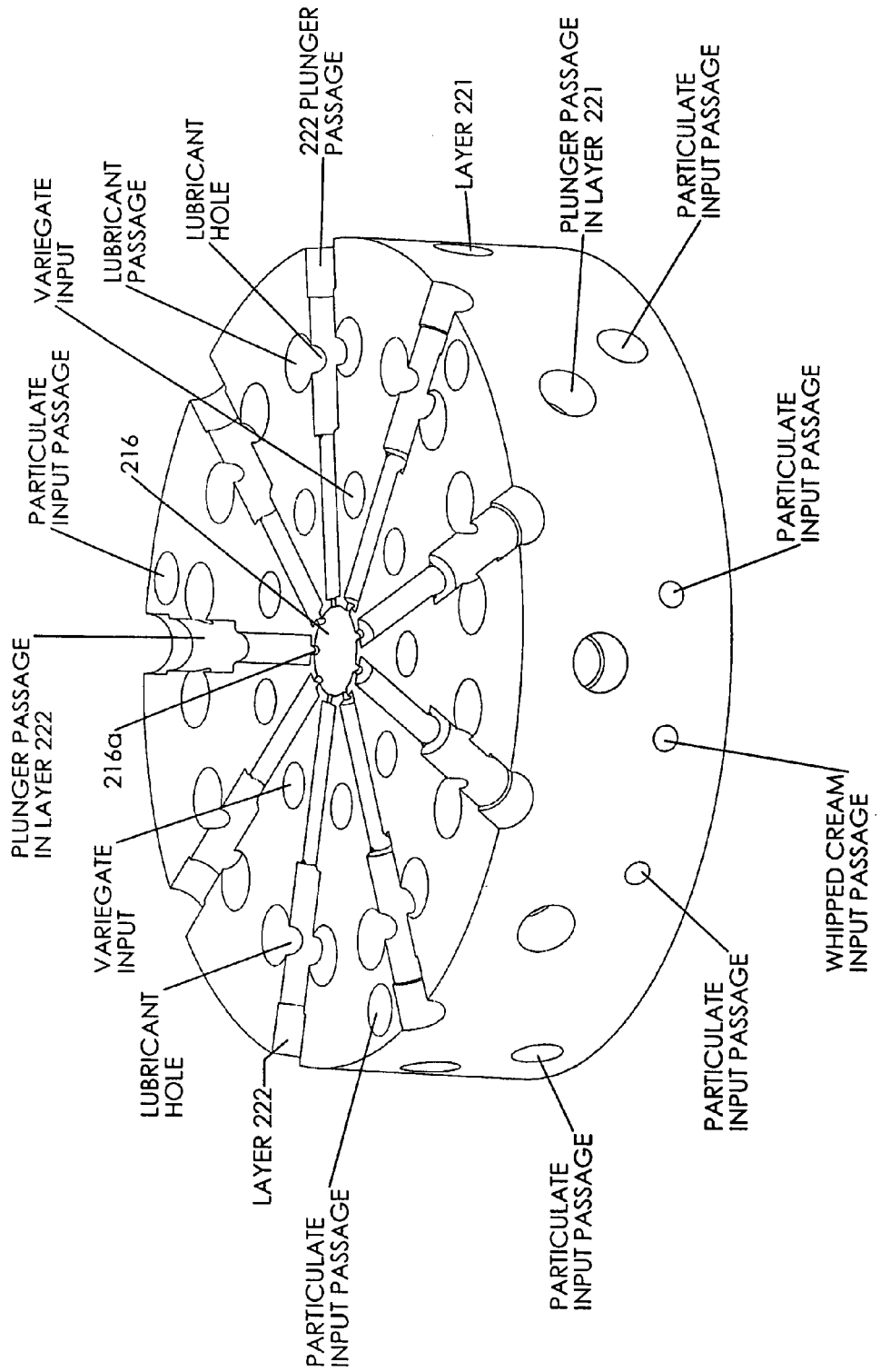
Figure 1H:
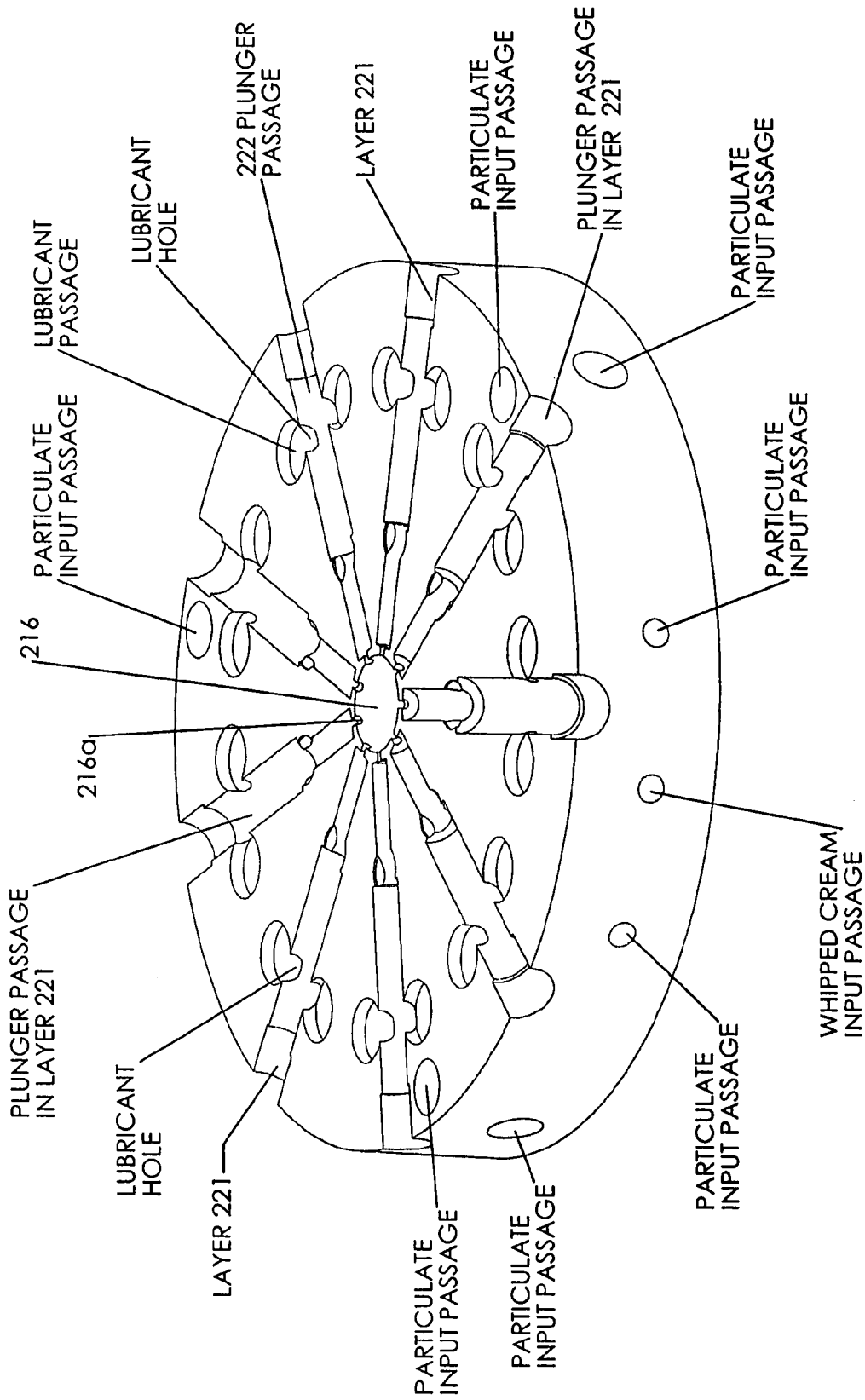
Figure 1K:
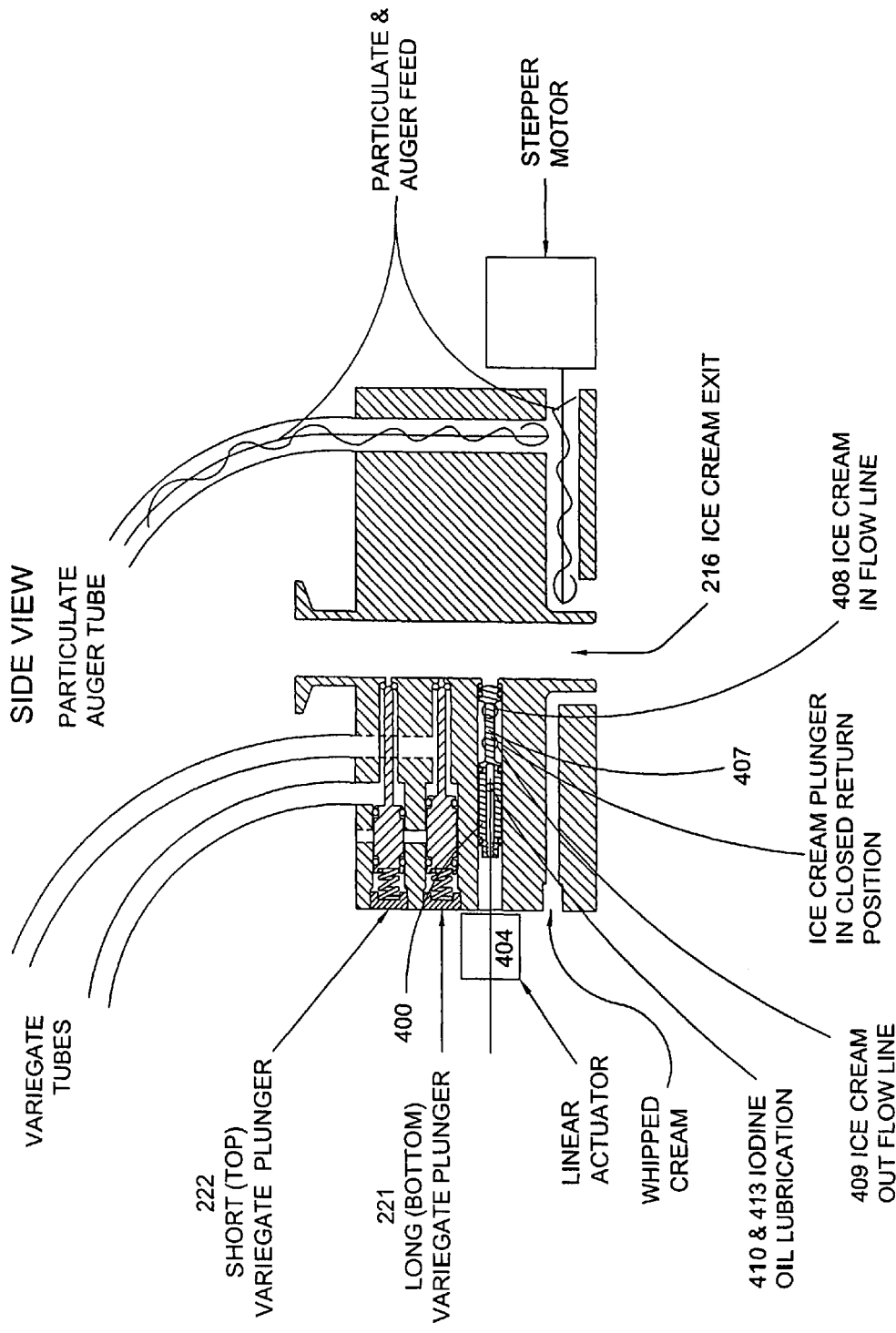
Figure 10:
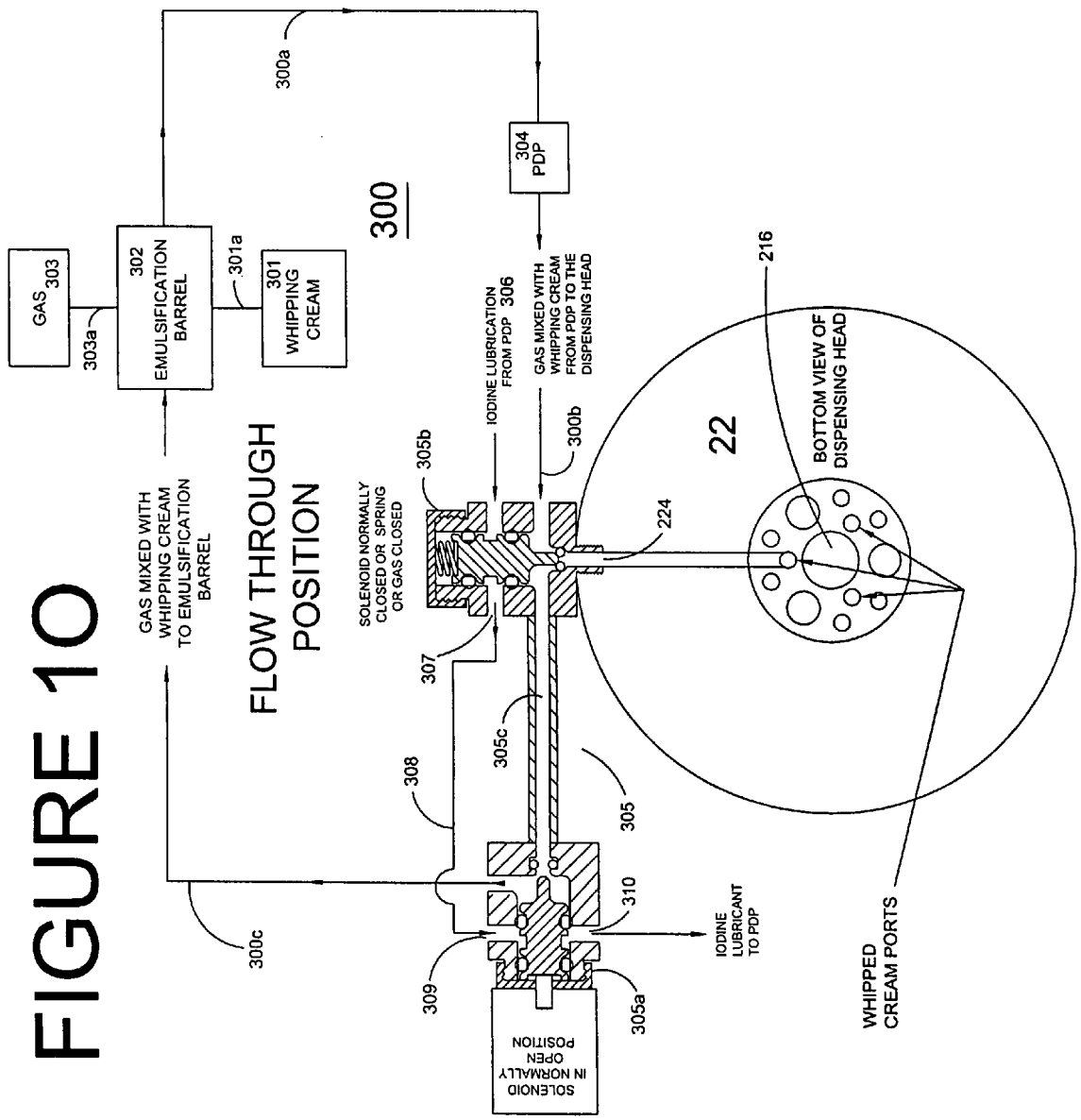

FIG. 1G is an oblique view of the dispensing head assembly 22 illustrating the details of the side and bottom of the assembly 22. FIG. 1H is an oblique view of the assembly 22 illustrating the side and top of the assembly 22. FIG. 1I is a side sectional view of the assembly 22 illustrating the variegate inputs, the particulate inputs, and the whipped cream inputs. FIG. 1J is a top sectional view of the assembly 22 illustrating the variegate inputs, particulate inputs, and the lubrication system for the assembly 22. As shown in these Figures, the dispensing head assembly 22 is a disc shaped element containing a plurality of radially directed passages situated around the circumference of the dispensing head assembly. Each of the radially directed passages connects a variegate tube 220 from a respective variegate supply to the exit passage 216 in the center of the assembly 22. Each of the radially directed passages contains a spring loaded plunger that selectively blocks and opens each variegate tube with respect to the passage 216. The plungers are arranged in two layers of plungers 221 and 222. As shown in FIG. 1J, the plungers in lower layer 221 are labeled "down" and the plungers in layer 222 are labeled "up." As also shown in FIG. 1J, and most clearly in FIGS. 1G and 1H, as one proceeds circumferentially around the dispensing head assembly 22, the radially adjacent plungers alternate between lower and upper layers 221 and 222.

Each of the springs associated with each plunger in layers 221 and 222 normally biases its respective plunger toward the center of the dispensing head assembly 22 to close off the passage 216 from the variegate tubes 219. Application of a variegate material under pressure to its respective plunger pushes the plunger outwardly against the spring and connects the variegate tube 219 to the passage 216 to admit variegate to the passage 216 so that it mixes with frozen food product being extruded from the machine.

In addition to variegate materials, a plurality of different particulate materials may be added to the frozen food product dispensed from the dispensing head assembly 22. These materials may be introduced into the dispensing head assembly 22 through one or more openings 223 in the top and side of the dispensing head assembly 22. They may be delivered to the dispensing head assembly 22 through an auger feed driven by a stepper motor. Whipped cream may also be added to the food dispensed from the machine. The whipped cream is applied through one or more whipped cream input ports 224 in the side of the dispensing head assembly 22. For example, one or more of vanilla, chocolate, and strawberry whipped cream may introduced, via three separate and controllable whipped cream input ports 224 and whipped cream output ports, into soft serve food product dispensed from the machine.

The structure that supplies whipped cream is shown in more detail in FIGS. 1O, 1P, 1Q, and 1R. FIGS. 1O and 1P show a first example of a whipped cream supply for the dispensing head assembly 22. The whipped cream supply comprises a closed loop flow path 300 comprising, in series, an emulsification barrel 302, an output pipe 300a, a positive displacement pump 304, a PDP output pipe 300b, a flow-through solenoid assembly 305, and an output pipe 300c connecting the output of the solenoid assembly 305 to the input the emulsification barrel 302. A source of whipping cream 301 is connected to an emulsification barrel 302 by means of a line 301a. A pressurized gas supply 303 is connected to the emulsification barrel 302 by means of a supply pipe 303a.

The emulsification barrel 302 mixes and whips the gas from the gas supply 303 into the whipping cream from the whipping cream supply 301 to produce whipped cream that is output into the pipe 300a and then into the input of pump 304. Pump 304 pumps the whipped cream into pipe 300b and into the solenoid assembly 305. The solenoid assembly 305 has two states, a flow-through state and a dispense state. In the flow-through state, shown in FIG. 1O, solenoid 305b closes off the pipe 300b from the whipped cream input port 224 on the dispensing head assembly 22.

When the solenoid assembly is in the flow through state, whipped cream flows around a nipple at the end of the solenoid 305b and flows into pipe 305c connecting solenoid 305b to solenoid 305a. In the flow-through state, the solenoid 305a is open permitting whipped cream to flow from pipe 305c into pipe 300c and back to the input of the emulsification barrel 302. Whipped cream thus circulates in the loop 300 when the solenoid valve assembly is in the flow-through state.

When the flow through solenoid assembly 305 is in the flow-through state, as shown in FIG. 1P, solenoid 305b opens and allows whipped cream to flow from the pipe 300b to the input port 224 of the dispensing head assembly 22. In the dispense position, solenoid 305a closes and prevents whipped cream from flowing from pipe 305 into pipe 300c. Whipped cream thus is diverted from the loop 300 to the dispensing head assembly 22.

A closed loop lubrication system lubricates the o-ring surfaces in the solenoid assembly 305. Sterilizing lubrication is supplied from a lubricant pump to a lubrication input port 306 in the solenoid 305b. Lubricant flows around the plunger in solenoid 305b and exits through an output port 307 into one end of a lubricant line 308. The other end of the lubricant line 308 is connected to a lubricant input port 309 in the solenoid 305a. Lubricant supplied to port 309 flows around the plunger in solenoid 305a and out an exit port 310 for delivery back to a lubricant pump.

Figure 1R:
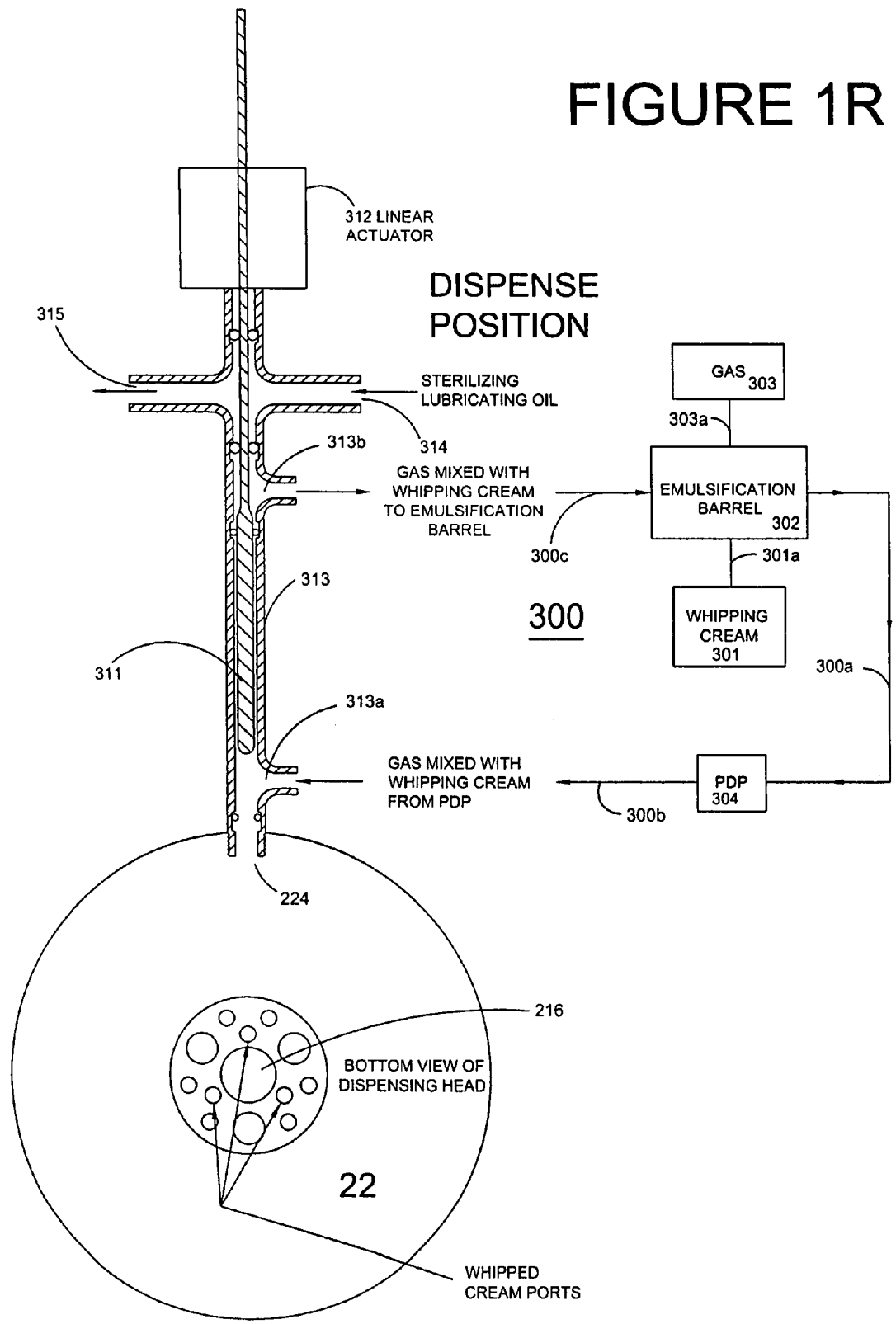

FIGS. 1Q and 1R show a second embodiment of a whipped cream supply system using a flow through valve assembly similar to the flow through valve assemblies that selectively deliver soft serve food product from the loops 10 and 12 to the blending head assembly 18 described above. This embodiment uses a piston 311 screw driven by a linear actuator 312 in a cylindrical passage in a pipe 313. One end of the pipe 313 is connected to the whipped cream input port 224 on the dispensing head assembly 22. The other end is connected to the linear actuator 312. The pipe 313 is connected to the previously described whipped cream loop 300 by means of pipe 300b connected to input port 313a and pipe 300c connected to output port 313b. In the flow through position of the valve assembly, the piston 311 is in the position shown in FIG. 1Q extended into the input port 224. This stops the flow of whipped cream to the input port 224 and also cleans out the input port of food residue. Whipped cream from loop 300 is blocked from entering the dispensing head assembly 224 by the position of piston 311. Whipped cream from the loop 300 flows around the narrow waist portion of piston 311 between ports 313a and 313b and circulates in the loop 300 as a result of the pressure produced by pump 302. When the linear actuator 312 moves the piston 311 to the dispense position shown in FIG. 1R, the piston is retracted into the pipe 313, port 313a is blocked from port 313b, and whipped cream is pushed into the input port 224 and out of the dispensing head assembly 22.

The apparatus of FIGS. 1Q and 1R is lubricated by pumping sterilizing lubricant into lubricant input port 314. Lubricant flows around the piston 311, exits through lubricant exit port 315, and returns to the lubricant pump.

The dispensing head assembly 22 also has a sterilizing lubrication system that contains cross-drilled, multilevel, internal passageways which create sterilizing oil lubrication for the entire dispensing head assembly 22. Lubrication holes in the dispensing head assembly create a single pathway for multi-level lubrication of multiple layers of variegate plungers in the dispensing head assembly 22. All the plungers in layers 221 and 222 are lubricated by supplying sterilizing lubricant to a lubricant input port 225 shown in FIG. 1J. The lubricant input port 225 is connected to a passage 226 in plunger 227. The passage 226 is connected to a plugged hole 228 drilled into the top surface of the dispensing head assembly 22. The hole 228 is situated between two radially adjacent plunger passages so that these two plunger passages are connected together to permit lubricant to flow from one passage to the next. Additional holes 228 are drilled between each pair of radially adjacent plunger passages so that lubricant can flow in sequence to every plunger passage around the circumference of the dispensing head assembly 22. As shown in FIG. 1J, lubricant flows into the input port 225 and then to every plunger in a clockwise direction around the dispensing head assembly as indicated by the arrows on the circular path noted in FIG. 1J. The lubricant also proceeds alternately between the upper and lower layers 221 and 222 as it travels from one plunger passage to the next radially adjacent plunger passage. The lubricant exits the dispensing head assembly 22 through passage 229 in plunger 230 and lubricant exit port 231.

FIGS. 1HA, 1HB, 1HC, and 1HD are sectional views of the dispensing head assembly 22 showing the internal passageways in the dispensing head assembly 22 FIG. 1HA is a section taken through the center of two diametrically opposed variegate plunger passages in the dispensing head assembly. FIG. 1HA shows the plunger passages, variegate input ports, and variegate output ports 216a in the side of the main output passage 216. Lubricant enters the plunger passages shown in FIG. 1HA through the lubricant holes indicated in FIG. 1HA.

FIG. 1HB is a similar cross section, but it is taken along a line through the centers of a diametrically opposed particulate input passage and whipped cream input passage. In addition to the particulate and whipped cream input passages, FIG. 1HB shows lubricant passages that connect circumferentially successive variegate plunger passages in the upper layer 222 and lower layer 221. FIG. 1HB also shows the lubricant holes that direct lubricant into and out of the plunger passages out of and into the lubricant passages.

FIG. 1HC is a section taken through the entire upper layer 222 of plunger passages. In addition to the entire layer 222 of plunger passages, this Figure shows several particulate input passages, and a whipped cream input passage. This Figure also shows lubricant passages connecting variegate plunger passages in layer 222 to variegate plunger passages in layer 221.

FIG. 1HD is a section taken through the entire lower layer 221 of plunger passages. In addition to the entire layer 221 of plunger passages, FIG. 1HD also shows several particulate input passages, two whipped cream input passages, and lubricant passages connecting plunger passages in layer 221 to plunger passages in layer 222.

FIG. 1HE shows a detail of the plungers used in the variegate supply system. One of the plungers in FIG. 1HE is one of the plungers used in the upper layer 222 of plungers in the dispensing head assembly 22. The other plunger in FIG. 1HE is from the layer 221.

FIGS. 1K-1N show an additional embodiment of a dispensing head assembly 22 involving a system for introducing one or more additional streams of ice cream or other soft serve food product into the stream of soft serve food product dispensed through the passage 216 in the dispensing head assembly 22. This soft serve injection system can create a striped, twisted, or candy cane effect of different flavors and colors on the outside of and around a core of single or multi flavored soft serve product. Dots of different color soft serve food product can be created on a core stream of soft serve food product by stopping and starting the secondary injection stream thereby creating a polka dot effect. Combining stripes and dots can result in a stars and stripes effect.

The additional soft serve food supply is effectuated by means of three flow-through valve assemblies 400, 401, and 403, screw driven by respective linear actuators 404, 405, and 406. The flow-through valve assemblies 400, 401, and 402 are connected to respective food processing and storage loops like loops 10, 12, 14, and 16 described above. The flow-through valve assemblies 400, 401, and 402 operate like the flow-through valve assemblies 10f, 12f, 14f, and 16f described above to selectively admit soft serve food product from the respective loops into the passage 216. This can be used to introduce a ribbon of one or more different flavored soft serve food products into the soft serve food passing through the passage 216. Although three flow-through valve assemblies 400, 401, and 402 are shown here to produce up to three additional streams of ice cream into passage 216, any number of flow-through valve assemblies may be used so that any number of additional streams of ice cream may be introduced into the ice cream flowing in passage 216.

FIG. 1L shows the piston 407 in one of the flow-through valve assemblies 400 in the flow-through position which permits soft serve frozen food product to flow from an input passage 408 connected to the food processing loop associated with the flow-through valve assembly 404 into an out flow passage 409 for return to the food processing loop associated with the flow-through valve assembly 400. Passage 216 in the dispensing head assembly 22 is blocked by the position of piston 407. FIG. 1M shows valve assembly 400 in the dispense position. In the dispense position, the piston 407 is retracted by the linear actuator 404 so that the input passage 408 is connected to the passage 216 in the dispensing head assembly 22. Soft serve food product is pumped from the associated food processing loop through passage 408 and into the passage 216 when the piston 407 is in the dispense position.

Anywhere from zero to three of the flow-through valve assemblies 400, 401, and 402 may be placed into the dispense position to introduce as many additional streams of soft serve food product into the passage 216 as desired. For example, FIG. 1N shows all three valve assemblies 400, 401, and 402 in the dispense position. Also, any number of flow-through valve assemblies connected to respective food processing loops may be provided in the dispensing head assembly 22 depending on the potential number of additional soft serve food streams that are desired to be introduced into the passage 216. The flow-through valve assemblies may be in a single circumferential layer as in FIGS. 1K-1N or in multiple layers as space permits.

The pistons in the valve assemblies 400, 401, and 402 are lubricated by supplying sterilizing lubricant to lubricant inputs 410, 411, and 412. Lubricant is returned to its source via lubricant outputs 413, 414, and 415.

The number of flavors produced by the machine of FIG. 1 can be increased by adding additional blending head assemblies. The capacity of the machine to produce soft serve food product can also be increased by the same process of adding additional blending head assemblies. Two alternatives involving the use of two blending head assemblies are described below.

Figure 2:
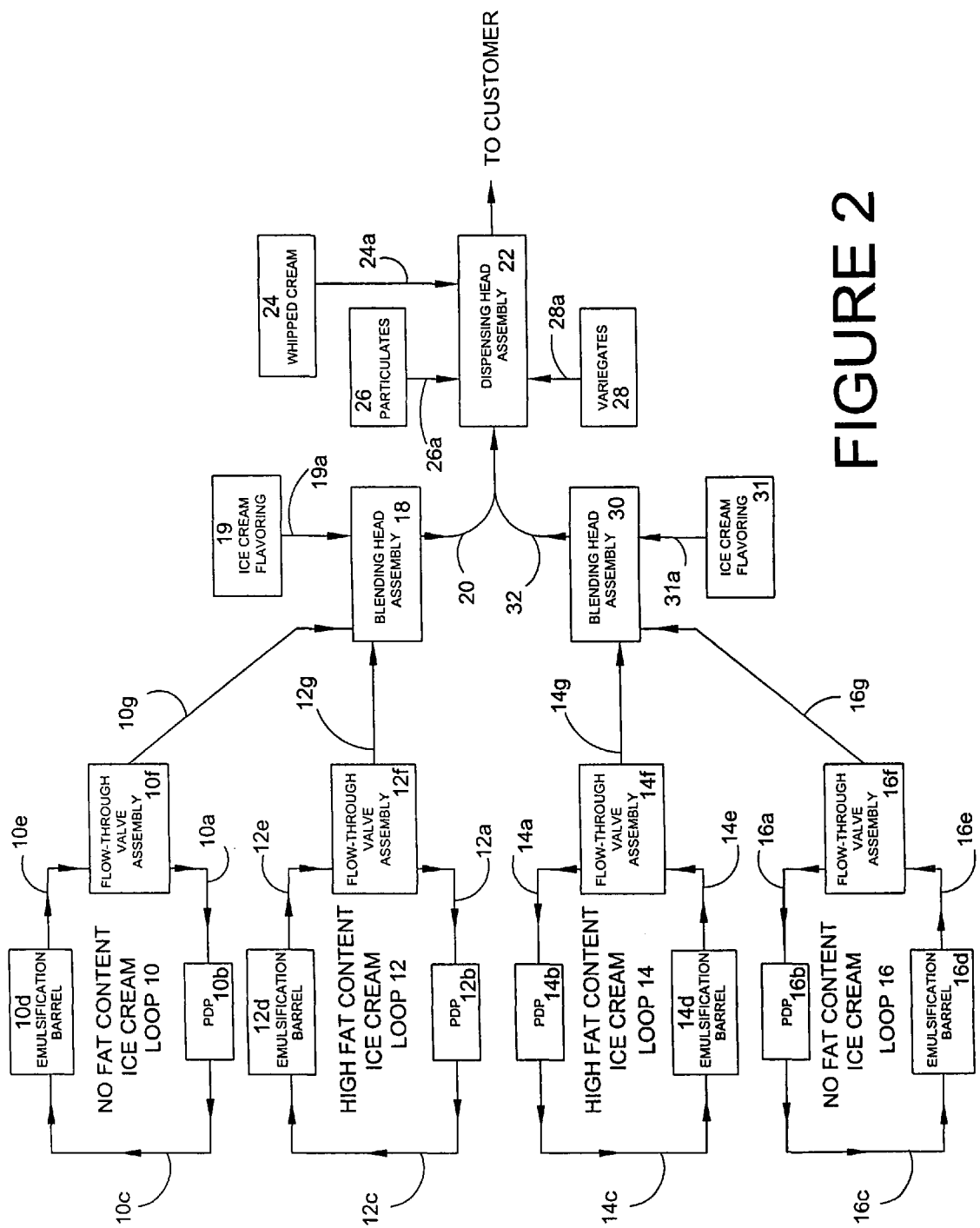
FIGS. 2 and 2A are schematic block diagrams of illustrative embodiments of a soft serve dispensing apparatus having two blending head assemblies.

FIG. 2 is a schematic diagram of a two blending head assembly machine. FIG. 2 shows an additional high fat content loop 14 and an additional no fat content loop 16 feeding a second blending head assembly 30 added to the apparatus of FIG. 1. The high fat content loop 14 comprises a closed loop series connection of a pipe 14a, positive displacement pump 14b, and pipe 14c, emulsification barrel 14d, pipe 14e, and flow-through valve assembly 14f. The no fat content loop 16 comprises a closed loop series connection of a pipe 16a, positive displacement pump 16b, pipe 16c, emulsification barrel 16d, pipe 16e, and flow-through valve assembly 16f. Loop 14 is connected to another blending head assembly 30 by way of a pipe 14g; loop 16 is connected to the blending head assembly 30 by way of a pipe 16g.

Blended food product is directed from the blending head assembly 30 to the dispensing head assembly 22 by means of a pipe 32. One or more selected flavorings may be added to the contents of the blending head assembly 30 from a multiple flavoring supply 31 through pipe 31a.

Figure 3A:
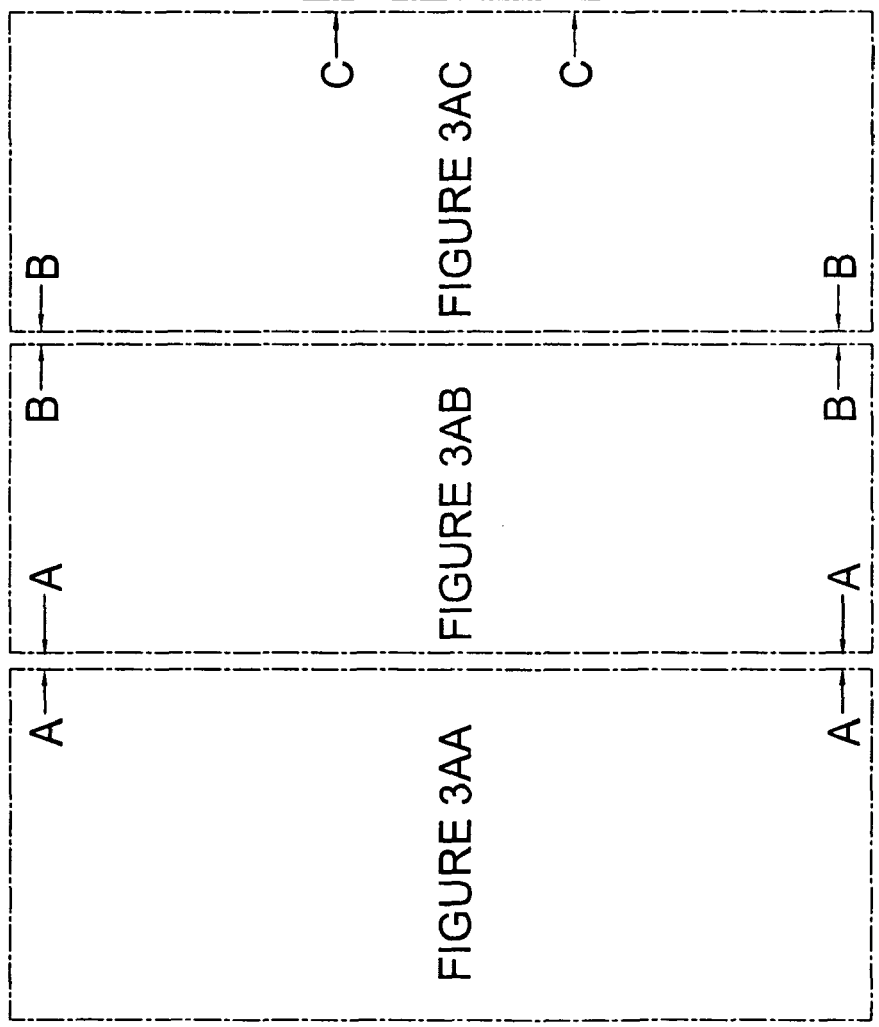
FIG. 3A is an assembly diagram for one example of a soft serve dispensing apparatus having four blending head assemblies.
Figure 3A:
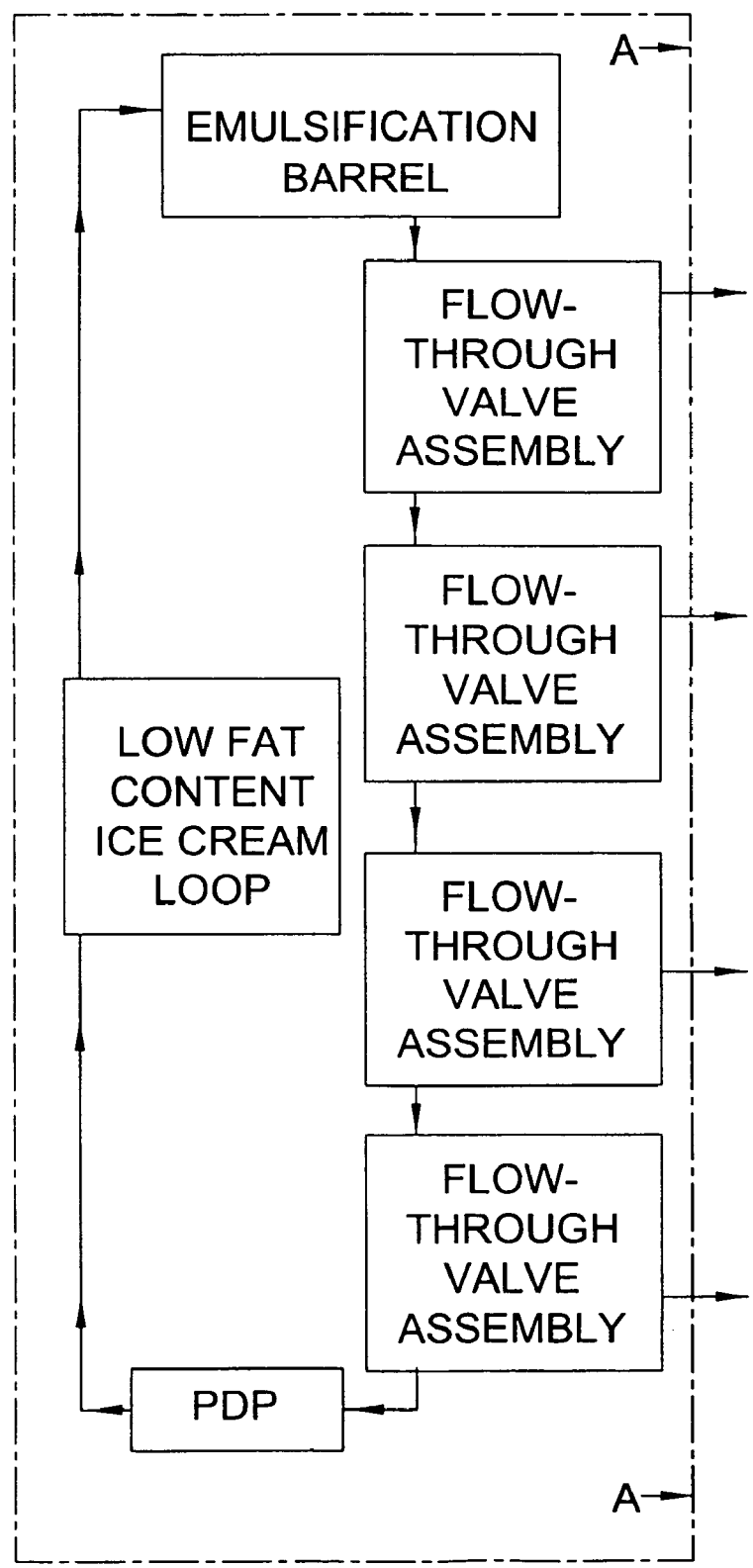
Figure 3A:
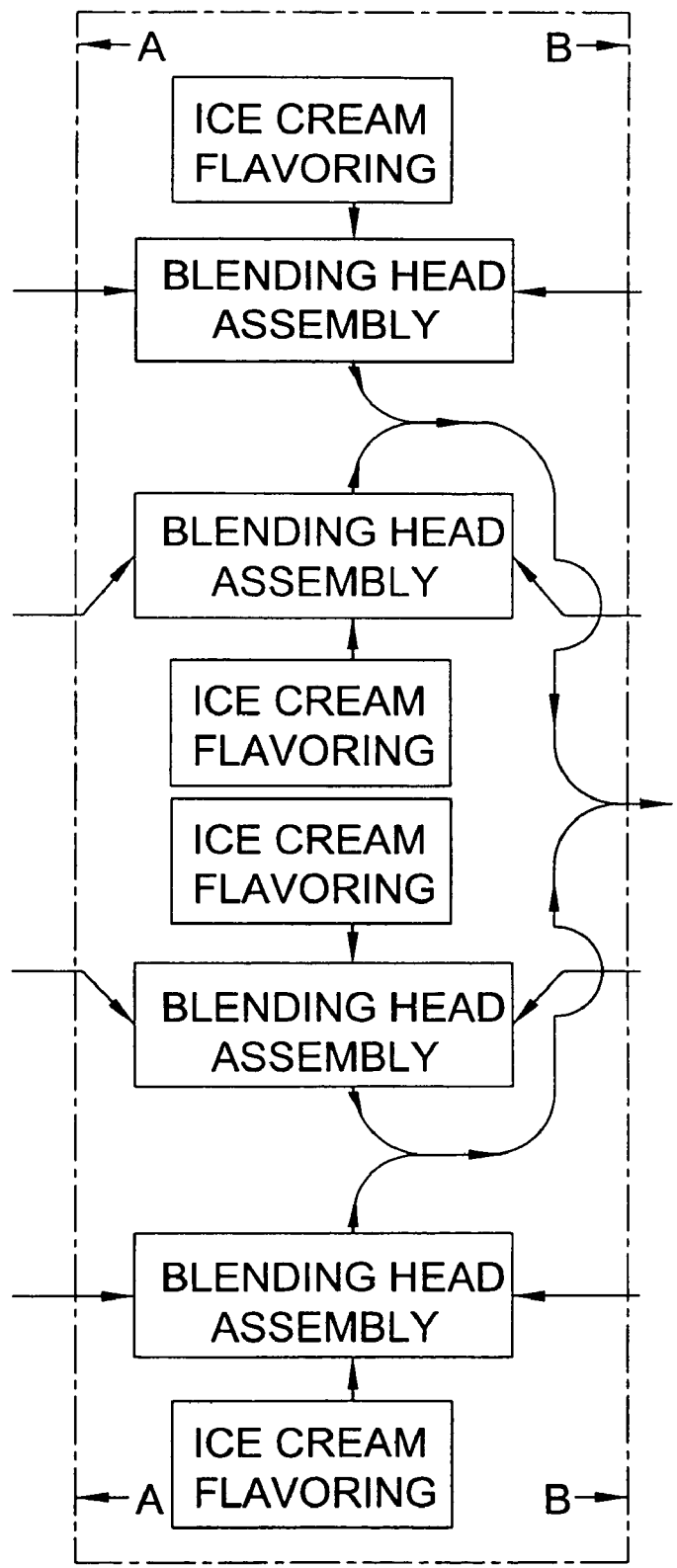
Figure 3A:
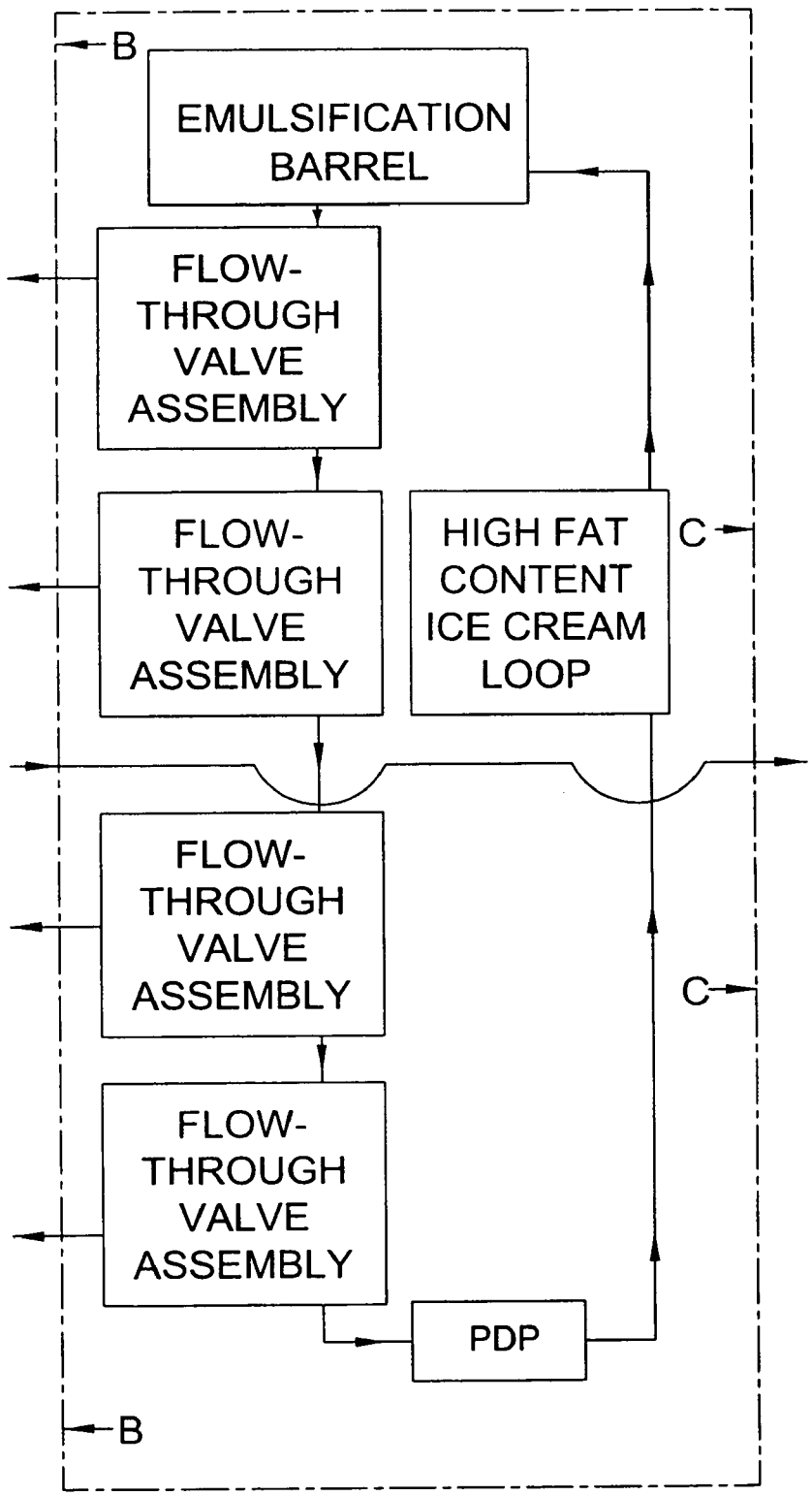

Although the example of the invention shown in FIG. 2 has two blending head assemblies, any number of blending head assemblies may be used. In simple machines, like the one in FIG. 1, only one blending head assembly may be needed. In more complex machines, more than the two blending head assemblies may be provided. FIGS. 3A, 3AA-3AD, 3B, 3BA-3BE, 4A, 4B, 4BA, and 4BB described below show examples of four and eight blending head assembly machines.

An example of what might be done with a machine like the one shown in FIG. 2 is the provision of selectable fat content vanilla ice cream in the range of 0% to 18+% fat content from the loops 10 and 12 and the provision of selectable fat content chocolate ice cream in the range of 0% to 18+% fat content from the loops 14 and 16. Selectable fat content vanilla ice cream alone may be dispensed from the dispensing head assembly 22, selectable fat content chocolate ice cream alone may be dispensed from the dispensing head assembly 22, or a combination of vanilla and chocolate ice cream may be dispensed from the dispensing head assembly 22. Other flavors of ice cream instead of vanilla and/or chocolate may be provided by the loops in FIG. 2 in other implementations. In yet an additional example, one or both of the high fat/no-fat loop pairs may provide an unflavored base material to which is added one or more flavorings from a multiplicity of available flavorings by way of the introduction of flavoring into the blending head assemblies 18 and 30 from one or both of the flavoring supplies 19 and 31.

Figure 2A:
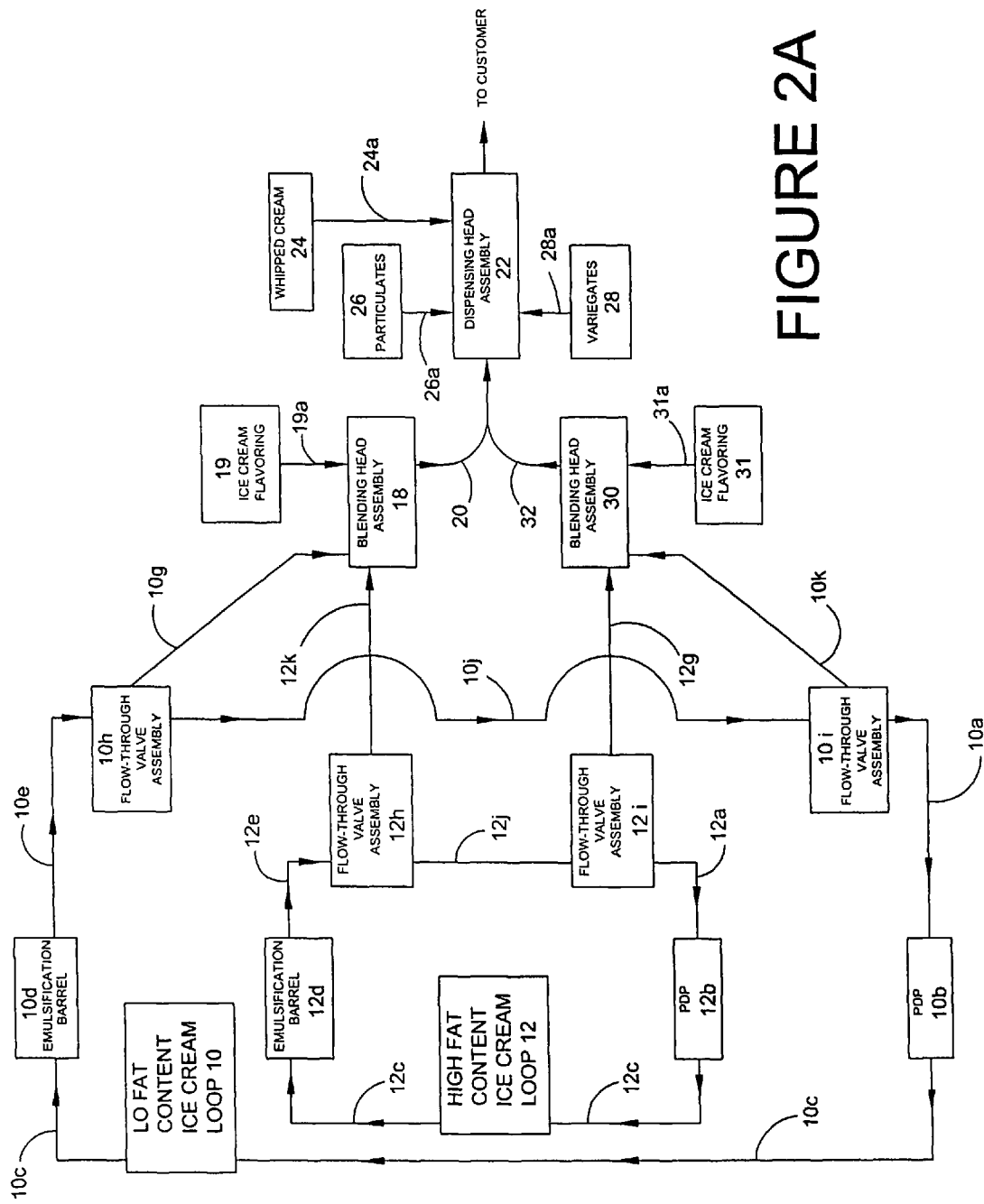
Figure 2F:
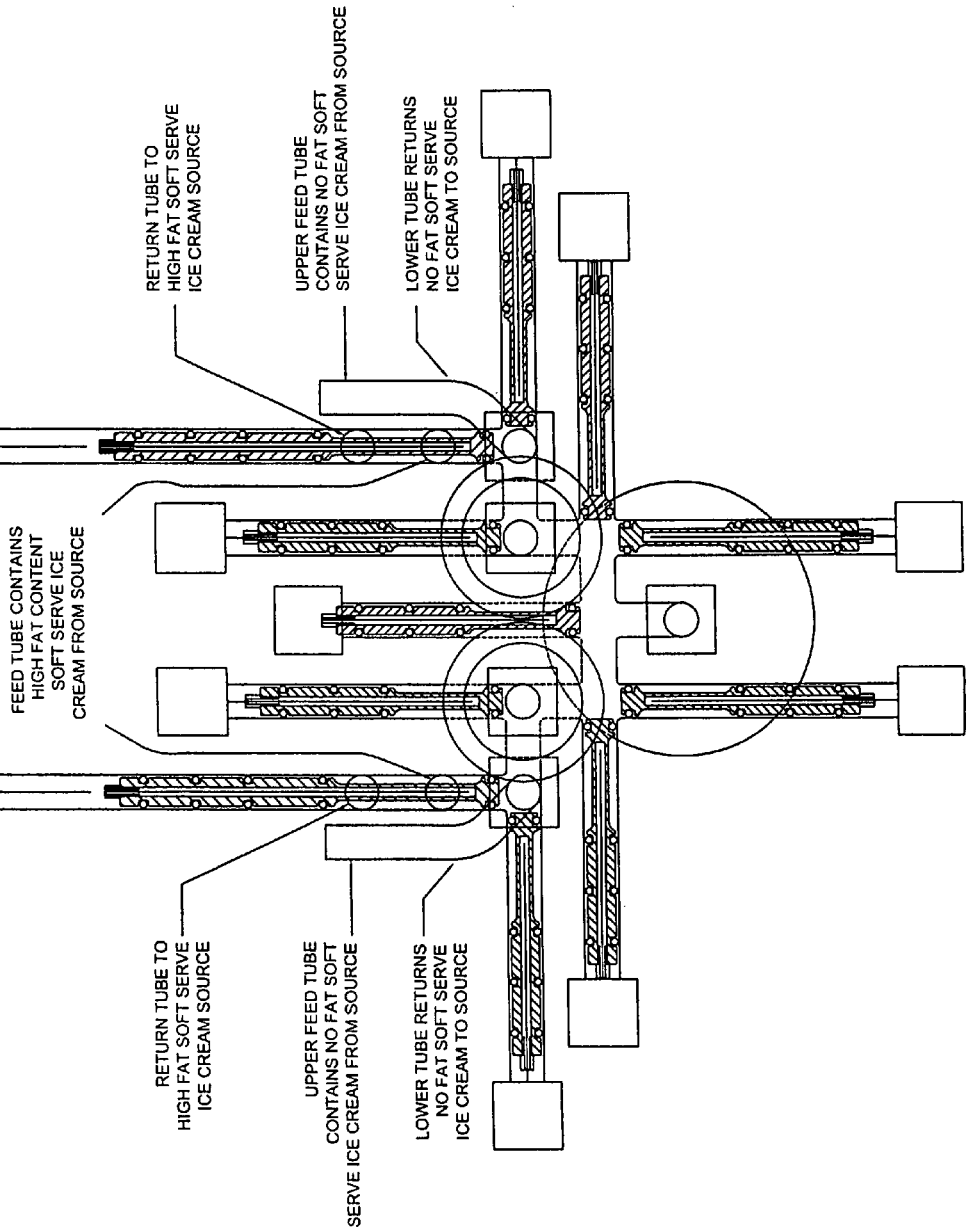

FIG. 2A shows a schematic diagram of another embodiment of the invention that is a variation of the two blending head embodiment shown in FIG. 2. FIG. 2A is the same as FIG. 2 except that the single flow-through valve assembly 10f of FIG. 2 is replaced in FIG. 2A with two series connected flow-through valve assembles 10h and 10i. The flow-through valve assemblies 10h and 10i are connected in series by means of a pipe 10j. The output of the flow-through valve assembly 10h is connected to the input of the blending head assembly 18 by means of the pipe 10g and the output of the flow-through valve assembly 10i is connected to the input of the blending head assembly 30 by means of a pipe 10k. The output of the flow-through valve assembly 12i is connected to the input of the blending head assembly 30 by means of the pipe 12g and the output of the flow-through valve assembly 12h is connected to the input of the blending head assembly 18 by means of a pipe 12k.

The FIG. 2A embodiment may be used for a situation where no fat unflavored or vanilla base material is circulated in the loop 10 and high fat unflavored or vanilla base material is circulated in the loop 12. Selected flavoring may be added to the base materials from flavoring sources 19 and 31. Examples of what can be produced include selectable fat content soft serve ice cream having a flavor determined by the flavor added to the base material from the flavoring source 19, selectable fat content soft serve ice cream having a flavor determined by the flavor added to the base material from the flavoring source 31, and mixtures of the flavors of ice cream delivered from blending head assemblies 18 and 30.

One way to implement a two blending head apparatus like that shown in FIGS. 2 and 2A would be to connect, in FIG. 1A, the loops 14 and 16 and the blending head assembly 30 to the pipe containing piston 212 so that the loops 14 and 16 and the blending head assembly 30 on one side of the dispensing head assembly 22 are the mirror image of the loops 10 and 12 and the blending head assembly 18 on the other side of the dispensing head assembly 22.

Another way to implement a two blending head apparatus is shown in FIGS. 2B-2E. These Figures show the details of an implementation involving two blending head assemblies 18 and 30 and a single dispensing head assembly 22 as in FIGS. 2 and 2A. Elements in FIGS. 2B-2E corresponding to like elements in FIGS. 2 and 2A have the same reference numerals in FIGS. 2B-2E as they do in FIGS. 2 and 2A. The blending head assemblies 18 and 30 and the dispensing head assembly 22 are structured and operate in the manner described above in connection with FIGS. 1B-1D.

The arrangement depicted in FIGS. 2B-2E comprises a transfer pipe system having a series of pipes that can be configured by a pistons driven by a number of screw driven linear actuators to form a path for soft serve food product to be directed from one or more of the food processing loops 10, 12, 14, and 16 to one or both of the blending head assemblies 18 and 30 and then a path from one or both of the blending head assemblies 18 and 30 to the dispensing head assembly 22 and out of the machine.

When the machine is initially in its non-dispense flow-through condition, the valve assemblies 10f, 12f, 14f, and 16f are in their flow-through positions which maintains the closed-loop circulation of soft serve food product in processing loops 10, 12, 14, and 16. When it is desired to dispense a soft serve food product from the machine, the transfer pipe system is configured to provide paths for all of the soft serve food product withdrawn from the loops to be transferred from the loops to the blending head assemblies 18 or 30. This done on one side of the machine, when soft serve food product is to be withdrawn from either or both of the loops 10 and 12, by linear actuator 710 moving piston 510 upwardly in FIG. 2B until the distal end face of the piston 510 is flush with the bottom inner surface of the pipe 600, thereby blocking pipe 600 from the dispensing head assembly 22. Linear motor 705 also retracts the piston 505 out of the mixing chamber in the blending head assembly 18. Linear motor 708 also retracts piston 508 to a position where the distal end of the piston 508 is flush with the inside surface of pipe 600. This provides a closed path from the food processing loops 10 and 12 through pipe 600 to the mixing chamber in the blending head assembly 18. On the other side of the machine, when soft serve food product is to be withdrawn from one or both of the food processing loops 14 and 16, linear actuator 711 moves piston 511 upwardly in FIG. 2B until the distal end face of the piston 511 is flush with the bottom inner surface of the pipe 605, thereby blocking pipe 605 from the dispensing head assembly 22. Linear motor 707 also retracts the piston 507 out of the mixing chamber in the blending head assembly 30. Linear motor 709 also retracts piston 509 to a position where the distal end of the piston 509 is flush with the inside surface of pipe 605. This provides a closed path from the food processing loops 14 and 16 through pipe 605 to the mixing chamber in the blending head assembly 30.

After the transfer pipe system has been configured for one or more of the food processing loops to provide soft serve food product one or both of the blending head assemblies 18 and 30, the appropriate one or more of the valve assemblies 10*f*, 12*f*, 14*f*, and 16*f* is moved to the dispense position. Specifically, one or more of the pistons 500, 501, 502, and 503 in valve assemblies 10*f*, 12*f*, 14*f*, and 16*f* is driven by respective linear actuators 700, 701, 702, and 703 to the dispense positions. Respective supply pipes 10*e*, 12*e*, 14*e*, and 16*e* are connected to respective output pipes 10*g*, 12*g*, 14*g*, and 16*g* and respective return pipes 10*a*, 12*a*, 14*a*, and 16*a* are blocked from respective supply pipes 10*e*, 12*e*, 14*e*, and 16*e* by respective pistons 500, 501, 502, and 503 moving to the dispense position. The selected valve assemblies 10*f*, 12*f*, 14*f*, and 16*f* are kept in their dispense positions until a predetermined amount of soft serve food product is pumped out of one or more of the food processing loops 10, 12, 14, and 16 into one or both of pipes 600 and 605, which are directly connected to the output pipes 10*g*, 12*g*, 14*g*, and 16*g*, and into one or both of the blending head assemblies 18 and 30.

When the valve assemblies 10*f*, 12*f*, 14*f*, and 16*f* are returned to their flow-through positions connecting supply pipes 10*e*, 12*e*, 14*e*, and 16*e* with respective return pipes 10*a*, 12*a*, 14*a*, and 16*a* after predetermined amounts of soft serve food product have been withdrawn from one or more of loops 10, 12, 14, and 16, not all of the soft serve food product has entered the respective blending head assemblies 18 and 30. Some of the soft serve food product from the loops remains in the transfer pipe system and must be pushed into the blending head assemblies. This is accomplished as follows. Movement of the pistons 500, 501, 502, and 503 from their dispense positions to their flow-through positions pushes soft serve food product out of the their respective output pipes 10*g*, 12*g*, 14*g*, and 16*g*. In the case of output pipes 10*g* and 12*g*, soft serve food product is forced into pipe 600 and, in the case of output pipes 14*g* and 16*g*, the soft serve food product is forced into pipe 605. Pipe 600 is emptied of soft serve food product by linear actuator 704 driving piston 504 to the left in FIG. 2B until the distal end face of piston 504 is flush with the inside surface of pipe 601 and the input/output passage through the center of the blending head assembly 18. Pipe 605 is emptied of soft serve food product by linear actuator 706 driving piston 506 to the right in FIG. 2B until the distal end face of piston 506 is flush with the inside surface of pipe 604 and the input/output passage through the center of the blending head assembly 30. Finally, soft serve food in the input/output passage of the blending head assemblies 18 and 30 are cleared by linear actuators 708 and 709 driving pistons 508 and 509 through the input/output passage until the distal end faces of the pistons 508 and 509 are flush with the bottom of the mix chambers in the blending head assemblies 18 and 30. Now all of the soft serve food withdrawn from the food processing loops is in one or both of the blending head assemblies 18 and 30 where it undergoes the processing such as mixing and flavoring described above.

Once the processing in the blending head assemblies 18 and 30 is completed, the contents of the mix chambers then must be directed to the dispensing head assembly 22 and out of the machine. First, the transfer pipe system must be configured to provide a path from one or more of the blending head assemblies 18 and 30; paths back to the food processing loops must be blocked. This is accomplished by maintaining piston 504 and/or piston 506 in the positions they achieved in pushing food product through pipes 600 and 605 during the process of filling the blending head assemblies 18 and 30. If food product is to be directed from the blending head assembly 18, piston 508 is retracted from the inside of the blending head assembly 18 until the distal end face of the piston 508 is flush with the inside surface of pipes 600 and 602, as shown in FIG. 2C. The piston 510 is retracted to the position shown in FIG. 2B, where its distal end face is flush with the interior surface of pipe 602. If food product is only sent from blending head assembly 18 to the dispensing head assembly 22, then the linear actuator 715 drives piston 515 to the right in FIG. 2B until the distal end face of the piston 515 is flush with the inside surface of pipe 606 thereby blocking pipe 603 from pipes 602 and 606, while permitting pipe 602 to communicate with pipe 606. If food product is to be directed from the blending head assembly 30, piston 509 is retracted from the inside of the blending head assembly 30 until the distal end face of the piston 509 is flush with the inside surface of pipes 603 and 605, as shown in FIG. 2C. The piston 511 is retracted to the position shown in FIG. 2B, where its distal end face is flush with the inside surface of pipe 606 as shown in FIG. 2B. If food product is only sent from blending head assembly 30 to the dispensing head assembly 22, then linear actuator 714 drives piston 514 to the left in FIG. 2B until the distal end face of the piston 514 is flush with the inside surface of pipe 606 thereby blocking pipe 602 from pipes 603 and 606 while permitting pipe 603 to communicate with pipe 606. If food product is to be directed to the dispensing head assembly 22 both blending head assemblies 18 and 30 at the same time, then the pistons 514 and 515 are maintained in the positions shown in FIG. 2B.

Once the transfer pipe system has been configured for delivery of soft serve food product to the dispensing head assembly 22, if food product is to be dispensed from the blending head assembly 18, the push plate and the piston 505 in the blending assembly 18 are forced to the bottom of mix chamber in the blending head assembly 18 to empty the mix chamber. The piston 505 is driven beyond the mix chamber through the input/output passage in the blending head assembly 18 to push food product completely out of the blending head assembly 18 at which point the distal end face of the piston 505 is flush with the interior surfaces of pipes 600 and 602. Food product is forced through pipes 601, 602, and 606 and then out the machine through the output passage in the center of the dispensing head assembly 22. After the blending head assembly 18 has been completely emptied, the actuator 712 driving piston 512 downwardly in FIG. 2B through pipe 601 until the distal end face of piston 512 is flush with the inside surface of pipe 602 pushes all of the soft serve food product out of pipe 601 and into pipe 602. Linear actuator 714 then drives piston 514 to the left in FIG. 2B until the distal end face of piston 514 is flush with the inside surface of pipe 606. This pushes the soft serve food product out of pipe 602 and into pipe 606, either because piston 515 is blocking pipe 603 or the stream of food product flowing to the left in pipe 602 in FIG. 2B meets another stream flowing to the right in pipe 603 from the blending head assembly 30.

If food product is to be dispensed from the blending head assembly 30, the push plate and the piston 507 in the blending assembly 30 are forced to the bottom of mix chamber in the blending head assembly 30 to empty the mix chamber. The piston 507 is driven beyond the mix chamber through the input/output passage in the blending head assembly 30 to push food product completely out of the blending head assembly 30 at which point the distal end face of the piston 507 is flush with the interior surfaces of pipes 603 and 605. Food product is forced through pipes 604, 603, and 606 and then out of the machine through the output passage in the center of the dispensing head assembly 22. After the blending head assembly 30 has been completely emptied, the actuator 713 driving piston 513 downwardly through pipe 604 until the distal end face of piston 513 is flush with the inside surface of pipe 603 pushes all of the soft serve food product out of pipe 604 and into pipe 603. Linear actuator 715 then drives piston 515 to the right in FIG. 2B until the distal end face of piston 515 is flush with the inside surface of pipe 606. This pushes the soft serve food product out of pipe 603 and into pipe 606, either because piston 514 is blocking pipe 602 or the stream of food product flowing to the right in pipe 603 in FIG. 2B meets another stream flowing to the left in pipe 602 from the blending head assembly 18.

When food has been cleared from the pipes 602 and 603, linear actuator 716 drives piston 516 through pipe 606 until the distal end face of the piston 516 is flush with the inside surface of the exit passage through the center of the dispensing head assembly 22 to clear pipe 606 of food product. When this operation has been completed, a linear actuator 717 drives a piston 517 through the output passage of the dispensing head assembly 22 to clear the last of the soft serve food product from the dispensing head assembly.

It should be pointed out that all of the pistons in these embodiments have o-ring seals at the distal ends of the pistons. These o-rings seal the pistons to the entire inside circumference on the passages and pipes through which they travel. This prevents food from getting past the pistons when they perform their blocking functions and this also serves to wipe food from the inside surfaces of the pipes and passages through which the pistons travel. The pistons also contain o-ring seals that prevent lubricant and food from mixing.

The number of flavors and/or the capacity of the machine to produce soft serve food product can be increased by increasing the number of blending head assemblies beyond the one or two blending head assemblies described thus far. The potential number of variegates and mix-ins that may be added to the soft serve food product from the machine may be increased by increasing the number of dispensing head assemblies in series at the output of the machine. Any number of blending head assemblies and/or dispensing head assemblies may be used. The number actually used is determined by the results sought to be achieved.

FIGS. 3A and 3AA-3AD show an example of a machine having four blending head assemblies. The machine comprises a no or low fat content food processing loop containing a series connection of a PDP pump, an emulsification barrel, and four flow-through valve assemblies, as shown in FIG. 3AA. It also comprises a high fat content food processing loop containing a series connection of a PDP pump, an emulsification barrel, and four additional flow-through valve assemblies, as shown in FIG. 3AC. Each of the four flow-through valve assemblies in the each of the two loops in FIGS. 3AA and 3AC is connected to one of four blending head assemblies shown in FIG. 3AB, each of the four blending head assemblies having its own supply of multiple flavorings. The outputs of the blending head assemblies are connected to a series connected pair of dispensing head assemblies shown in FIG. 3AD. One of the dispensing head assemblies is like those shown above in FIG. 1I or 1K. The second dispensing head assembly is used to increase the number of variegates able to be added to the soft serve food product dispensed from the machine.

Figure 3B:
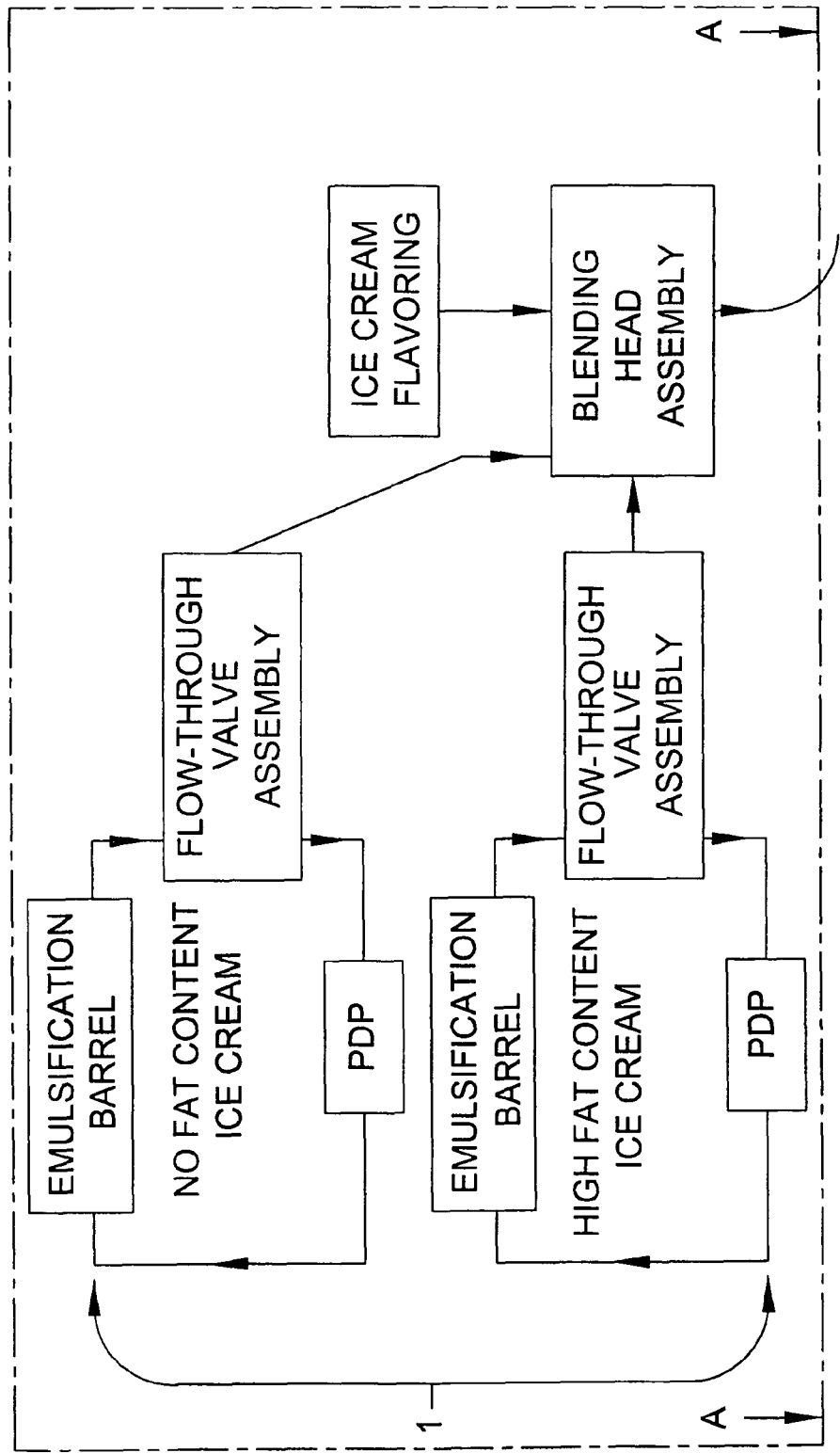
FIG. 3B is an assembly diagram for another example of a soft serve dispensing apparatus having four blending head assemblies.
Figure 3B:
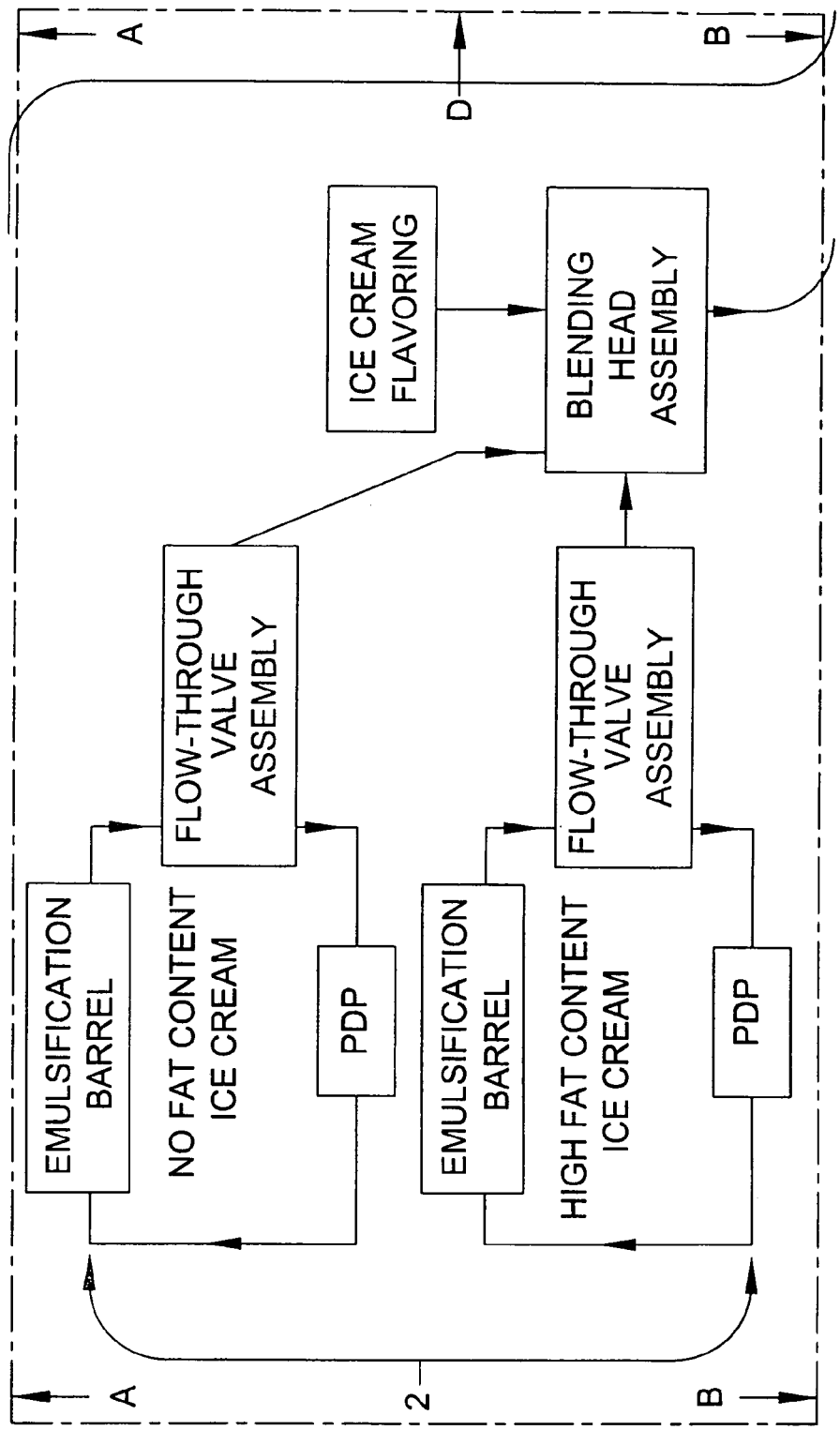
Figure 3B:
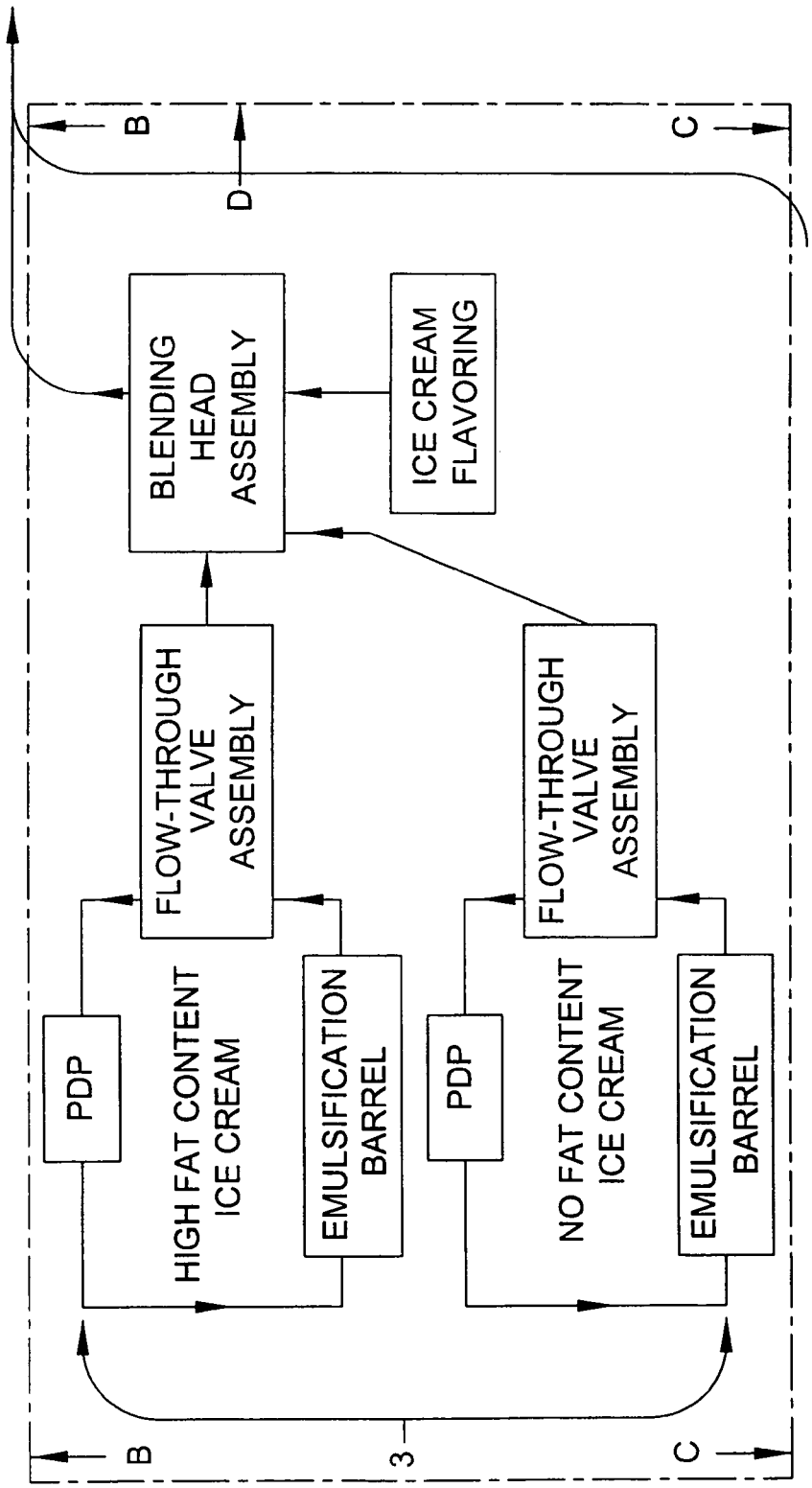
Figure 3B:
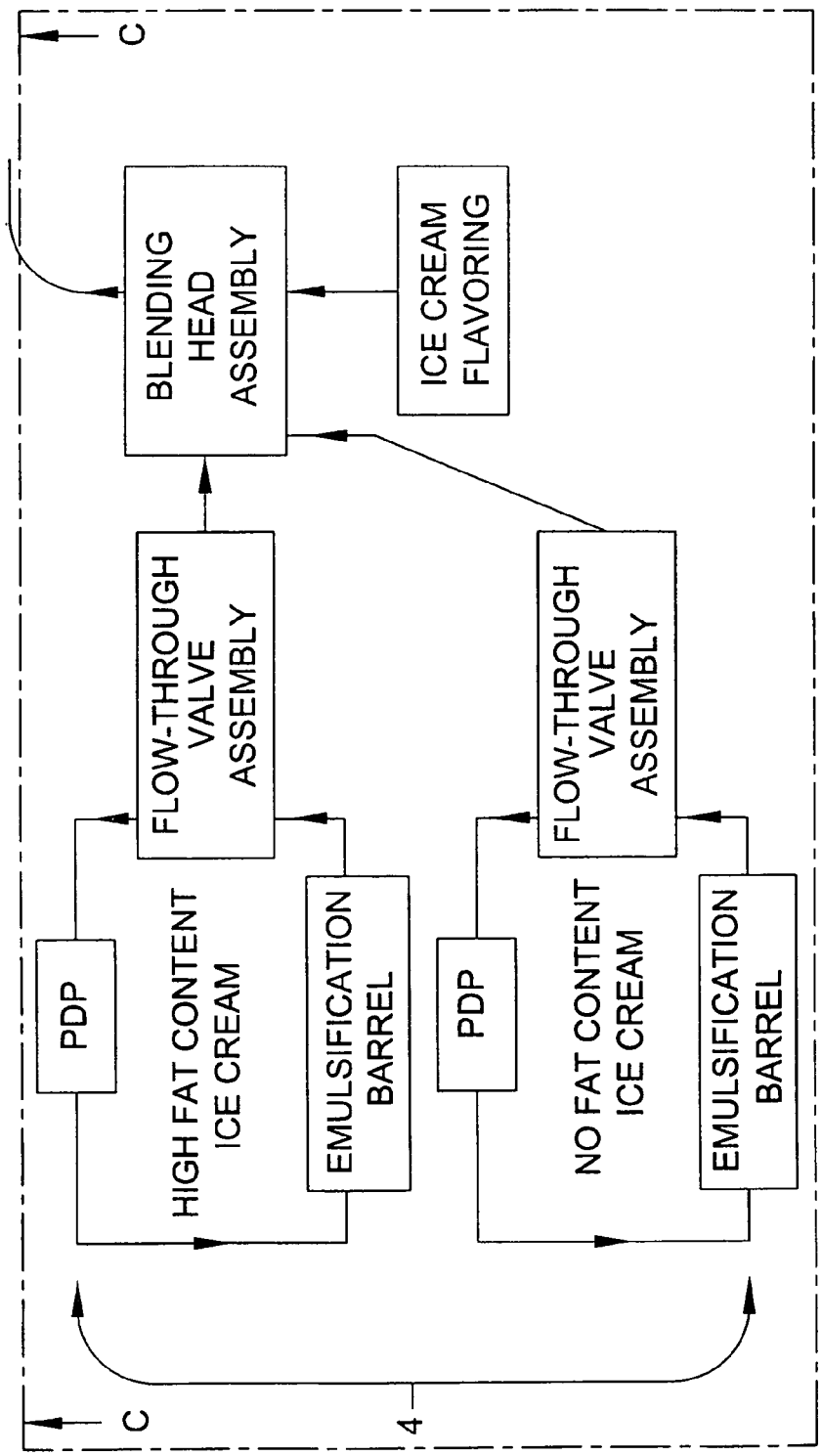
Figure 3B:
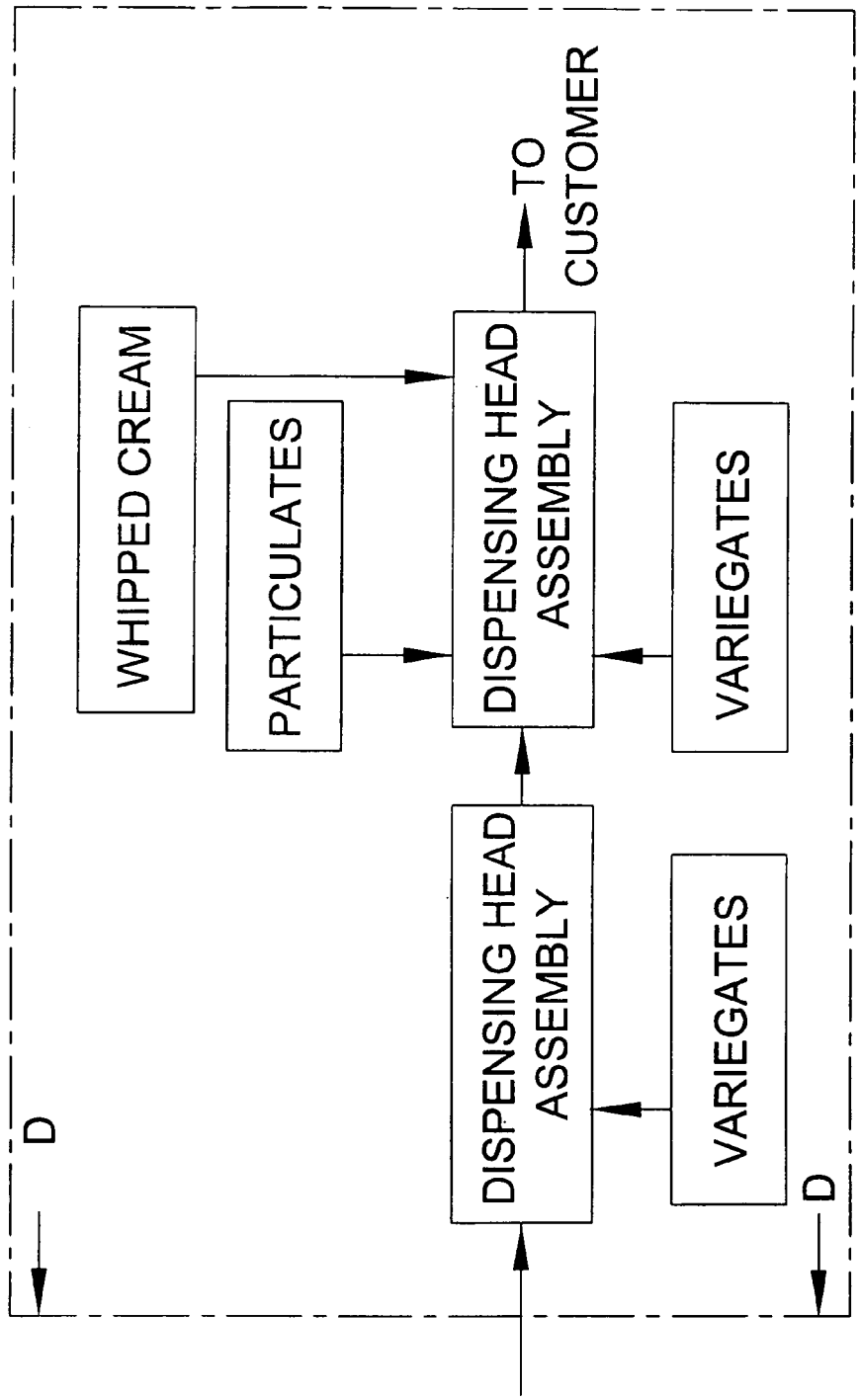

FIGS. 3B and 3BA-3BE show an alternative arrangement of implementing a four blending head machine. In this machine, each blending head assembly has its own food processing loop, but is otherwise the same as the machine of FIGS. 3A and 3AA-3AD.

Figure 4A:
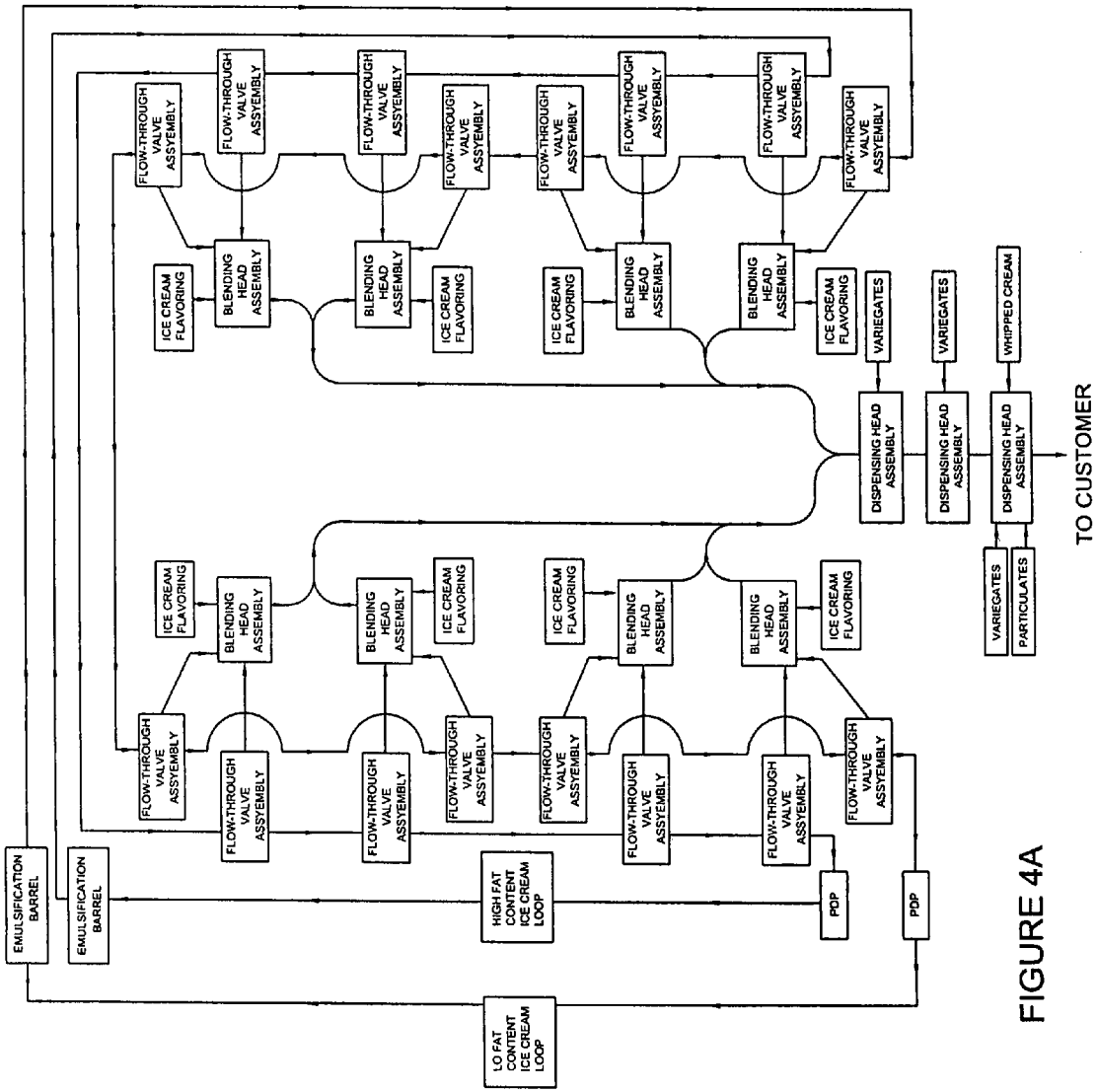
FIG. 4A is a schematic block diagram of one example of a soft serve dispensing apparatus having eight blending head assemblies.

FIG. 4A shows an example of a machine having eight blending head assemblies. The machine of FIG. 4A comprises a no fat content food processing loop containing a series connection of a PDP pump, an emulsification barrel, and eight flow-through valve assemblies. The machine of FIG. 4A also comprises a high fat content food processing loop containing a series connection of a PDP pump, an emulsification barrel, and eight additional flow-through valve assemblies. Each of the eight flow-through valve assemblies in the each of the two loops is connected to one of eight blending head assemblies each having its own supply of multiple flavorings. The outputs of the blending head assemblies are connected to a series connection of three dispensing head assemblies. One of the dispensing head assemblies is like those shown above in FIG. 1I or 1K. The second and third dispensing head assemblies are used to increase the number of variegates able to be added to the soft serve food product dispensed from the machine.

Figure 4B:
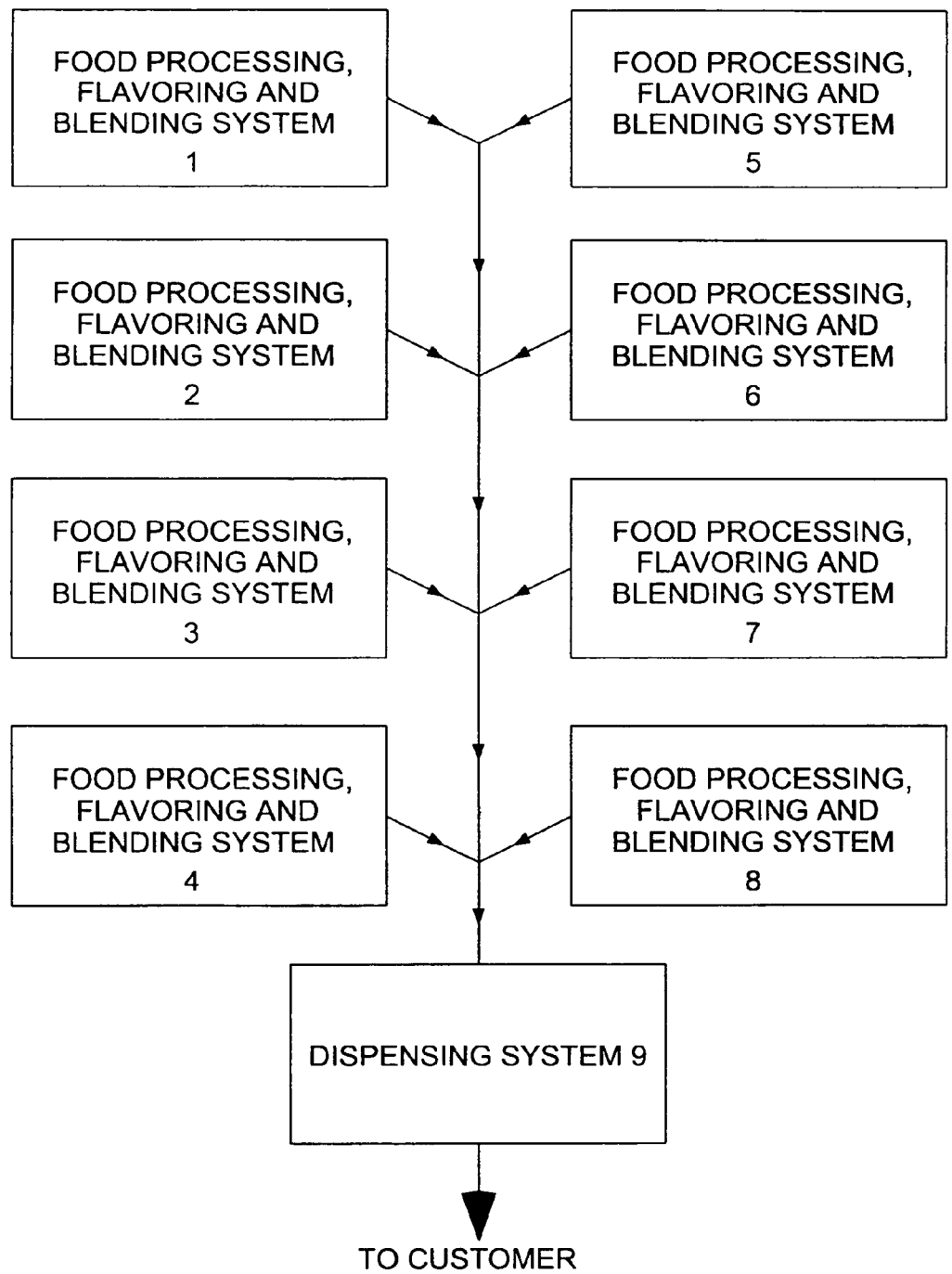
FIG. 4B is an assembly diagram for another example of a soft serve dispensing apparatus having eight blending head assemblies.
Figure 4B:
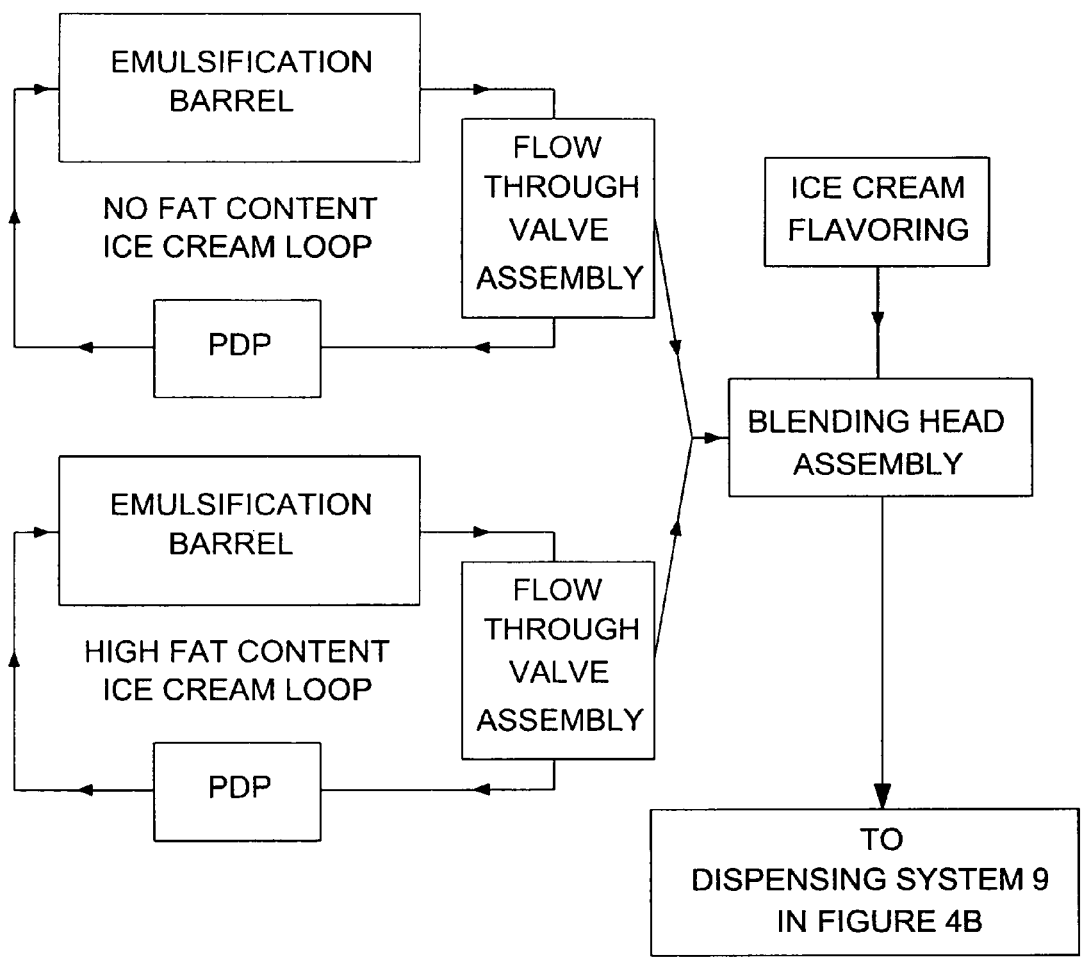

FIGS. 4B, 4BA, and 4BB show an alternative arrangement of implementing an eight blending head machine. In FIGS. 4B, 4BA, and 4BB, each blending head assembly has its own food processing loop, but is otherwise the same as the machine of FIG. 4A.

All surfaces in machines in accordance with the principles of this invention, including flow-through valves, pistons, transfer-pipe elements, blending head assemblies, and dispensing head assemblies, that come in contact with food can be subjected to clean-in-place (CIP) procedures in accordance with the CIP procedures set forth in the two patent applications noted above.

Some examples of frozen food compositions, such as ice cream, that can be produced by a machine like the one described above include:
1. Single flavor (for example, vanilla);
2. Two Flavors (for example, vanilla and chocolate); Vanilla and chocolate side by side or in a twist;
3. Layer of vanilla and a layer of chocolate (layering);
4. Layers of ice cream and whipped cream (parfait or mousse);
5. Marbleized flavors, such as vanilla and chocolate;
6. Two flavors on top of each other (like scooped ice cream);
7. An Extra Light and creamy concoction in all butter fat levels (more overrun gas incorporated into mix in the blending head);
8. Ice cream soda concoctions;
9. Injected streams of ice cream (striped or twisted like a candy cane) injected into and on the outside of the central stream of ice cream as it is being dispensed; and
10. Dots of different color soft serve food product can be created on a core stream of soft serve food product by stopping and starting the secondary injection stream thereby creating a stars and stripes effect.

All of the above products can be made with any or none of the variegates, particulates, whipped creams, sodas, ice cream injectors, variable butter fat contents of the ice creams as well as in an Extra Light mode.

The invention claimed is:

1. Apparatus for dispensing a soft serve frozen food composition, comprising:
   a first source of soft serve frozen food composition;
   a second source of soft serve frozen food composition;
   a blending head assembly connected to the first and second sources of frozen food compositions;
   one or more sources of flavoring connected to the blending head assembly; and
   a dispensing head assembly connected to the blending head assembly.

2. The apparatus of claim 1, further comprising a source of overrun gas connected to the blending head.

3. The apparatus of claim 1, further comprising a source of carbonated beveridge connected to the blending head.

4. The apparatus of claim 1, further comprising a source of variegate material connected to the dispensing head.

5. The apparatus of claim 1, further comprising a source of particulate material connected to the dispensing head.

6. The apparatus of claim 1, further comprising a source of whipped cream connected to the dispensing head.

7. The apparatus of claim 1, further comprising a secondary source of soft serve food product connected to the dispensing head, the secondary source of soft serve food product being arranged to inject a secondary stream of soft serve food product into a stream of soft serve food product from the blending head flowing through the dispensing head.

8. The apparatus of claim 1, further comprising a configurable transfer pipe system that connects the first and second sources of soft serve food product to the blending head and connects the blending head to the dispensing head.

9. The apparatus of claim 8, further comprising first and second flow-through valve assemblies that selectively admit soft serve food product from the first and second sources into the transfer pipe system.

10. The apparatus of claim 1, in which the dispensing head assembly comprises:
a plurality of passages each connected to a source of particulate material to be added to soft serve food product dispensed by the dispensing apparatus;
a plurality of passages each connected to a source of variegate material to be selectively added to soft serve food product dispensed by the dispensing apparatus; and
a plurality of passages each connected to a source of whipped cream to be selectively added to soft serve food product dispensed from the dispensing apparatus.

11. The apparatus of claim 1, in which the soft serve frozen food composition from the first source has a first fat content; and
the soft serve frozen food composition from the second source has a second fat content.

12. Apparatus for dispensing a soft serve frozen food composition, comprising:
a first source of soft serve frozen food composition;
a second source of soft serve frozen food composition;
a first blending head assembly;
a second blending head assembly;
a dispensing head assembly;
a transfer pipe system connecting the first and second sources to the first and second blending head assemblies and connecting the first and second blending head assemblies to the dispensing head assembly.

13. The apparatus of claim 12, in which the dispensing head assembly is non-collinearly located with respect to the first and second blending head assemblies.

\* \* \* \* \*